(12) United States Patent
Bodishbaugh et al.

(10) Patent No.: US 11,773,805 B2
(45) Date of Patent: *Oct. 3, 2023

(54) SYSTEMS AND METHODS UTILIZING GAS TEMPERATURE AS A POWER SOURCE

(71) Applicant: ICE Thermal Harvesting, LLC, Houston, TX (US)

(72) Inventors: Adrian Benjamin Bodishbaugh, Houston, TX (US); Carrie Jeanne Murtland, Houston, TX (US)

(73) Assignee: ICE Thermal Harvesting, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/087,584

(22) Filed: Dec. 22, 2022

(65) Prior Publication Data
US 2023/0134721 A1    May 4, 2023

Related U.S. Application Data

(63) Continuation of application No. 17/934,339, filed on Sep. 22, 2022, now Pat. No. 11,572,849, which is a
(Continued)

(51) Int. Cl.
*F02G 1/055* (2006.01)
*F02G 1/05* (2006.01)
(Continued)

(52) U.S. Cl.
CPC ............. *F02G 1/055* (2013.01); *F01D 17/02* (2013.01); *F01D 19/00* (2013.01); *F01D 21/00* (2013.01);
(Continued)

(58) Field of Classification Search
CPC ... F02G 1/055; F02G 1/05; F02G 5/04; F02G 2256/00; F02G 2275/00; F02G 2280/20;
(Continued)

(56) References Cited

U.S. PATENT DOCUMENTS 3,517,208 A    6/1970   Williams et al.
3,757,516 A    9/1973   McCabe
(Continued)

FOREIGN PATENT DOCUMENTS

AU    2007204830 A1    7/2007
AU    2009238733 B2    8/2013
(Continued)

OTHER PUBLICATIONS

Richter, Alexander, GreenFire Energy and Mitsui Oil Exploration Co. are partnering on a closed-loop geothermal pilot project in Japan, Think GeoEnergy, Apr. 6, 2021.
(Continued)

*Primary Examiner* — Hoang M Nguyen
(74) *Attorney, Agent, or Firm* — Womble Bond Dickinson (US) LLP

(57) ABSTRACT

Systems and generating power in an organic Rankine cycle (ORC) operation to supply electrical power. In embodiments, an inlet temperature of a flow of gas from a source to an ORC unit may be determined. The source may connect to a main pipeline. The main pipeline may connect to a supply pipeline. The supply pipeline may connect to the ORC unit thereby to allow gas to flow from the source to the ORC unit. Heat from the flow of gas may cause the ORC unit to generate electrical power. The outlet temperature of the flow of the gas from the ORC unit to a return pipe may be determined. A bypass valve, positioned on a bypass pipeline connecting the supply pipeline to the return pipeline, may be adjusted to a position sufficient to maintain temperature of the flow of gas above a threshold based on the inlet and outlet temperature.

27 Claims, 23 Drawing Sheets

Related U.S. Application Data continuation of application No. 17/715,400, filed on Apr. 7, 2022, now Pat. No. 11,486,330, which is a continuation of application No. 17/578,520, filed on Jan. 19, 2022, now Pat. No. 11,326,550.

(60) Provisional application No. 63/261,601, filed on Sep. 24, 2021, provisional application No. 63/200,908, filed on Apr. 2, 2021.

(51) Int. Cl.
| | | |
|---|---|---|
| *F02G 5/04* | (2006.01) | |
| *F01K 23/02* | (2006.01) | |
| *F01K 25/08* | (2006.01) | |
| *F01D 17/02* | (2006.01) | |
| *F01D 19/00* | (2006.01) | |
| *F01D 21/00* | (2006.01) | |
| *F24T 50/00* | (2018.01) | |
| *F03G 4/00* | (2006.01) | |

(52) U.S. Cl.
CPC ............. *F01K 23/02* (2013.01); *F01K 25/08* (2013.01); *F02G 1/05* (2013.01); *F02G 5/04* (2013.01); *F03G 4/00* (2021.08); *F24T 50/00* (2018.05); *F02G 2256/00* (2013.01); *F02G 2275/00* (2013.01); *F02G 2280/20* (2013.01); *F02G 2280/50* (2013.01); *F03G 4/035* (2021.08)

(58) Field of Classification Search
CPC ...... F02G 2280/50; F01D 17/02; F01D 19/00; F01D 21/00; F01K 23/02; F01K 25/08; F03G 4/00; F03G 4/035; F24T 50/00
USPC ...................... 60/618, 641.2–641.4, 651, 671
See application file for complete search history.

(56) References Cited

U.S. PATENT DOCUMENTS

| | | |
|---|---|---|
| 3,808,794 A | 5/1974 | Wood |
| 3,875,749 A | 4/1975 | Baciu |
| 3,908,381 A | 9/1975 | Barber et al. |
| 3,988,895 A | 11/1976 | Sheinbaum |
| 4,063,417 A | 12/1977 | Shields |
| 4,079,590 A | 3/1978 | Sheinbaum |
| 4,112,687 A | 9/1978 | Dixon |
| 4,112,745 A | 9/1978 | McCabe |
| 4,149,385 A | 4/1979 | Sheinbaum |
| 4,157,730 A | 6/1979 | Despois et al. |
| 4,224,796 A | 9/1980 | Stiel et al. |
| 4,228,657 A | 10/1980 | Leo |
| 4,356,401 A | 10/1982 | Santi |
| 4,369,373 A | 1/1983 | Wiseman |
| 4,484,446 A | 11/1984 | Goldsberry |
| 4,542,625 A | 9/1985 | Bronicki |
| 4,558,568 A | 12/1985 | Hoshino et al. |
| 4,576,005 A | 3/1986 | Force |
| 4,590,384 A | 5/1986 | Bronicki |
| 4,982,568 A | 1/1991 | Kalina |
| 4,996,846 A | 3/1991 | Bronicki |
| 5,038,567 A | 8/1991 | Mortiz |
| 5,117,908 A | 6/1992 | Hofmann |
| 5,199,507 A | 4/1993 | Westmoreland |
| 5,311,741 A | 5/1994 | Blaize |
| 5,421,157 A | 6/1995 | Rosenblatt |
| 5,440,882 A | 8/1995 | Kalina |
| 5,483,797 A | 1/1996 | Rigal et al. |
| 5,497,624 A | 3/1996 | Amir et al. |
| 5,517,822 A | 5/1996 | Haws et al. |
| 5,526,646 A | 6/1996 | Bronicki et al. |
| 5,555,731 A | 9/1996 | Rosenblatt |
| 5,570,579 A | 11/1996 | Larjola |
| 5,595,059 A | 1/1997 | Huber et al. |
| 5,598,706 A | 2/1997 | Bronicki et al. |
| 5,660,042 A | 8/1997 | Bronicki et al. |
| 5,661,977 A | 9/1997 | Shnell |
| 5,671,601 A | 9/1997 | Bronicki et al. |
| 5,685,362 A | 11/1997 | Brown |
| 5,816,048 A | 10/1998 | Bronicki et al. |
| 5,839,282 A | 11/1998 | Bronicki et al. |
| 5,860,279 A | 1/1999 | Bronicki et al. |
| RE36,282 E | 8/1999 | Nitschke |
| 5,970,714 A | 10/1999 | Bronicki et al. |
| 5,974,804 A | 11/1999 | Sterling |
| 6,212,890 B1 | 4/2001 | Amir |
| 6,536,360 B2 | 3/2003 | O'Connor |
| 6,585,047 B2 | 7/2003 | Mcclung |
| 6,695,061 B2 | 2/2004 | Fripp et al. |
| 6,724,687 B1 | 4/2004 | Stephenson et al. |
| 6,853,798 B1 | 2/2005 | Weiss |
| 6,857,268 B2 | 2/2005 | Stinger et al. |
| 6,857,486 B2 | 2/2005 | Chitwood et al. |
| 6,989,989 B2 | 1/2006 | Brasz et al. |
| 7,096,665 B2 | 8/2006 | Stinger et al. |
| 7,174,716 B2 | 2/2007 | Brasz et al. |
| 7,224,080 B2 | 5/2007 | Smedstad |
| 7,225,621 B2 | 6/2007 | Zimron et al. |
| 7,234,314 B1 | 6/2007 | Wiggs |
| 7,237,383 B2 | 7/2007 | Ahrens-Botzong et al. |
| 7,254,949 B2 | 8/2007 | Brasz et al. |
| 7,281,379 B2 | 10/2007 | Brasz |
| 7,287,381 B1 | 10/2007 | Pierson et al. |
| 7,289,325 B2 | 10/2007 | Brasz et al. |
| 7,313,926 B2 | 1/2008 | Gurin |
| 7,320,221 B2 | 1/2008 | Bronicki |
| 7,334,410 B2 | 2/2008 | Creighton et al. |
| 7,337,842 B2 | 3/2008 | Roddy et al. |
| 7,353,653 B2 | 4/2008 | Bronicki |
| 7,428,816 B2 | 9/2008 | Singh et al. |
| 7,472,548 B2 | 1/2009 | Meksvanh |
| 7,493,768 B2 | 2/2009 | Klaus et al. |
| 7,753,122 B2 | 7/2010 | Curlett |
| 7,823,386 B2 | 11/2010 | Zimron et al. |
| 7,891,187 B2 | 2/2011 | Mohr |
| 7,891,189 B2 | 2/2011 | Bottger et al. |
| 7,900,450 B2 | 3/2011 | Gurin |
| 7,934,383 B2 | 5/2011 | Gutierrez et al. |
| 7,942,001 B2 | 5/2011 | Radcliff et al. |
| 7,950,230 B2 | 5/2011 | Nishikawa et al. |
| 8,046,999 B2 | 11/2011 | Doty |
| 8,096,128 B2 | 1/2012 | Held et al. |
| 8,099,198 B2 | 1/2012 | Gurin |
| 8,146,360 B2 | 4/2012 | Myers et al. |
| 8,166,761 B2 | 5/2012 | Moghtaderi et al. |
| 8,193,659 B2 | 6/2012 | Bronicki et al. |
| 8,272,217 B2 | 9/2012 | Lengert |
| 8,309,498 B2 | 11/2012 | Funkhouser et al. |
| 8,371,099 B2 | 2/2013 | Gutierrez et al. |
| 8,381,523 B2 | 2/2013 | Zadok |
| 8,430,166 B2 | 4/2013 | Danko |
| 8,438,849 B2 | 5/2013 | Kaplan et al. |
| 8,459,029 B2 | 6/2013 | Lehar |
| 8,511,085 B2 | 8/2013 | Frey et al. |
| 8,528,333 B2 | 9/2013 | Juchymenko |
| 8,534,069 B2 | 9/2013 | Parrella |
| 8,555,643 B2 | 10/2013 | Kalina |
| 8,555,912 B2 | 10/2013 | Woolley et al. |
| 8,572,970 B2 | 11/2013 | Matteson et al. |
| 8,578,714 B2 | 11/2013 | Nagurny et al. |
| 8,596,066 B2 | 12/2013 | Zimron et al. |
| 8,616,000 B2 | 12/2013 | Parrella |
| 8,616,001 B2 | 12/2013 | Held et al. |
| 8,616,323 B1 | 12/2013 | Gurin |
| 8,656,720 B1 | 2/2014 | Hardgrave |
| 8,667,799 B2 | 3/2014 | Batscha |
| 8,674,525 B2 | 3/2014 | Van den Bossche et al. |
| 8,680,704 B1 | 3/2014 | Rooney |
| 8,707,697 B2 | 4/2014 | Nitschke |
| 8,707,698 B2 | 4/2014 | Conry |
| 8,708,046 B2 | 4/2014 | Montgomery et al. |
| 8,720,563 B2 | 5/2014 | Joseph et al. |
| 8,752,382 B2 | 6/2014 | Lehar |

(56) References Cited

U.S. PATENT DOCUMENTS

| | | |
|---|---|---|
| 8,756,908 B2 | 6/2014 | Sheridan et al. |
| 8,771,603 B2 | 7/2014 | Harless et al. |
| 8,783,034 B2 | 7/2014 | Held |
| 8,791,054 B2 | 7/2014 | Deville |
| 8,820,075 B2 | 9/2014 | Kaminsky |
| 8,820,079 B2 | 9/2014 | Zyhowski et al. |
| 8,839,857 B2 | 9/2014 | Schultz et al. |
| 8,841,041 B2 | 9/2014 | Biederman et al. |
| 8,850,814 B2 | 10/2014 | Kaplan et al. |
| 8,857,186 B2 | 10/2014 | Held |
| 8,869,531 B2 | 10/2014 | Held |
| 8,881,805 B2 | 11/2014 | Klemencic |
| 8,919,123 B2 | 12/2014 | Gibble et al. |
| 8,959,914 B2 | 2/2015 | Kasuya et al. |
| 8,984,883 B2 | 3/2015 | Riley |
| 8,984,884 B2 | 3/2015 | Xu et al. |
| 9,003,798 B2 | 4/2015 | Yanagi |
| 9,014,791 B2 | 4/2015 | Held |
| 9,062,898 B2 | 6/2015 | Held |
| 9,077,220 B2 | 7/2015 | Kyle et al. |
| 9,080,789 B2 | 7/2015 | Hamstra et al. |
| 9,091,278 B2 | 7/2015 | Vermeersch |
| 9,109,398 B2 | 8/2015 | Harris et al. |
| 9,115,604 B2 | 8/2015 | Bronicki |
| 9,118,226 B2 | 8/2015 | Kacludis et al. |
| 9,121,259 B2 | 9/2015 | Bryant et al. |
| 9,150,774 B2 | 10/2015 | Reddy et al. |
| 9,181,930 B2 | 11/2015 | Klemencic |
| 9,217,370 B2 | 12/2015 | Wang et al. |
| 9,234,522 B2 | 1/2016 | Jonsson et al. |
| 9,243,616 B2 | 1/2016 | Lee et al. |
| 9,297,367 B2 | 3/2016 | Ramaswamy et al. |
| 9,316,404 B2 | 4/2016 | Gurin |
| 9,322,300 B2 | 4/2016 | Mirmobin et al. |
| 9,331,547 B2 | 5/2016 | Bronicki |
| 9,341,084 B2 | 5/2016 | Xie et al. |
| 9,341,086 B2 | 5/2016 | Batscha et al. |
| 9,359,919 B1 | 6/2016 | Berry |
| 9,376,937 B2 | 6/2016 | Goswami et al. |
| 9,394,764 B2 | 7/2016 | Favilli et al. |
| 9,394,771 B2 | 7/2016 | Wiggs |
| 9,403,102 B2 | 8/2016 | Wu et al. |
| 9,441,504 B2 | 9/2016 | Held |
| 9,458,738 B2 | 10/2016 | Held |
| 9,488,160 B2 | 11/2016 | Fisher et al. |
| 9,499,732 B2 | 11/2016 | Reddy et al. |
| 9,512,348 B2 | 12/2016 | Reyes et al. |
| 9,512,741 B2 | 12/2016 | Myogan et al. |
| 9,574,551 B2 | 2/2017 | Parrella, Sr. et al. |
| 9,587,161 B2 | 3/2017 | Fisk, Jr. |
| 9,587,162 B2 | 3/2017 | Fisk, Jr. |
| 9,638,065 B2 | 5/2017 | Vermeersch et al. |
| 9,649,582 B2 | 5/2017 | Shnell |
| 9,671,138 B2 | 6/2017 | Batscha et al. |
| 9,683,463 B2 | 6/2017 | Juchymenko |
| 9,726,157 B2 | 8/2017 | Sweatman et al. |
| 9,726,441 B2 | 8/2017 | Reissner et al. |
| 9,732,634 B2 | 8/2017 | Hikichi et al. |
| 9,745,870 B2 | 8/2017 | Johnson et al. |
| 9,759,096 B2 | 9/2017 | Vermeersch |
| 9,762,460 B2 | 9/2017 | Pawlowski et al. |
| 9,777,602 B2 | 10/2017 | Juchymenko |
| 9,784,140 B2 | 10/2017 | Huntington et al. |
| 9,784,248 B2 | 10/2017 | Batscha et al. |
| 9,797,273 B2 | 10/2017 | Nishiguchi et al. |
| 9,816,402 B2 | 11/2017 | Kauffman et al. |
| 9,816,443 B2 | 11/2017 | Sheridan et al. |
| 9,829,194 B2 | 11/2017 | Aumann et al. |
| 9,840,662 B2 | 12/2017 | Pascarella et al. |
| 9,845,423 B2 | 12/2017 | Frantz et al. |
| 9,863,282 B2 | 1/2018 | Hart et al. |
| 9,874,112 B2 | 1/2018 | Giegel |
| 9,932,861 B2 | 4/2018 | Preuss et al. |
| 9,932,970 B1 | 4/2018 | Jeter |
| 9,957,432 B2 | 5/2018 | Galindo et al. |
| 9,994,751 B2 | 6/2018 | Hulse et al. |
| 10,005,950 B2 | 6/2018 | Smith et al. |
| 10,024,198 B2 | 7/2018 | Held et al. |
| 10,059,870 B2 | 8/2018 | Joseph et al. |
| 10,060,283 B2 | 8/2018 | Tomigashi et al. |
| 10,060,302 B2 | 8/2018 | Weng et al. |
| 10,060,652 B2 | 8/2018 | Tahara |
| 10,077,683 B2 | 9/2018 | Close |
| 10,082,030 B2 | 9/2018 | Genrup et al. |
| 10,113,389 B2 | 10/2018 | Pandey et al. |
| 10,113,535 B2 | 10/2018 | Conlon |
| 10,138,405 B2 | 11/2018 | Kulkarni et al. |
| 10,138,560 B2 | 11/2018 | Reyes et al. |
| 10,221,770 B2 | 3/2019 | Sheridan |
| 10,227,893 B2 | 3/2019 | McCune et al. |
| 10,247,044 B2 | 4/2019 | Barmeier et al. |
| 10,247,046 B2 | 4/2019 | Schuster et al. |
| 10,267,184 B2 | 4/2019 | Bowan et al. |
| 10,323,545 B2 | 6/2019 | Johnson |
| 10,352,197 B2 | 7/2019 | Grill et al. |
| 10,357,726 B2 | 7/2019 | Qin et al. |
| 10,400,635 B2 | 9/2019 | Johnson et al. |
| 10,435,604 B2 | 10/2019 | Kontomaris et al. |
| 10,458,206 B2 | 10/2019 | Al-Dossary et al. |
| 10,465,104 B2 | 11/2019 | Ravi et al. |
| 10,465,491 B2 | 11/2019 | Moore |
| 10,472,994 B2 | 11/2019 | Avadhanula et al. |
| 10,494,897 B2 | 12/2019 | Pandey et al. |
| 10,495,098 B2 | 12/2019 | Preuss et al. |
| 10,519,814 B2 | 12/2019 | Quoilin |
| 10,527,026 B2 | 1/2020 | Muir et al. |
| 10,563,927 B2 | 2/2020 | Papadopoulos et al. |
| 10,570,777 B2 | 2/2020 | Bowan |
| 10,570,782 B2 | 2/2020 | Lintl et al. |
| 10,584,660 B2 | 3/2020 | Sheridan et al. |
| 10,590,324 B2 | 3/2020 | Kulkarni et al. |
| 10,590,802 B2 | 3/2020 | McCune et al. |
| 10,598,160 B2 | 3/2020 | Sumrall |
| 10,619,520 B2 | 4/2020 | Juchymenko |
| 10,626,709 B2 | 4/2020 | Al-Dossary |
| 10,670,340 B2 | 6/2020 | Batscha et al. |
| 10,724,805 B2 | 7/2020 | Barmeier et al. |
| 10,767,904 B2 | 9/2020 | Von Düring |
| 10,788,267 B2 | 9/2020 | Dokic et al. |
| 10,794,292 B2 | 10/2020 | Kupratis et al. |
| 10,883,388 B2 | 1/2021 | Held |
| 10,934,895 B2 | 3/2021 | Held et al. |
| 10,947,626 B2 | 3/2021 | Pinder et al. |
| 10,947,839 B2 | 3/2021 | Cuthbert et al. |
| 10,975,279 B2 | 4/2021 | Kontomaris et al. |
| 11,022,070 B2 | 6/2021 | Aumann et al. |
| 11,137,169 B2 | 10/2021 | Buscheck et al. |
| 11,168,673 B2 | 11/2021 | Younes et al. |
| 11,174,715 B2 | 11/2021 | Atisele |
| 11,187,112 B2 | 11/2021 | Held |
| 11,187,212 B1 | 11/2021 | Bodishbaugh et al. |
| 11,220,932 B2 | 1/2022 | Kontomaris et al. |
| 11,255,315 B1 | 2/2022 | Bodishbaugh et al. |
| 11,255,576 B2 | 2/2022 | Higgins et al. |
| 11,274,660 B2 | 3/2022 | Radke |
| 11,274,663 B1 | 3/2022 | Bodishbaugh et al. |
| 11,280,322 B1 | 3/2022 | Bodishbaugh et al. |
| 11,293,414 B1 | 4/2022 | Bodishbaugh et al. |
| 11,326,479 B2 | 5/2022 | Radke |
| 11,326,550 B1 | 5/2022 | Bodishbaugh et al. |
| 11,359,612 B1 | 6/2022 | Bodishbaugh et al. |
| 11,365,652 B2 | 6/2022 | Gaia et al. |
| 11,396,828 B2 | 7/2022 | Chase |
| 11,486,330 B2 | 11/2022 | Bodishbaugh et al. |
| 11,486,370 B2 | 11/2022 | Bodishbaugh et al. |
| 11,644,014 B2 | 5/2023 | Bodishbaugh et al. |
| 2002/0178723 A1 | 12/2002 | Bronicki et al. |
| 2003/0010652 A1 | 1/2003 | Hunt |
| 2003/0029169 A1 | 2/2003 | Hanna et al. |
| 2004/0237890 A1 | 12/2004 | Bour |
| 2005/0034467 A1 | 2/2005 | Varney |
| 2005/0109495 A1 | 5/2005 | Cheng et al. |
| 2005/0247056 A1 | 11/2005 | Cogswell et al. |
| 2005/0247059 A1 | 11/2005 | Cogswell et al. |

(56) References Cited

U.S. PATENT DOCUMENTS

| | | |
|---|---|---|
| 2006/0026961 A1 | 2/2006 | Bronicki |
| 2006/0130480 A1 | 6/2006 | Lovelace |
| 2007/0025854 A1 | 2/2007 | Moore et al. |
| 2008/0168772 A1 | 7/2008 | Radcliff et al. |
| 2008/0217523 A1 | 9/2008 | O'Sullivan |
| 2009/0211253 A1 | 8/2009 | Radcliff et al. |
| 2009/0217664 A1 | 9/2009 | Rapp et al. |
| 2009/0320477 A1 | 12/2009 | Juchymenko |
| 2010/0018207 A1 | 1/2010 | Juchymenko |
| 2010/0077752 A1 | 4/2010 | Papile |
| 2010/0077792 A1 | 4/2010 | Gurin |
| 2010/0187319 A1 | 7/2010 | Isom et al. |
| 2010/0194111 A1 | 8/2010 | Van den Bossche et al. |
| 2010/0218930 A1 | 9/2010 | Proeschel |
| 2010/0300093 A1 | 12/2010 | Doty |
| 2010/0319354 A1 | 12/2010 | Guidati et al. |
| 2011/0000210 A1 | 1/2011 | Miles |
| 2011/0030404 A1 | 2/2011 | Gurin et al. |
| 2011/0041502 A1 | 2/2011 | Zimron et al. |
| 2011/0041505 A1 | 2/2011 | Kasuya et al. |
| 2011/0083620 A1 | 4/2011 | Yoon |
| 2011/0100003 A1 | 5/2011 | McLeod et al. |
| 2011/0126539 A1 | 6/2011 | Ramaswamy et al. |
| 2011/0138809 A1 | 6/2011 | Ramaswamy et al. |
| 2011/0272166 A1 | 11/2011 | Hunt |
| 2011/0314818 A1 | 12/2011 | Breen et al. |
| 2012/0001429 A1 | 1/2012 | Saar et al. |
| 2012/0042650 A1 | 2/2012 | Ernst et al. |
| 2012/0111004 A1 | 5/2012 | Conry |
| 2012/0131918 A1 | 5/2012 | Held |
| 2012/0145397 A1 | 6/2012 | Schultz et al. |
| 2012/0174581 A1 | 7/2012 | Vaughan et al. |
| 2012/0174622 A1 | 7/2012 | Granier |
| 2012/0192560 A1 | 8/2012 | Ernst et al. |
| 2012/0198844 A1 | 8/2012 | Kaminsky |
| 2012/0261092 A1 | 10/2012 | Heath et al. |
| 2012/0291433 A1 | 11/2012 | Meng et al. |
| 2012/0292112 A1 | 11/2012 | Lakic |
| 2012/0292909 A1 | 11/2012 | Erikson |
| 2012/0315158 A1 | 12/2012 | Klaus |
| 2013/0041068 A1 | 2/2013 | Reddy et al. |
| 2013/0067910 A1 | 3/2013 | Ishiguro et al. |
| 2013/0091843 A1 | 4/2013 | Zyhowski et al. |
| 2013/0168089 A1 | 7/2013 | Berg et al. |
| 2013/0168964 A1 | 7/2013 | Xu et al. |
| 2013/0217604 A1 | 8/2013 | Fisk, Jr. |
| 2013/0227947 A1 | 9/2013 | Bronicki et al. |
| 2013/0247569 A1 | 9/2013 | Suter |
| 2013/0298568 A1 | 11/2013 | Pierson et al. |
| 2013/0299123 A1 | 11/2013 | Matula |
| 2013/0299170 A1 | 11/2013 | Joseph et al. |
| 2014/0011908 A1 | 1/2014 | Reddy et al. |
| 2014/0026574 A1 | 1/2014 | Leibowitz et al. |
| 2014/0033713 A1 | 2/2014 | Juchymenko |
| 2014/0057810 A1 | 2/2014 | Fisk, Jr. |
| 2014/0087978 A1 | 3/2014 | Deville |
| 2014/0102098 A1 | 4/2014 | Bowan et al. |
| 2014/0123643 A1 | 5/2014 | Ming |
| 2014/0130498 A1 | 5/2014 | Randolph |
| 2014/0158429 A1 | 6/2014 | Kader et al. |
| 2014/0178180 A1 | 6/2014 | Sheridan |
| 2014/0206912 A1 | 7/2014 | Iglesias |
| 2014/0224469 A1* | 8/2014 | Mirmobin ............... F01K 13/02 165/244 |
| 2014/0296113 A1 | 10/2014 | Reyes et al. |
| 2014/0305125 A1 | 10/2014 | Wang et al. |
| 2014/0366540 A1 | 12/2014 | Zyhowski et al. |
| 2015/0021924 A1 | 1/2015 | Parella |
| 2015/0047351 A1 | 2/2015 | Ishikawa et al. |
| 2015/0135708 A1 | 5/2015 | Lutz et al. |
| 2015/0192038 A1 | 7/2015 | Sharp et al. |
| 2015/0226500 A1 | 8/2015 | Reissner et al. |
| 2015/0252653 A1 | 9/2015 | Shelton, Jr. |
| 2015/0300327 A1 | 10/2015 | Sweatman et al. |
| 2015/0330261 A1 | 11/2015 | Held |
| 2015/0345341 A1 | 12/2015 | Kacludis et al. |
| 2015/0345482 A1 | 12/2015 | Klitzing et al. |
| 2015/0361831 A1 | 12/2015 | Myers |
| 2016/0003108 A1 | 1/2016 | Held et al. |
| 2016/0010512 A1 | 1/2016 | Close |
| 2016/0017758 A1 | 1/2016 | Vermeersch et al. |
| 2016/0017759 A1 | 1/2016 | Gayawal et al. |
| 2016/0040557 A1 | 2/2016 | Vermeersch et al. |
| 2016/0047540 A1 | 2/2016 | Aumann et al. |
| 2016/0061055 A1 | 3/2016 | Bowan |
| 2016/0076405 A1 | 3/2016 | Hashimoto et al. |
| 2016/0084115 A1 | 3/2016 | Udewig et al. |
| 2016/0130985 A1 | 5/2016 | O'Connor et al. |
| 2016/0160111 A1 | 6/2016 | Smith et al. |
| 2016/0177887 A1 | 6/2016 | Fischer |
| 2016/0201521 A1 | 7/2016 | Karthauser |
| 2016/0222275 A1 | 8/2016 | Galindo et al. |
| 2016/0257869 A1 | 9/2016 | Kulkarni et al. |
| 2016/0312646 A1 | 10/2016 | Juano |
| 2016/0340572 A1 | 11/2016 | Pascarella et al. |
| 2016/0369408 A1 | 12/2016 | Reyes et al. |
| 2017/0058181 A1 | 3/2017 | Frantz et al. |
| 2017/0058722 A1 | 3/2017 | Noureldin et al. |
| 2017/0130614 A1 | 5/2017 | Held et al. |
| 2017/0145815 A1 | 5/2017 | Cuthbert et al. |
| 2017/0159504 A1 | 6/2017 | Ostrom et al. |
| 2017/0175582 A1 | 6/2017 | McCune et al. |
| 2017/0175583 A1 | 6/2017 | McCune et al. |
| 2017/0226402 A1 | 8/2017 | Patil et al. |
| 2017/0233635 A1 | 8/2017 | Pandey et al. |
| 2017/0240794 A1 | 8/2017 | Iverson et al. |
| 2017/0254223 A1 | 9/2017 | Goethals et al. |
| 2017/0254226 A1 | 9/2017 | Heber et al. |
| 2017/0261268 A1 | 9/2017 | Barmeier et al. |
| 2017/0276026 A1 | 9/2017 | Barmeier et al. |
| 2017/0276435 A1 | 9/2017 | Papadopoulos et al. |
| 2017/0362963 A1 | 9/2017 | Hostler et al. |
| 2017/0284230 A1 | 10/2017 | Juchymenko |
| 2017/0314420 A1 | 11/2017 | Bowan et al. |
| 2017/0321104 A1 | 11/2017 | Ravi et al. |
| 2017/0321107 A1 | 11/2017 | Joseph et al. |
| 2018/0094548 A1 | 4/2018 | Jeter |
| 2018/0128131 A1 | 5/2018 | Zyhowski et al. |
| 2018/0179960 A1* | 6/2018 | Apte ..................... F02C 1/10 |
| 2018/0224164 A1 | 8/2018 | Lakic |
| 2018/0274524 A1 | 9/2018 | Moncarz et al. |
| 2018/0313340 A1 | 11/2018 | Spadacini et al. |
| 2018/0328138 A1 | 11/2018 | Pandey et al. |
| 2018/0340450 A1 | 11/2018 | Avadhanula et al. |
| 2018/0355703 A1 | 12/2018 | Al-Dossary |
| 2018/0356044 A1 | 12/2018 | Monti et al. |
| 2019/0048759 A1 | 2/2019 | Noureldin et al. |
| 2019/0055445 A1 | 2/2019 | Kulkarni et al. |
| 2019/0128147 A1 | 5/2019 | Liu et al. |
| 2019/0128567 A1 | 5/2019 | Redfern |
| 2019/0390660 A1 | 12/2019 | McBay |
| 2020/0011426 A1 | 1/2020 | Juchymenko |
| 2020/0025032 A1 | 1/2020 | McCune et al. |
| 2020/0095899 A1 | 3/2020 | Merswolke et al. |
| 2020/0200123 A1 | 6/2020 | Aumann et al. |
| 2020/0200483 A1 | 6/2020 | Ahlbom |
| 2020/0217304 A1 | 7/2020 | Sumrall |
| 2020/0232342 A1 | 7/2020 | McCune et al. |
| 2020/0248063 A1 | 8/2020 | Stone |
| 2020/0308992 A1 | 10/2020 | Juchymenko |
| 2020/0309101 A1 | 10/2020 | Muir et al. |
| 2020/0354839 A1 | 11/2020 | Pinder et al. |
| 2020/0386212 A1 | 12/2020 | Atisele |
| 2020/0399524 A1 | 12/2020 | Pisklak et al. |
| 2021/0017439 A1 | 1/2021 | Ramirez Angulo et al. |
| 2021/0047963 A1* | 2/2021 | Conde ..................... B04C 3/02 |
| 2021/0062682 A1 | 3/2021 | Higgins et al. |
| 2021/0071063 A1 | 3/2021 | Stone |
| 2021/0140684 A1 | 5/2021 | Younes et al. |
| 2021/0172344 A1 | 6/2021 | Juchymenko |
| 2021/0205738 A1 | 7/2021 | Blomqvist et al. |
| 2021/0285693 A1* | 9/2021 | Gerson ................. F25B 31/004 |

(56) References Cited

U.S. PATENT DOCUMENTS

| | | |
|---|---|---|
| 2021/0372668 A1 | 12/2021 | Buscheck et al. |
| 2022/0090521 A1 | 3/2022 | Kontomaris et al. |
| 2022/0186984 A1 | 6/2022 | Gaia et al. |

FOREIGN PATENT DOCUMENTS

| | | |
|---|---|---|
| AU | 2011336831 B2 | 12/2016 |
| AU | 2012306439 B2 | 3/2017 |
| AU | 2014225990 B2 | 7/2018 |
| CA | 2692629 | 1/2009 |
| CA | 2698334 | 4/2009 |
| CA | 2676502 A1 | 2/2011 |
| CA | 2679612 | 5/2018 |
| CA | 2676502 | 12/2018 |
| CA | 2952379 C | 4/2019 |
| CN | 204661610 U | 9/2015 |
| CN | 103174473 | 10/2015 |
| CN | 102812212 | 4/2016 |
| CN | 103174475 | 8/2016 |
| CN | 106517718 | 3/2017 |
| CN | 107246550 | 10/2017 |
| CN | 108302946 A | 7/2018 |
| CN | 108457609 A | 8/2018 |
| CN | 207761721 U | 8/2018 |
| CN | 209457990 U | 10/2019 |
| CN | 111837006 | 10/2020 |
| CN | 111911255 | 11/2020 |
| CN | 113266815 A | 8/2021 |
| CN | 113983844 A | 1/2022 |
| DE | 10337240 A1 | 3/2005 |
| DE | 102011006066 A1 | 9/2012 |
| DE | 102012214907 A1 | 10/2013 |
| DE | 102012014443 | 1/2014 |
| DE | 102013009351 | 1/2014 |
| DE | 102018201172 A1 | 7/2019 |
| EP | 0652368 | 5/1995 |
| EP | 1507069 A1 | 2/2005 |
| EP | 2530255 A2 | 12/2012 |
| EP | 2201666 | 3/2013 |
| EP | 1573173 | 4/2013 |
| EP | 1713877 | 5/2013 |
| EP | 1869293 | 5/2013 |
| EP | 2222939 | 11/2013 |
| EP | 1706667 B1 | 10/2014 |
| EP | 2167872 | 2/2016 |
| EP | 2446122 B1 | 8/2017 |
| EP | 2478201 B1 | 8/2017 |
| EP | 3102796 B1 | 1/2018 |
| EP | 3514339 A1 | 7/2019 |
| EP | 2550436 B1 | 8/2019 |
| EP | 3464836 | 4/2020 |
| EP | 3631173 A1 | 4/2020 |
| EP | 2948649 B1 | 12/2020 |
| EP | 3540331 B1 | 12/2020 |
| FR | 2738872 | 3/1997 |
| GB | 2336943 | 6/2003 |
| IN | 247090 | 12/2003 |
| IN | 256000 | 1/2005 |
| IN | 202111000822 | 10/2021 |
| JP | 08192150 | 7/1996 |
| JP | 2001183030 | 7/2001 |
| JP | 2009127627 A | 6/2009 |
| JP | 2010166805 A | 7/2010 |
| JP | 2010249501 A | 11/2010 |
| JP | 2010249502 A | 11/2010 |
| JP | 2011064451 A | 3/2011 |
| JP | 4668189 B2 | 4/2011 |
| JP | 2011069370 A | 4/2011 |
| JP | 2011106459 A | 6/2011 |
| JP | 2011137449 A | 7/2011 |
| JP | 2013151931 A | 8/2013 |
| JP | 2013238228 A | 11/2013 |
| JP | 2014016124 A | 1/2014 |
| JP | 2014080975 A | 5/2014 |
| JP | 2014109279 A | 6/2014 |
| JP | 2015149885 A | 8/2015 |
| JP | 2016006323 A | 1/2016 |
| JP | 2016105687 A | 6/2016 |
| JP | 2016188640 A | 11/2016 |
| JP | 2021167601 A | 10/2021 |
| KR | 101126833 | 3/2012 |
| KR | 20120067710 | 6/2012 |
| KR | 20130023578 A | 3/2013 |
| KR | 1691908 | 1/2017 |
| KR | 2075550 | 2/2020 |
| KR | 2185002 | 12/2020 |
| NZ | 581457 | 11/2011 |
| RU | 2006142350 | 6/2008 |
| SG | 191467 | 7/2013 |
| SG | 191468 | 7/2013 |
| SG | 192327 | 8/2013 |
| WO | 1993/001397 | 1/1993 |
| WO | 1994028298 | 12/1994 |
| WO | 2005014981 A1 | 2/2005 |
| WO | 2005019606 A1 | 3/2005 |
| WO | 2005049975 | 6/2005 |
| WO | 2005100755 A1 | 10/2005 |
| WO | 2006/014609 | 2/2006 |
| WO | 2006/027770 | 3/2006 |
| WO | 2006060253 | 6/2006 |
| WO | 2006/092786 | 9/2006 |
| WO | 2006138459 | 12/2006 |
| WO | 2007048999 | 5/2007 |
| WO | 20070079245 | 7/2007 |
| WO | 2007137373 | 12/2007 |
| WO | 2008052809 | 5/2008 |
| WO | 2008106774 A1 | 9/2008 |
| WO | 2009017471 | 2/2009 |
| WO | 2009017474 | 2/2009 |
| WO | 2009027302 A2 | 3/2009 |
| WO | 2009030283 A2 | 3/2009 |
| WO | 2009/058112 | 5/2009 |
| WO | 2009095127 A2 | 8/2009 |
| WO | 2009/142608 | 11/2009 |
| WO | 2010021618 | 2/2010 |
| WO | 2010/039448 | 4/2010 |
| WO | 2010/065895 | 6/2010 |
| WO | 2009017473 | 8/2010 |
| WO | 2010106089 A2 | 9/2010 |
| WO | 2010127932 A2 | 11/2010 |
| WO | 2010/143046 | 12/2010 |
| WO | 2010/143049 | 12/2010 |
| WO | 2011012047 A1 | 2/2011 |
| WO | 2011/066032 | 6/2011 |
| WO | 2011073469 | 6/2011 |
| WO | 2011/061601 | 8/2011 |
| WO | 2011/103560 | 8/2011 |
| WO | 2011093854 | 8/2011 |
| WO | 2011/137980 | 11/2011 |
| WO | 2012060510 | 5/2012 |
| WO | 2012/079694 | 6/2012 |
| WO | 2012074940 A2 | 6/2012 |
| WO | 2012/112889 | 8/2012 |
| WO | 2012/142765 | 10/2012 |
| WO | 2012/151447 | 11/2012 |
| WO | 2013/014509 | 1/2013 |
| WO | 2013059695 | 4/2013 |
| WO | 2013/082575 | 6/2013 |
| WO | 2013103592 | 7/2013 |
| WO | 2013110375 A2 | 8/2013 |
| WO | 2013115668 A1 | 8/2013 |
| WO | 2013/136131 | 9/2013 |
| WO | 2014019755 A1 | 2/2014 |
| WO | 2014042580 | 3/2014 |
| WO | 2014053292 A2 | 4/2014 |
| WO | 2014059235 A1 | 4/2014 |
| WO | 2014065977 | 5/2014 |
| WO | 2014/124061 | 8/2014 |
| WO | 2014/167795 | 10/2014 |
| WO | 2014154405 A1 | 10/2014 |
| WO | 2014159520 A1 | 10/2014 |
| WO | 2014159587 A1 | 10/2014 |
| WO | 2014160257 A1 | 10/2014 |
| WO | 2014164620 | 10/2014 |

(56) References Cited

FOREIGN PATENT DOCUMENTS

| | | | |
|---|---|---|---|
| WO | 2014164620 A1 | 10/2014 |
| WO | 2014165053 | 10/2014 |
| WO | 2014165053 A1 | 10/2014 |
| WO | 2014165144 A1 | 10/2014 |
| WO | 2014191157 A2 | 12/2014 |
| WO | 2015/040279 | 3/2015 |
| WO | 2015034987 A1 | 3/2015 |
| WO | 2015/059069 | 4/2015 |
| WO | 2015078829 A1 | 6/2015 |
| WO | 2015/135796 | 9/2015 |
| WO | 2015131940 A1 | 9/2015 |
| WO | 2015/158600 | 10/2015 |
| WO | 2015192005 A1 | 12/2015 |
| WO | 2016039655 A1 | 3/2016 |
| WO | 2016049712 | 4/2016 |
| WO | 2016050365 A1 | 4/2016 |
| WO | 2016050366 A1 | 4/2016 |
| WO | 2016050367 A1 | 4/2016 |
| WO | 2016050368 A1 | 4/2016 |
| WO | 2016050369 A1 | 4/2016 |
| WO | 2016/069242 | 5/2016 |
| WO | 2013103631 | 5/2016 |
| WO | 2016073245 A1 | 5/2016 |
| WO | 2016/087920 | 6/2016 |
| WO | 2016099975 A1 | 6/2016 |
| WO | 2016147419 | 9/2016 |
| WO | 2016/196144 | 12/2016 |
| WO | 2016204287 | 12/2016 |
| WO | 2017041147 | 3/2017 |
| WO | 2017065683 | 4/2017 |
| WO | 2017123132 A | 7/2017 |
| WO | 2017/146712 | 8/2017 |
| WO | 2017/147400 | 8/2017 |
| WO | 2017203447 | 11/2017 |
| WO | 2018/044690 | 3/2018 |
| WO | 2018/107279 | 6/2018 |
| WO | 2018106528 | 6/2018 |
| WO | 2018/210528 | 11/2018 |
| WO | 2018217969 A1 | 11/2018 |
| WO | 2018227068 A1 | 12/2018 |
| WO | 2019004910 | 1/2019 |
| WO | 2019060844 | 3/2019 |
| WO | 2019067618 | 4/2019 |
| WO | 2019086960 A1 | 5/2019 |
| WO | 2019/157341 | 8/2019 |
| WO | 2019155240 | 8/2019 |
| WO | 2019/178447 | 9/2019 |
| WO | 2020152485 | 7/2020 |
| WO | 2020153896 | 7/2020 |
| WO | 2020/186044 | 9/2020 |
| WO | 2020201843 | 10/2020 |
| WO | 2020/229901 | 11/2020 |
| WO | 2020/097714 | 12/2020 |
| WO | 2020239067 | 12/2020 |
| WO | 2020239068 | 12/2020 |
| WO | 2020239069 | 12/2020 |
| WO | 2020251980 A1 | 12/2020 |
| WO | 2021004882 | 1/2021 |
| WO | 2021013465 A1 | 1/2021 |
| WO | 2021096696 A1 | 5/2021 |
| WO | 2021107834 | 6/2021 |
| WO | 2022/061320 | 3/2022 |

OTHER PUBLICATIONS

Edwards, Alex, Dallas Innovates, Hunt Energy Network's New Venture Will Put 50 Batteries Across Texas, Giving ERCOT a Portfolio of Energy Generation, Apr. 1, 2021.
Guo, Boyun, Petroleum Enginnering, a Computer-Assisted Approach, Dec. 21, 2006.
Li, Tailu et al., Cascade utilization of low temperature geothermal water in oilfield combined power generation, gathering heat tracing and oil recovery, Applied Thermal Engineering 40 (2012).
Sherven, Bob, Automation Maximizes performance for shale wells, Oil&Gas Journal, 2013.
Hu, Kaiyong et al., A case study of an ORC geothermal power demonstration system under partial load conditions in Huabei Oilfield, China, ScientDirect, 2017.
Liu, Xiaolei et al., A systematic study of harnessing low-temperature geothermal energy from oil and gas reservoirs, Elsevier, ScienceDirect, Energy, 2017.
Wang, Kai, et al., A comprehensive review of geothermal energy extraction and utilization in oilfields, Elsevier, ScienceDirect, Journal of Petroleum Science and Engineering, 2017.
Cutright, Bruce L., The Transformation of Tight Shale Gas Reservoirs to Geothermal Energy Production, Bureau of Economic Geology University of Texas, Austin Texas, Jun. 14, 2011.
Khennich, Mohammed et al., Optimal Design of ORC Systems with a Low-Temperature Heat Source, Entropy 2012, 14, 370-389; doi:10.3390/e14020370.
Dambly, Benjamin W., et al., The Organic Rankine Cycle for Geothermal Power Generation, Geothermal Energy, 2007.
Obi, John Besong, State of art on ORC applications for waste heat recovery and micro-cogeneration for installations up to 100kWe, Elsevier, Energy Procedia 82 ( 2015 ) 994-1001.
Obafunmi, Jaiyejeje Sunday, Thermodynamic Analysis of Organic Rankine Cycles, Eastern Mediterranean University Jul. 2014, Gazimausa, North Cyprus.
Dong, Bensi et al., Potential of low temperature organic Rankine cycle with zeotropic mixtures as working fluid, Elsevier, ScienceDirect, Energy Procedia 105 ( 2017 ) 1489-1494.
Iqbal, MdArbab et al., Trilateral Flash Cycle (TFC): a promising thermodynamic cycle for low grade heat to power generation, Elsevier, ScienceDirect, Energy Procedia 160 (2019) 208-214.
Bao, Junjiang et al., A review of working fluid and expander selections for organic Rankine cycle, Elsevier, ScienceDirect, Renewable and Sustainable Energy Reviews 24 (2013) 325-342.
Ajimotokan, Habeeb A. et al., Trilateral Flash Cycle for Recovery of Power from a Finite Low-Grade Heat Source, Proceedings of the 24th European Symposium on Computer Aided Process Engineering— ESCAPE 24 Jun. 15-18, 2014, Budapest, Hungary. Copyright © 2014 Elsevier B.V.
Hung Tzu-Chen, et al., The Development and Application of a Small-Scale Organic Rankine Cycle for Waste Heat Recovery, IntechOpen, 2019.
Kong, Rithy et al., Thermodynamic performance analysis of a R245fa organic Rankine cycle (ORC) with different kinds of heat sources at evaporator, Elsevier, ScienceDirect, Case Studies in Thermal Engineering 13 (2019) 100385.
Lukawski, Maciej Z. et al., Impact of molecular structure of working fluids on performance of organic Rankine cycles (ORCs), Sustainable Energy Fuels, 2017, 1, 1098.
Saleh, Bahaa et al., Working fluids for low-temperature organic Rankine cycles, Elsevier, ScienceDirect, Energy 32 (2007) 1210-1221.
Brasz, Lars J. et al., Ranking of Working Fluids for Organic Rankine Cycle Applications, Purdue University, Purdue e-Pubs, (2004). International Refrigeration and Air Conditioning Conference. Paper 722.
Miller, Patrick C., Research uses landfill gas tech for Bakken flaring solution, The Bakken magazine, Sep. 16, 2015.
Electra Therm, Inc., Power+ Generator 4400B & 4400B+, Nov. 24, 2020.
Electratherm, Inc., Heat to Power Generation Base Load Renewable Energy, Mar. 2020.
Electra Therm, Inc., Power+ Generator, Nov. 25, 2020.
Electra Therm, Inc., Generating Clean Power From Waste Heat, Nov. 2020.
Electra Therm, Inc., Power+ Generator, May 19, 2020.
Sneary, Loy et al., Gulf Coast Green Energy, Flare Gas Reduction Trial Using an Organic Rankine Cycle Generator, Jan. 11, 2016.
Enertime, ORC for Industrial Waste Heat Recovery, Aug. 2017.
Enogia, Generate power from your waste heat thanks to our ORC, 2019.
UTC Power, PureCycle, 200 Heat-to-Electricity Power System, 2004.

(56) References Cited

OTHER PUBLICATIONS

Rank, MT3 machine, Dec. 17, 2018.
Heat Recovery Solutions, Clean Cycle Containerized Solution, 2009.
Triogen BV, Specification: E-Box Engine Application, Feb. 15, 2019.
International Search Report and Written Opinion for PCT/US2022/071327, dated Aug. 29, 2022.
International Search Report and Written Opinion for PCT/US2022/071328, dated Sep. 9, 2022.
International Search Report and Written Opinion for PCT/US2022/071329, dated Aug. 25, 2022.
"From Waste Heat to High Performance", PBOG (Permian Basin Oil and Gas Magazine), Apr. 26, 2013.
"Turning Waste Heat Into Clean Power; GNP's Expander System", Great Northern Power Corporation, 2022.
Ng et al., "Thermo-Economic Performance of an Organic Rankine Cycle System Recovering Waste Heat Onboard an Offshore Service Vessel", Journal of Marine Science and Engineering, May 14, 2020.
"First Flare Elimination Demonstration", ElectraTherm, 2022.
International Search Report and Written Opinion for PCT/US2022/071472, dated May 9, 2022.
International Search Report and Written Opinion for PCT/US2022/071475, dated May 17, 2022.
International Search Report and Written Opinion for PCT/US2022/071474, dated Jun. 10, 2022.
International Search Report and Written Opinion for PCT/US2022/071486, dated Jun. 14, 2022.
International Search Report and Written Opinion for PCT/US2022/071323, dated Jun. 28, 2022.
International Search Report and Written Opinion for PCT/US2022/071325, dated Jun. 28, 2022.
Invitation to Pay Additional Fees and Communication Relating to Results of Partial International Search for PCT/US2022/071329, dated Jun. 27, 2022.
Invitation to Pay Additional Fees and Communication Relating to Results of Partial International Search for PCT/US2022/071327, dated Jul. 4, 2022.
International Search Report and Written Opinion for PCT/US2022/071313, dated Jul. 5, 2022.
International Search Report and Written Opinion for PCT/US2022/071517, dated Jun. 27, 2022.
International Search Report and Written Opinion for PCT/US2022/071484, dated Jun. 27, 2022.
International Search Report and Written Opinion for PCT/US2022/071319, dated Jul. 12, 2022.
International Search Report and Written Opinion for PCT/US2022/071480, dated Aug. 3, 2022.
International Search Report and Written Opinion for PCT/US2022/071482, dated Aug. 2, 2022.

* cited by examiner

SYSTEMS AND METHODS UTILIZING GAS TEMPERATURE AS A POWER SOURCE

CROSS REFERENCE TO RELATED APPLICATIONS

This application is a continuation of U.S. Non-Provisional application Ser. No. 17/934,339, filed Sep. 22, 2022, titled "SYSTEMS AND METHODS UTILIZING GAS TEMPERATURE AS A POWER SOURCE," which is a continuation of U.S. Non-Provisional application Ser. No. 17/715,400, filed Apr. 7, 2022, titled "SYSTEMS AND METHODS UTILIZING GAS TEMPERATURE AS A POWER SOURCE," now U.S. Pat. No. 11,486,330, issued Nov. 1, 2022, which is a continuation of U.S. Non-Provisional application Ser. No. 17/578,520, filed Jan. 19, 2022, titled "SYSTEMS AND METHODS UTILIZING GAS TEMPERATURE AS A POWER SOURCE," now U.S. Pat. No. 11,326,550, issued May 10, 2022, which claims priority to and the benefit of U.S. Provisional Application No. 63/261,601, filed Sep. 24, 2021, titled "SYSTEMS AND METHODS UTILIZING GAS TEMPERATURE AS A POWER SOURCE," and U.S. Provisional Application No. 63/200,908, filed Apr. 2, 2021, titled "SYSTEMS AND METHODS FOR GENERATING GEOTHERMAL POWER DURING HYDROCARBON PRODUCTION," the disclosures of which are incorporated herein by reference in their entireties.

FIELD OF DISCLOSURE

Embodiments of this disclosure relate to generating electrical power from heat of a flow of gas, and more particularly, to systems and methods for generating electrical power in an organic Rankine cycle (ORC) operation in the vicinity of a pumping station during gas compression to thereby supply electrical power to one or more of operational equipment, a grid power structure, and an energy storage device.

BACKGROUND

Typically, an organic Rankine cycle (ORC) generator or unit includes a working fluid loop that flows to a heat source, such that the heat from the heat source causes the working fluid in the loop to change phases from a liquid to a vapor. The vaporous working fluid may then flow to a gas expander, causing the gas expander to rotate. The rotation of the gas expander may cause a generator to generate electrical power. The vaporous working fluid may then flow to a condenser or heat sink. The condenser or heat sink may cool the working fluid, causing the working fluid to change phase from the vapor to the liquid. The working fluid may circulate through the loop in such a continuous manner, thus the ORC generator or unit may generate electrical power.

SUMMARY

As noted organic Rankine cycle (ORC) generators or units may generate electrical power via an ORC operation based on heat transfer to a working fluid. While various types of sources of heat may be utilized, there is currently no system, method, or controller available to ensure that the source of the heat is maintained at a specified temperature after heat transfer via a heat exchanger, whether internal or external to the ORC unit. For example, when a flow of gas or process gas, such as a flow of compressed gas from a pumping station, is used as the source of heat for heat transfer to the working fluid or an intermediate working fluid, a specified or selected operating temperature range or a specified threshold temperature for the gas may be desired. For example, for some gasses, if the temperature drops below a particular threshold or operating range, volatiles may begin to condense in the flow of gas. Such condensed volatiles may cause issues such as damage to pipelines (e.g., via corrosion or otherwise), scaling, precipitates, potential leaks, potential equipment performance issues, and/or damage to equipment configured to operate with gases rather than liquids. While volatiles may condense in the flow of gas at a temperature below a threshold, pumps at a site may operate at a higher level or exhibit higher performance for a flow of gas that is at a reduced temperature higher than the temperature at which volatiles condense, but lower than a temperature defined by a compressor's (e.g., such as a pump) performance in relation to temperature of the flow of gas, the two temperatures, in some embodiments, defining the operating range.

Accordingly, Applicants have recognized a need for systems and methods to generate electrical power in the vicinity of a pumping station or other gas processing facility or site, while maintaining the temperature of a flow of gas, to thereby supply electrical power to one or more of operational equipment, a grid power structure, and an energy storage device. The present disclosure is directed to embodiments of such systems and methods.

As noted, the present disclosure is generally directed to systems and methods for generating electrical power in an organic Rankine cycle (ORC) operation in the vicinity of a pumping station or other facility or site where a gas is compressed and/or processed. As gas is compressed at the pumping station or other facility or site for further transport, processing, storage, or other purposes, the temperature of the gas may increase. Further, the equipment (e.g., an engine and pump) utilized for compression may generate heat (e.g., in the form of exhaust and/or a water jacket) during compression or operation. As such, one or more heat exchangers, included external or internal to an ORC unit, may be positioned at and/or near the equipment or pipelines associated with the flow of gas. The flow of gas may flow through one of the one or more heat exchangers. One or more temperature sensors associated with the input and output of the heat exchanger may measure the temperature of the gas. As the gas flows through the heat exchanger, the temperature of the gas entering and exiting the heat exchanger may be determined, e.g., via temperature sensors. Further, at pumping stations or other facilities or sites existing gas coolers (e.g., an air-cooler) may be included to cool the gas prior to transport, processing, storage, or other purposes.

However, as noted, if the temperature of the gas is lowered below an operating range, then volatiles may begin to condense and/or condensates may begin to form in the flow of gas. Further, if the gas is above the operating range, then a compressor may output lower than the maximum volume of gas. To ensure that the gas is not cooled below the operating range defined by a temperature at which volatiles condense and/or condensates form and/or above a temperature defined by higher compressor output, the systems and methods may include a bypass valve positioned on a bypass pipeline. The bypass pipeline may connect a supply pipeline to a return pipeline. The supply pipeline may connect to a main pipeline to divert the flow of gas to the heat exchanger. The return pipeline may connect the heat exchanger to the main pipeline downstream the supply pipeline/main pipeline connection point thereby allowing the flow of gas to flow from the heat exchanger back to the main pipeline. The heat exchanger may facilitate transfer of heat from the flow of gas to a working fluid or intermediate working fluid. In response to the temperature of the gas being above or below an operating range, the bypass valve may be adjusted thereby preventing diversion of or diverting a portion of the flow of gas and thus reducing or increasing, respectively, the temperature of the flow of gas exiting the heat exchanger and ensuring that volatiles do not condense in the flow of gas and that a compressor operates efficiently. Further, an amount or rate of working fluid flowing through the heat exchanger may be increased or decreased thereby to decrease or increase, respectively, the temperature of the flow of gas. The adjustment of the bypass valve and/or flow of working fluid through the heat exchanger may be based on the inlet temperature of the flow of gas into the heat exchanger, the outlet of the flow of gas from the heat exchanger, the temperature of the gas prior to entering the gas cooler, the temperature of the gas after exiting gas cooler, a predicted temperature of the gas exiting the gas cooler, the temperature of the working fluid or intermediate working fluid exiting the heat exchanger, the flow rate of the working fluid or intermediate working fluid exiting the heat exchanger, or electrical power output of an ORC unit, or some combination thereof, among other factors.

As noted, heat generated from the equipment on-site may be utilized to generate electricity. For example, an engine may produce exhaust. The exhaust may be at a high temperature. The exhaust may be supplied to another heat exchanger, external to the ORC unit or included in another ORC unit. the engine may include a water jacket. The heated water from the water jacket may be supplied to a third heat exchanger, external to the ORC unit or included in a third ORC unit.

Accordingly, an embodiment of the disclosure is directed to a method for generating power in an organic Rankine cycle (ORC) operation to supply electrical power to one or more of operational equipment, a grid power structure, or an energy storage device. The method may include sensing, via an inlet temperature sensor, an inlet temperature of a flow of compressed gas from a source to a heat exchanger. The source may be connected to a main pipeline. The main pipeline may be connected to a supply pipeline. The supply pipeline may be connected to the heat exchanger thereby to allow compressed gas to flow from the source to the heat exchanger. The heat exchanger may be positioned to transfer heat from the flow of compressed gas to a flow of a working fluid thereby to cause an ORC unit to generate electrical power. The method may include sensing, via an outlet temperature sensor, an outlet temperature of the flow of the compressed gas from the heat exchanger to a return pipeline. The inlet temperature and the outlet temperature may be determined for a plurality of heat exchangers, each of the plurality of heat exchangers supplying heated working fluid to a supply manifold. The method may include adjusting a bypass valve to a position sufficient to maintain the temperature of the flow of compressed gas within a selected operating temperature range. The bypass valve may be positioned on a bypass pipeline. The bypass pipeline may be positioned to connect the supply pipeline to the return pipeline. The bypass pipeline may be positioned to allow or prevent, via the bypass valve, a portion of the flow of compressed gas therethrough, thereby to cause or prevent the flow of compressed gas to be diverted directly from the supply pipeline to the return pipeline to adjust temperature of the flow of compressed gas from the heat exchanger. In some examples, the supply manifold may supply aggregated heated working fluid to the ORC unit. The ORC unit may return cooled working fluid to a return manifold. The return manifold may transport an amount of cooled working fluid to each of the plurality of heat exchangers.

In an embodiment, the position of adjustment of the bypass valve may be based on one or more of (a) the selected operating temperature range, (b) a temperature drop of the flow of compressed gas, (c) the inlet temperature, or (d) the outlet temperature. The temperature drop of the flow of compressed gas may be the temperature drop of the flow of compressed gas after passage through exchanger gas cooler. The gas cooler may be an air-cooler. Further, the method may include sensing, via an ambient temperature sensor, the ambient temperature of an environment external to the main pipeline, the supply pipeline, the return pipeline, the heat exchanger, and the ORC unit. The method may also include determining the temperature drop of the flow of compressed gas after passage through the gas cooler based on the outlet temperature, the ambient temperature, and a predicted temperature drop differential. The temperature drop differential may be based on a type of the gas cooler and the ambient temperature.

In an embodiment, the heat exchanger may be included within the ORC unit. The heat exchanger may be an intermediate heat exchanger external from the ORC unit and the working fluid may be an intermediate working fluid. The source may include one or more compressors and wherein operation of the one or more compressors occurs via one or more engines. The method may include, during operation of the one or more compressors via one or more engines, transporting exhaust produced by one of the one or more engines to a second heat exchanger. The second heat exchanger may indirectly transfer heat from the exhaust to a flow of an intermediate working fluid, thereby to cause the ORC unit to generate electrical power. The method may include sensing, via an exhaust inlet sensor, an exhaust thermal mass of the exhaust produced by one of the one or more engines. The method may include, in response to the exhaust thermal mass being outside of an exhaust thermal mass range, adjusting an exhaust control valve to partially or fully prevent or allow flow of the exhaust from the one of the one or more engines to the second heat exchanger.

In another embodiment, the method may include, during operation of the one or more compressors via one or more engines, transporting a flow of heated coolant from a water jacket associated with one of the one or more engines to a second heat exchanger. The second heat exchanger may indirectly transfer heat from the heated coolant to a flow of an intermediate working fluid, thereby to cause the ORC unit to generate electrical power. The method may include, prior to transport of the heated coolant to the second heat exchanger: sensing, via a water jacket inlet temperature sensor, a heated coolant temperature of the flow of heated coolant from the water jacket; and, in response to the heated coolant temperature being outside of a water jacket temperature range, adjusting a water jacket control valve to prevent or allow flow of the heated coolant from the water jacket to the second heat exchanger.

In another embodiment, the operational equipment may include one or more of on-site (1) pumps, (2) heat exchanger, or (3) controllers. The compressed gas may include one or more of compressed (1) natural gas, (2) renewable natural gas, (3) landfill gas, and (4) organic waste gas.

Other embodiments of the disclosure are directed to a method for generating power in an organic Rankine cycle (ORC) operation in the vicinity of a pumping station during gas compression and transport thereby to supply electrical power to one or more of operational equipment, a grid power structure, or an energy storage device. The operations of the method described may be performed during one or more stage gas compressions via one or more compressors located at a pumping station and for each of the one or more compressors associated with the pumping station. The method may include sensing, via an inlet temperature sensor, a first temperature of a flow of gas from a source to a first heat exchanger. The source may be connected to the first heat exchanger via a supply pipeline. The method may include, in response to a determination that the first temperature is at or above a threshold, maintaining a heat exchanger control valve position. The heat exchanger control valve may be positioned on the supply pipeline and control flow of gas to the first heat exchanger. The threshold may indicate that the gas is at a temperature to heat an intermediate working fluid. The first heat exchanger may indirectly transfer heat from the flow of gas to a flow of an intermediate working fluid thereby to cause an ORC unit to generate electrical power. The method may include sensing, via an outlet temperature sensor, a second temperature of a flow of the gas from the first heat exchanger to a return pipeline. The method may include, in response to a determination that the second temperature is within a selected operating temperature range, adjusting a bypass valve to a position sufficient to maintain temperature of the flow of gas within the selected operating temperature range, the bypass valve positioned on a bypass pipeline, the bypass pipeline connecting the supply pipeline to a return pipeline and being positioned prior to the heat exchanger control valve. The method may include, during operation of the one or more compressors via one or more engines and for each of the one or more engines, transporting exhaust produced by one of the one or more engines to a second heat exchanger, the second heat exchanger to indirectly transfer heat from the exhaust to a flow of an intermediate working fluid, thereby to cause the ORC unit to generate electrical power.

In an embodiment, the heat transferred from the exhaust to the intermediate working fluid of the second heat exchanger may be utilized in a hot fluid intake of the ORC unit. The heat transferred from the flow of gas to the intermediate working fluid of the first heat exchanger may be utilized in a warm fluid intake of the ORC unit.

Other embodiments of the disclosure are directed to a method for generating power in an organic Rankine cycle (ORC) operation to supply electrical power to one or more of operational equipment, a grid power structure, or an energy storage device. The method may include determining an inlet temperature of a flow of compressed gas from a source to a heat exchanger. The source may be connected to a main pipeline. The main pipeline may be connected to a supply pipeline. The supply pipeline may be connected to the heat exchanger thereby to allow compressed gas to flow from the source to the heat exchanger. The heat exchanger may be positioned to transfer heat from the flow of compressed gas to a flow of a working fluid, thereby to cause an ORC unit to generate electrical power. The method may include determining an outlet temperature of the flow of the compressed gas from the heat exchanger to a return pipeline. The method may include, in response to a determination that the outlet temperature is within a selected operating temperature range, one or more of: adjusting a bypass valve to a position sufficient to maintain temperature of the flow of compressed gas within the selected operating temperature range, or adjusting the flow of working fluid to a percentage sufficient to maintain temperature of the flow of compressed gas within a selected operating temperature range. The flow of working fluid may be adjusted to the percentage via a control valve being adjusted to a particular opened/closed position. The bypass valve may be positioned on a bypass pipeline. The bypass pipeline may be positioned to connect the supply pipeline to the return pipeline. The bypass pipeline may be positioned to allow via the bypass valve a portion of the flow of compressed gas therethrough, thereby to cause the flow of compressed gas to be diverted directly from the supply pipeline to the return pipeline to increase temperature of the flow of compressed gas from the heat exchanger.

Other embodiments of the disclosure are directed to a method for generating power during gas compression to supply electrical power to one or more of operational equipment, a grid power structure, or an energy storage device. The method may include sensing, via an inlet temperature sensor, an inlet temperature of a flow of compressed gas from a source to a heat exchanger. The source may be connected to a main pipeline. The main pipeline may be connected to a supply pipeline. The supply pipeline may be connected to the heat exchanger thereby to allow compressed gas to flow from the source to the heat exchanger. The heat exchanger positioned to transfer heat from the flow of compressed gas to a flow of a working fluid, thereby to generate electrical power. The method may include sensing, via an outlet temperature sensor, an outlet temperature of the flow of the compressed gas from the heat exchanger to a return pipeline. The method may include, in response to a determination that the outlet temperature is within a temperature range, adjusting a bypass valve to a position sufficient to maintain temperature of the flow of compressed gas within the temperature range. The bypass valve positioned on a bypass pipeline. The bypass pipeline positioned to connect the supply pipeline to the return pipeline. The bypass pipeline positioned to allow via the bypass valve a portion of the flow of compressed gas therethrough, thereby to cause the flow of compressed gas to be diverted directly from the supply pipeline to the return pipeline to increase temperature of the flow of compressed gas from the heat exchanger.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
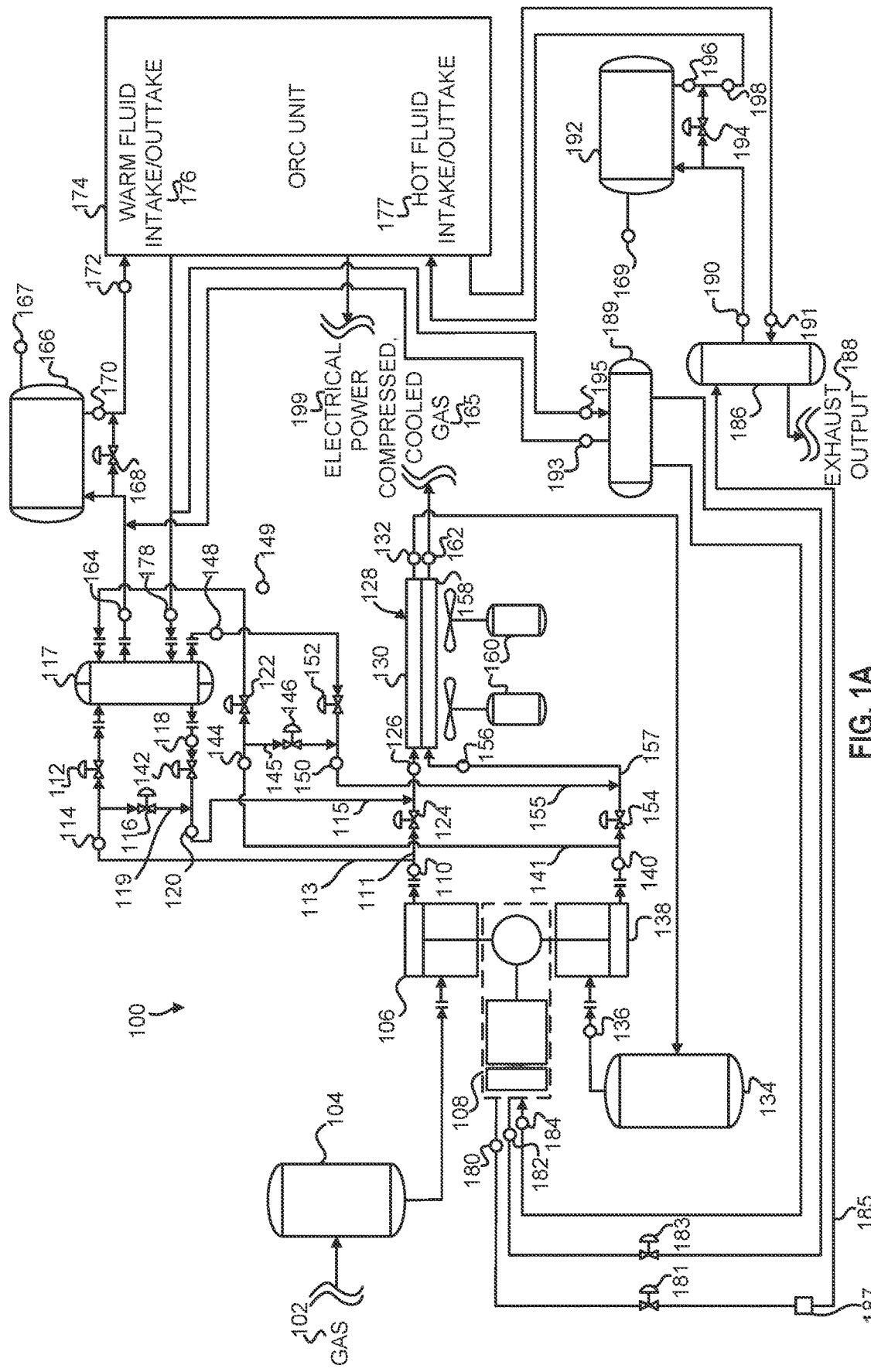
FIG. 1A, FIG. 1B, and FIG. 1C are block diagrams illustrating novel implementations of electrical power generation enabled facilities to provide electrical power to one or more of equipment, energy storage devices, and the grid power structure, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to systems and methods for generating electrical power (e.g., via an organic Rankine cycle (ORC) operation) based on heat from a flow of gas and other sources to thereby supply electrical power to one or more of equipment or operational equipment, a grid power structure, an energy storage device, and/or other devices. Transport or transfer of gas via pipeline typically includes compressing the gas one or more times prior to the transportation or transfer to ensure the gas is capable of flowing to the end destination. As the gas is compressed, the gas may become heated. Further, the equipment used to compress the gas may become heated or produce heat in various ways. In addition, prior to transport, the flow of gas is typically cooled. The flow of gas is cooled by a gas cooler (e.g., an on-site heat exchanger, such as an air-cooler). Such a gas cooler may operate at a set speed, while in other embodiments the gas cooler may operate at variable speeds, for example based on the temperature of the flow of gas entering the gas cooler and the desired temperature of the flow of gas exiting the air-cooler. The heat generated via the compression of the flow gas, as well as the heat produced by the equipment on-site may be utilized via either external and/or internal heat exchangers to produce electrical power (e.g., via one or more ORC units or other equipment configured to convert heat to electrical power).

In such examples, ORC generators or units typically use a pipeline in communication with heat sources to allow a working fluid to change phase from liquid to vapor. As the working fluid changes phase from a liquid to a vaporous state, the vaporous state working fluid may flow up the pipe or pipeline to a gas expander. The vaporous state working fluid may flow through and cause the gas expander to rotate. The rotation of the gas expander may cause a generator to generate electrical power, as will be described below. The vaporous state working fluid may flow through the gas expander to a heat sink, condenser, or other cooling apparatus. The heat sink, condenser, or other cooling apparatus may cool the working fluid thereby causing the working fluid to change phases from a vapor to a liquid.

In the present disclosure, a supply pipeline may be connected to a main pipeline to divert a flow of gas from the main pipeline. Downstream of the connection between the main pipeline and supply pipeline, a return pipeline may be connected to the main pipeline. The supply pipeline may connect to the inlet of a heat exchanger (e.g., the heat exchanger external or internal to an ORC unit) to allow the diverted gas to flow through the heat exchanger thereby facilitating transfer of heat from the flow of gas to a working fluid. The cooled gas may flow from the heat exchanger back to the main pipeline via the return pipeline. A supply control valve may be positioned on the supply pipeline and a return control valve may be positioned on the return pipeline, thereby to control flow to/from the heat exchanger. Temperature sensors and/or sensors or meters to measure other characteristics of the flow of gas may be disposed and/or positioned at various points at each of the pipelines. For example, a temperature sensor and/or the other sensors or meters may be disposed and/or positioned at or near the inlet and/or outlet of the heat exchanger and/or at varying other points along the main pipeline. Further, a bypass fluidic conduit, pipeline, section of pipeline, piping, or pipe may be positioned between and connect the supply pipeline to the return. A bypass valve may be positioned on the bypass fluidic conduit or pipeline thereby to divert a portion of the flow of gas from the heat exchanger. The portion of the flow of gas diverted from the heat exchanger may heat the remaining portion of the flow of gas from the heat exchanger. In addition to or rather than utilizing the bypass valve to maintain heat, the rate or amount of working fluid flowing through the heat exchanger may be adjusted (e.g., via a flow control device) to maintain or adjust a temperature of the flow of gas. The position or degree at which the bypass valve is opened/closed and/or the rate or amount of the flow of working fluid through the working fluid may be determined based on temperature measurements of the flow of gas, in addition to a threshold or operating range of the flow of gas and/or temperature and/or flow rate or amount of the flow of working fluid in the heat exchanger, among other factors. The threshold may be based on the temperature at which volatiles condense in a flow of gas (e.g., including, but not limited to, a dew point of the flow of gas). The operating range may be based, at least in part, on the same temperature of another selected temperature desired for the flow of gas. Thus, heat from the flow of gas may be utilized to generate electrical power in an ORC unit, while maintaining the temperature of the flow of gas above such a threshold or within such an operating range.

Additionally, and as noted, other equipment may produce heat in various ways. For example, one or more engines corresponding to and used to operate the compressors may produce exhaust. The exhaust produced may be output from one or more of the one or more engines at a high temperature. The exhaust produced by one or more of the one or more engines may be transported or transferred to a heat exchanger to transfer heat to a working fluid to produce electrical power in the ORC unit. In another embodiment, a water jacket may surround one of the one or more engines to cool that engine during operation. Heat emanating from or produced by the engine may be transferred to the fluid contained within the water jacket. The fluid within the water jacket may be transported or transferred to a heat exchanger to transfer heat to a working fluid to produce electrical power in the ORC unit.

Such systems may include various components, devices, or apparatuses, such as temperature sensors, pressure sensors or transducers, flow meters, control valves, smart valves, valves actuated via control signal, controllers, a master or supervisory controller, other computing devices, computing systems, user interfaces, in-field equipment, and/or other equipment. The controller may monitor and adjust various aspects of the system to ensure that a flow of gas does not drop below the threshold where volatiles may condense in the flow of gas, that the temperature of the flow of gas stays below the threshold where a compressor or pump provides a higher output, that the flow of gas remains within a selected operating range, that the working fluid remains within a selected operating range, and/or that electrical power is generated efficiently and economically.

Figure 1B:
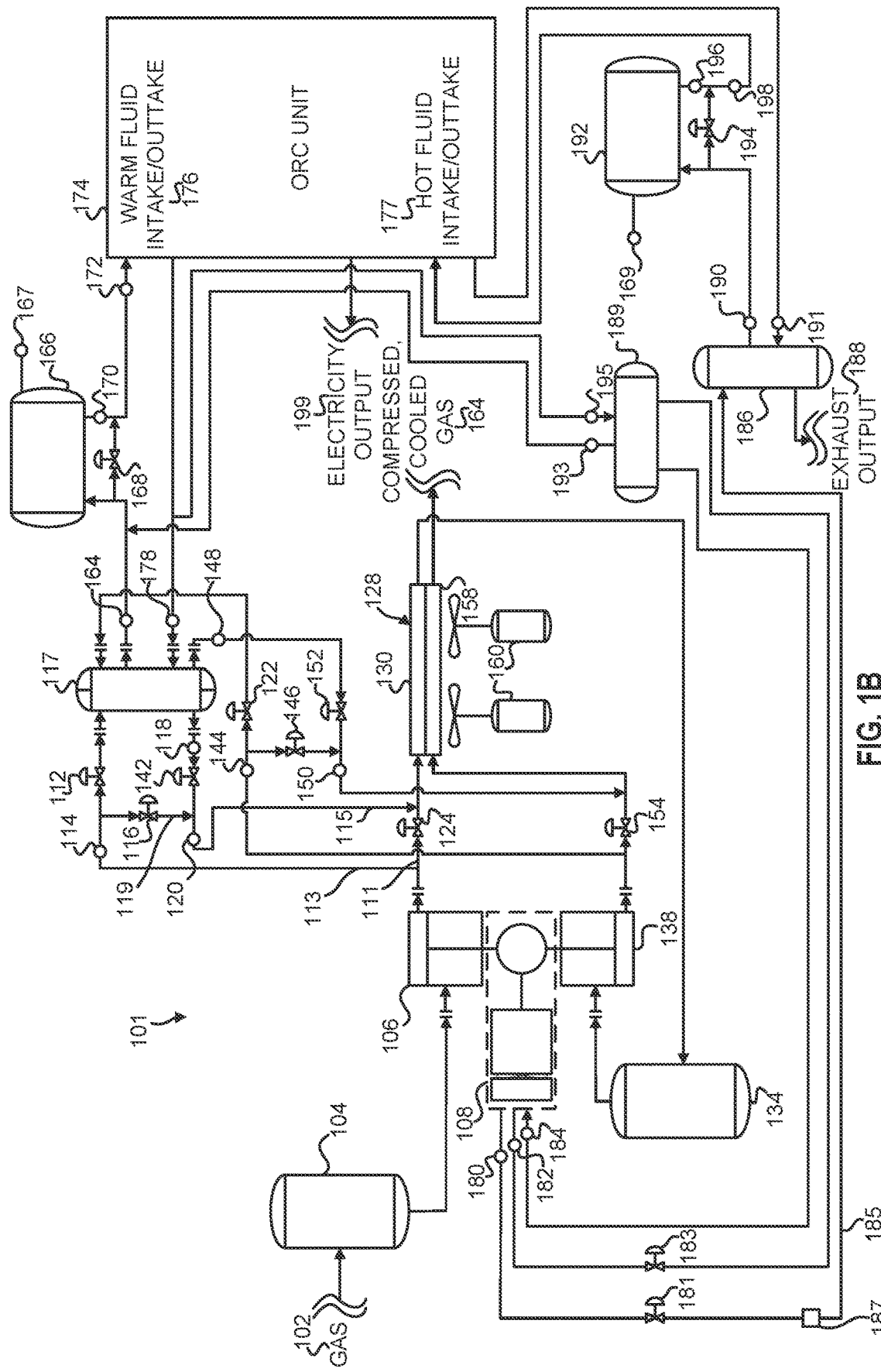
Figure 1C:
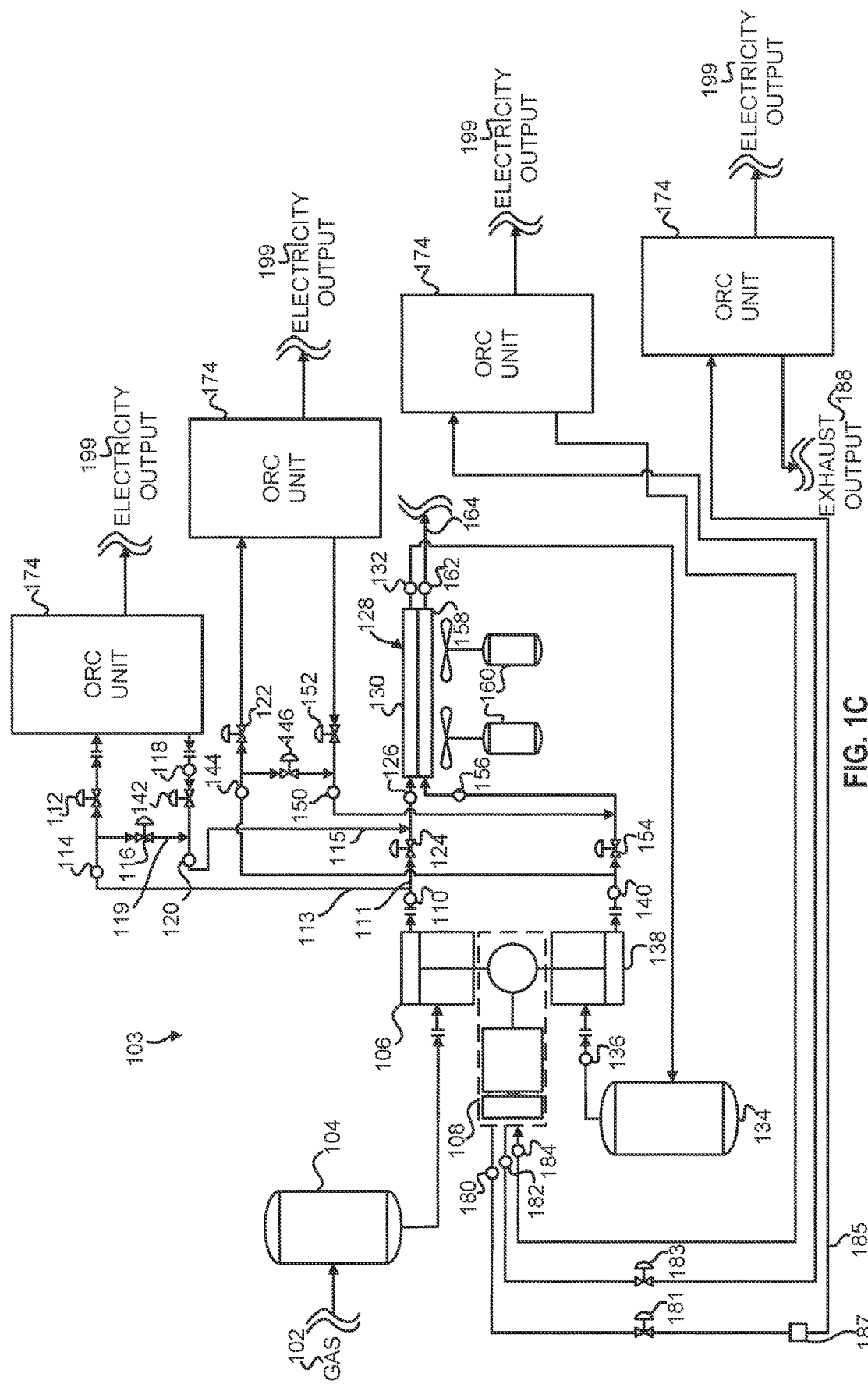

FIG. 1A, FIG. 1B, and FIG. 1C are block diagrams illustrating novel implementations of electrical power generation enabled facilities to provide electrical power to one or more of equipment, energy storage devices, and the grid power structure, according to one or more embodiments of the disclosure. As illustrated in FIG. 1A, a site 100, such as a pumping station, well, a landfill gas recovery facility, an agricultural gas recovery facility, a renewable natural gas facility, or other facility where gas is compressed prior to further transport or processing, may include an input pipeline for gas 102. The gas 102 may flow into a storage tank 104 or staging area. The gas 102 may flow directly to a compressor 106 or may flow from the storage tank 104 to the compressor 106. The compressor 106 may be driven or operated by an engine 108 or one or more engines. The compressor 106 may compress the flow of gas. A main pipeline 111 may be connected to or in fluid communication with the output of the compressor 106. In an embodiment, the main pipeline 111 may be an existing pipeline at the site 100. As an ORC kit or equipment is installed at the site, various other pipelines, sensors, valves, and/or other equipment may be added. For example, a supply pipeline 113 may be connected to the main pipeline 111 thereby creating fluid communication between the main pipeline 111 and the supply pipeline 113. A return pipeline 115 may be connected to the main pipeline 111 thereby creating fluid communication between the return pipeline 115 and the main pipeline 111. A main control valve 124 may be positioned on the main pipeline 111. The main control valve 124 may be positioned between the connection point between a supply pipeline 113 and the main pipeline 111 and a return pipeline 115 and the main pipeline 111. Further, a first main pipeline sensor 110 may be positioned prior to or before the main control valve 124 to measure the temperature of the flow of gas from the compressor 106. If the temperature of the flow of gas is at a temperature sufficient to cause the ORC unit 174 to generate electrical power, then the main control valve 124 may be fully or partially closed. Depending on the source of the gas and ambient temperature, among other factors, the temperature of the flow of gas after compression may be sufficient for use in, at least, a low temperature ORC operation to produce an amount of electrical power 199. The electrical power 199 may be transferred to the equipment at the site 100, to an energy storage device (e.g., if excess power is available), to equipment at other nearby sites, to the grid or grid power structure (e.g., via a transformer through power lines), to other types of equipment (e.g., cryptographic currency and/or blockchain miners, hydrolyzers, carbon capture machines, nearby structures such as residential or business structures or buildings, and/or other power destinations) or some combination thereof. In an embodiment, a low temperature or warm fluid ORC operation may include heat transfer (e.g., from the flow of gas or from an intermediate working fluid) to a working fluid of the ORC unit 174. The working fluid of the ORC unit 174 may be of a type that has a low vaporous phase change threshold. In other words, the working fluid may change from a liquid to a vapor at lower than typical temperatures.

If the main control valve 124 is closed or partially closed, the flow of gas or portion of the flow of gas may be diverted through the supply pipeline 113. The supply pipeline 113 may be connected to an inlet of a heat exchanger 117 (see FIGS. 1A and 1B) or directly connected to a warm fluid inlet or input of an ORC unit 174 (see FIG. 1C). Further, the heat exchanger 117 or ORC unit 174 may be connected to the supply pipeline 113 via a supply control valve 112. The heat exchanger 117 or a heat exchanger internal to the ORC unit 174 may include two or more fluidic paths. The flow of gas may travel through one of the fluidic paths in a first direction. A working fluid or intermediate working fluid may travel through a second fluidic path in an opposite direction. Such a configuration may facilitate transfer of heat from the flow of gas to the working fluid or intermediate working fluid. An intermediate working fluid may flow directly into an ORC unit 174 or into a storage tank 166. As noted, rather than an intermediate working fluid flowing into a heat exchanger (e.g., heat exchanger 117) external to the ORC unit 174, the flow of gas may flow directly into the ORC unit 174 (e.g., into a heat exchanger internal to the ORC unit 174). In such examples, the flow of gas, after compression, may be at a temperature of about 30° C. to about 150° C. The transfer of heat from the flow of gas to the working fluid may cause the working fluid to heat to temperatures of about 60° C. to about 150° C. In an embodiment, if the temperature of the flow of gas is below a threshold defined by a temperature sufficient to generate electrical power via the ORC unit, then one or more of the supply control valve 112, return control valve 142, and/or the main control valve 124 may close. In another embodiment, the amount of working fluid flowing through the heat exchanger 117 may be adjusted (e.g., via a flow control device). If the temperature of the flow of gas is lower than sufficient to cause generation of electrical power, the flow of working fluid may be increased for a selected amount of time. After the selected amount of time has passed, the temperature of the working fluid may be determined so that further adjustments may be made to ensure generation of electrical power.

In an embodiment, a storage tank 166 may be positioned between the heat exchanger 117 and the ORC unit 174 store heated intermediate working fluid. If the intermediate working fluid is at a temperature above a high temperature threshold or below a low temperature threshold or within a working fluid operating range, then the intermediate working fluid may be stored in the storage tank 166, until the correct temperature is reached. Otherwise, an intermediate working fluid valve 168 may be opened, allowing the intermediate working fluid to flow into the ORC unit 174. In another embodiment, the intermediate working fluid valve's position may be determined based on the temperature and/or pressure of the intermediate working fluid, e.g., as measured by a heat exchanger outlet temperature sensor 164, a storage tank outlet temperature and/or pressure sensor 170, an ORC unit inlet temperature sensor 172, a heat exchanger inlet temperature sensor 178, a temperature measured in the ORC unit 174, and/or other pressure sensors positioned throughout. Additional temperature sensors, pressure sensors or transducers, or other suitable sensor or measurement devices may be disposed or positioned throughout the site 100. In an embodiment, the storage tank 166 may be an expansion tank, such as a bladder or diaphragm expansion tank. The expansion tank may accept a varying volume of the intermediate working fluid as the pressure within the working fluid pipeline varies, as will be understood by a person skilled in the art. Thus, the expansion tank may manage any pressure changes exhibited by the intermediate working fluid.

As noted, the flow of gas may be maintained at a temperature above a threshold to ensure that volatiles do not condense in the flow of gas, below a threshold to ensure that a downstream compressor or pump (e.g., compressor 138) outputs a higher rate of flow of the gas, or within a selected operating range to ensure a maximum amount of electrical power is generated (e.g., a temperature of the gas such that the working fluid is heated to about 60 degree Celsius to about 170 degrees Celsius or higher, while maintaining the lowest potential temperature of the gas). Such volatiles may include ethanes, propanes, butanes, heavier straight-chain alkanes having 7 to 12 carbon atoms, thiols or mercaptans, carbon dioxide, cyclohexane, other naphthenes, benzene, toluene, xylenes, ethylbenzene, and/or other high alkanes. In addition, the water may condense in the flow of gas at or below such a threshold. Such volatiles and condensates may lead to scaling, precipitates, corrosion, inefficient performance of operational equipment, and/or malfunction or other issues with operational equipment (e.g., pumps, valves, etc.). To maintain the temperature above and/or below a threshold or within a selected operating range, the site 100 may include a bypass fluidic conduit 119 or pipeline/section of pipeline connecting the supply pipeline 113 to the return pipeline 115. A bypass control valve 116 may be positioned on the bypass fluidic conduit 119 or pipeline/section of pipeline. The temperature of the flow of gas in the supply pipeline 113 (e.g., provided or sensed via temperature sensor 114) and the flow of gas in the return pipeline 115 (e.g., provided or sensed via temperature sensor 118 and/or temperature sensor 120) may be determined. Such measurements may indicate that the temperature of the flow of the gas is too low or below the threshold defined by the temperature at which volatiles begin to condense in the flow of gas, that the flow of gas is too high or above the threshold defined by the temperature at which the compressor or pump (e.g., compressor 138) does not output a higher rate of flow of gas, and/or that the temperature of the flow gas is not within a selected operating range. Based on such determinations, indications, and/or other factors, the bypass control valve 116, by opening to a specified position or degree, may divert a portion of the flow of gas from the heat exchanger 117. In other words, a portion of the flow of gas may flow directly from the supply pipeline 113 to the return pipeline 115 thereby increasing or decreasing the temperature of the flow of gas, such a temperature indicated or measured by temperature sensor 120. One or more adjustments of the bypass control valve 116 may occur until the temperature of the flow of gas is above the threshold or within the selected operating range. Other factors for determining the position of the bypass control valve 116 may include the temperature of flow of gas in the supply pipeline 113, the temperature of the flow of gas in the return pipeline 115, the temperature of the flow of gas after exiting a compressor 106 (e.g., as measured by temperature sensor 110), the temperature of the flow of gas prior to entry into a gas cooler 128 (e.g., as measured by temperature sensor 126), the temperature of the flow of gas after passing through the gas cooler 128 (e.g., as measured by temperature sensor 132), a predicted temperature drop of the flow of gas after passage through the gas cooler 128 (e.g., through a first fluidic channel 130), the temperature of the flow of gas further downstream (e.g., for example, at temperature sensor 136, prior to passage into the compressor 138), and/or the amount of electrical power output 199 or generated by the ORC unit 174. Based on these measurements, the bypass control valve 116 may open/close to a specified degree. Other valves may open/close to adjust the flow of the gas to increase/decrease various temperatures for different purposes (e.g., increasing a temperature of a working fluid, increasing/decreasing a temperature of the flow of gas, etc.).

In an embodiment, rather than or in addition to controlling or maintaining temperature of the flow of gas via a bypass control valve, the temperature of the flow of gas may be controlled via the rate or amount of flow of working fluid flowing through the heat exchanger 117. The flow of working fluid through the heat exchanger 117 may be controlled via one or more flow control devices, such as pumps and/or control valves. As the rate or amount of flow of working fluid is increased or decreased, the amount of heat transferred from the flow of gas may increase or decrease, respectively. Thus, the temperature of the flow of gas may be decreased or increased in relation to the flow of working fluid.

In an embodiment, compression of the flow of gas may be performed one or more times. For each compression stage similar components may be included and may perform the same or similar operations for each different stage of compression. Further, the temperature at which a downstream compressor outputs higher rates of a flow of gas may be considered a threshold below or limit in the selected operating range which the temperature of the flow of gas is maintained in previous stages. For example, a flow of gas compressed via compressor 106 may be transported to storage tank 134 or directly to compressor 138 (e.g., a second compressor). The compressor 138 may be operated or driven by the same engine 108 or by a different engine. The compressor 138 may connect to a main pipeline 157. A supply pipeline 141 may connect to the main pipeline 157. Downstream of the supply line 141 and main pipeline 157 connection, the return pipeline 155 may connect to the main pipeline 157. A main control valve 154 may be positioned between the supply pipeline 141-main pipeline 157 connection and the return pipeline 155-main pipeline 157 connection. The main control valve 154 may be open when the ORC unit 174 is not operating and/or when the flow of compressed gas is not at a temperature (e.g., as measured via temperature sensor 140) sufficient to generate electrical power via the ORC unit. If the temperature of the flow of gas is sufficient to generate electrical power, the main control valve 154 may be closed and the flow of gas diverted to the supply pipeline 141.

The supply pipeline 141 and the return pipeline 155 may connect to the heat exchanger 117, to a separate heat exchanger, or directly to an ORC unit 174. A supply control valve 122 may be positioned on the supply pipeline 141 to control the flow of gas to the heat exchanger 117. A return control valve 152 may be positioned on the return pipeline 155 to control the flow of gas from the heat exchanger 117. The open/closed position of the supply control valve 122 and the return control valve 152 may be determined based on various characteristics of the flow of gas, such as the temperature of the flow of gas from the compressor 138 (e.g., as measured or sensed by the temperature sensor 140), the temperature of the flow of gas entering the heat exchanger 117 (e.g., as measured or sensed by the temperature sensor 144), the temperature of the flow of gas exiting the heat exchanger 117 (e.g., as measured or sensed by the temperature sensor 148 and/or temperature sensor 150), the temperature of the flow of gas before entering and/or exiting the on-site heat exchanger (e.g., as measured or sensed by the temperature sensor 156 and/or temperature sensor 162), and/or other characteristics measured or determined by other sensors disposed throughout the site 100. In an embodiment, the flow of gas may be comprised of one or more of natural gas, renewable natural gas, landfill gas, and organic waste gas.

Similar to the configuration described above, a bypass fluidic conduit 145 or pipeline may connect the supply pipeline 141 to the return pipeline 155. The flow of gas from the supply pipeline 141 to the return pipeline 155 may be controlled by a bypass control valve 146 positioned on the bypass fluidic conduit 145 or pipeline. The open/closed position of the bypass control valve 152 and/or the rate or amount of the flow of working fluid through the heat exchanger may be determined based on various characteristics of the flow of gas, such as the temperature of the flow of gas from the compressor 138 (e.g., as measured or sensed by the temperature sensor 140), the temperature of the flow of gas entering the heat exchanger 117 (e.g., as measured or sensed by the temperature sensor 144), the temperature of the flow of gas exiting the heat exchanger 117, (e.g., as measured or sensed by the temperature sensor 148 and/or temperature sensor 150), the ambient temperature of the site 100 (e.g., as measured or sensed by a temperature sensor 149 configured to measure ambient temperature) and/or other characteristics (flow, composition, density, pressure, etc.) measured, sensed, or determined by other sensors disposed throughout the site 100. FIGS. 1A through 1C illustrate a two-stage compression operation. In such operations, as the flow of gas passes through the fluidic channel 158 of the gas cooler 128, the compressed and cooled gas 165 may be output for transport to another pumping station, to further processing equipment, or for other uses/processing.

In an embodiment, the sensors and/or meters disposed throughout the site 100 may be temperature sensors, densitometers, density measuring sensors, pressure transducers, pressure sensors, flow meters, turbine flow meters, mass flow meters, Coriolis meters, spectrometers, other measurement sensors to determine a temperature, pressure, flow, composition, density, or other variables as will be understood by those skilled in the art, or some combination thereof. Further, the sensors and/or meters may be in fluid communication with a fluid to measure the temperature, pressure, or flow or may indirectly measure flow (e.g., an ultrasonic sensor). In other words, the sensors or meters may be a clamp-on device to measure flow indirectly (such as via ultrasound passed through the pipeline to the fluid).

As noted, the engine 108 or one or more engines may produce exhaust exhibiting high heat or temperature. The exhaust may be transported via an exhaust duct 185 or pipeline to a heat exchanger 186 or ORC unit 174. After the exhaust flows through the heat exchanger 186 or the ORC unit 174, the exhaust may be output to the atmosphere. In another embodiment, prior to output to the atmosphere, the exhaust may be filtered or passed through a catalyst to remove specific chemicals deemed harmful to the environment. In another embodiment, prior to input into the heat exchanger 186, the exhaust may be filtered or pass through a catalyst to prevent buildup within the heat exchanger 186. In an embodiment, the exhaust duct 185 or pipeline may include an exhaust valve 181. In an embodiment, the exhaust from the engine 108 may be at a high temperature or have a high thermal mass (e.g., temperature of the exhaust multiplied by the flow rate of the exhaust). If the temperature or thermal mass of the exhaust (e.g., as measured by temperature sensor 180) is outside of a range (e.g., defined by the operating temperature range of the heat exchanger 186, ORC unit 174, or other equipment or devices interacting with the exhaust and/or based on thermal mass) or above or below a threshold, the exhaust control valve 181 may close thereby partially or fully preventing the exhaust from flowing to the heat exchanger 186. If the exhaust control valve 181 is fully closed, the exhaust may be fully diverted to a typical exhaust output. If the exhaust control valve 181 is partially closed, the exhaust may be partially diverted to a typical exhaust output, while the remaining portion may flow to the heat exchanger 181. The partial or full prevention of the flow of exhaust to the heat exchanger 186 may prevent interruption of catalyst performance of the engine 108 and/or deposition of particulates in equipment.

In another embodiment, the flow of exhaust, prior to flowing through the heat exchanger 186, may pass through a filter 187, converter, or some other device to reduce particulates within the exhaust. As noted, the exhaust may cause scaling and/or deposition of such particulates. The filter 187 or other device may ensure that the heat exchanger 186 may not exhibit such scaling and/or deposition of particulates or may not exhibit the scaling and/or deposition at rates higher than if there were no filter 187 or other device.

The engine 108 or one or more engines may include a water jacket. As an engine 108 operates, the water or other coolant inside the water jacket may indirectly remove heat from the engine 108. Heat from the engine 108 may be transferred to the water or other coolant, thereby producing heated water or other coolant. The heated water or other coolant may pass through a radiator or other type of heat exchanger to reduce the temperature of heated water or coolant, the cooled water or coolant then flowing back to the water jacket to cool the engine 108. In an embodiment, the output of the water jacket may connect to a pipeline to divert the flow of water to the heat exchanger 189. A water jacket control valve 183 may be positioned on the pipeline to control the flow water or coolant from the water jacket. A pipeline may be connected to the input of the water jacket to return the water or other coolant to the water jacket. In such embodiments, rather than or in addition to the water or other coolant passing through the typical radiator or heat exchanger, the heated water or other coolant may pass through heat exchanger 189. In another embodiment, the engine's 108 water jacket may be configured to transport the water or other coolant directly to an ORC unit 174. In another embodiment, the water jacket control valve 183 may close if the water or other coolant is outside a selected operating range (e.g., if the water or other coolant is too cool, then, if utilized, water or other coolant may not be sufficient for the ORC unit 174 to generate electrical power, and/or if the water or coolant is too hot, then, if utilized, the heated water or other coolant may damage equipment not rated for a high temperature) thus preventing fluid from flowing to the heat exchanger 189 and/or the ORC unit 174. Temperature of the water or coolant may be determined or sensed via one or more temperature sensors (e.g., temperature sensors 182, 184). The temperature of the working fluid or intermediate working fluid may be determined or sensed via one or more temperature sensors (e.g., temperature sensors 193, 195).

In an embodiment, the heat may be transferred from the engine's 108 exhaust to an intermediate working fluid or a working fluid. The intermediate working fluid may be stored in another storage tank 192 or expansion tank. The temperature of the intermediate working fluid flowing from the heat exchanger 186 may be determined based on measurements from temperature sensors 190, 191. The temperature of the intermediate working fluid may be measured at various other points, such as after the storage tank or the storage tank control valve 194 (e.g., temperature sensor 196 and/or temperature sensor 198), or prior to entry into the heat exchanger 186. Based on these measurements, the storage tank control valve 194 may open or close to prevent or allow the storage tank 192 to fill up and/or to prevent over-filling the storage tank 192. In an embodiment, the storage tank 192 may be an expansion tank, such as a bladder or diaphragm expansion tank. The expansion tank may accept a varying volume of the intermediate working fluid as the pressure within the working fluid pipeline varies, as will be understood by a person skilled in the art. Thus, the expansion tank may manage any pressure changes exhibited by the intermediate working fluid.

In an embodiment, various temperature sensors and/or other sensors or meters may be disposed and/or positioned throughout the site 100, 101, 103. In another embodiment, the heat exchangers and/or ORC units may be added to the site as a kit. In such examples, and as illustrated in FIG. 1B, temperature sensors and/or other sensors or meters may be included in the added kit (e.g., along added or installed conduits or pipelines) installed at a site 101, rather than in existing equipment. As such, temperature drops of gas passing through gas coolers 128 may be predicted, rather than measured. Such predictions may be based on the temperature of the flow of gas from the heat exchanger 117, the temperature of the flow of gas entering the heat exchanger 117, the type of gas coolers 128, the type or types of gas in the flow of gas, the ambient temperature (e.g., as measured by temperature sensor 149, and/or temperatures of the flow of gas after further compression as measured by other temperature sensors. In an embodiment, the gas cooler 128 may be an air-cooler. The air-cooler may include one or more fans 160 to cool fluid flowing therethrough.

In an embodiment, different types of heat exchangers may be utilized at the site 100, 101. As noted, the heat exchanger may be internal to the ORC unit 174 and/or external to the ORC unit 174. In an embodiment, the heat exchanger 117, 186 may be a shell and tube heat exchanger, a spiral plate or coil heat exchanger, a heliflow heat exchanger, or another heat exchanger configured to withstand high temperatures. To prevent damage or corrosion to the heat exchanger 117, 186 over a period of time, the fluid path for the flow of gas may be configured to withstand damage or corrosion by including a permanent, semi-permanent, or temporary anti-corrosive coating, an injection point for anti-corrosive chemical additive injections, and/or some combination thereof. Further, at least one fluid path of the heat exchanger 117, 186 may be comprised of an anti-corrosive material, e.g., anti-corrosive metals or polymers.

In an example, the working fluid may be a fluid with a low boiling point and/or high condensation point. In other words, a working fluid may boil at lower temperatures (for example, in relation to water), while condensing at higher temperatures (e.g., in relation to water) as will be understood by a person skilled in the art. The working fluid may be an organic working fluid. The working fluid may be one or more of pentafluoropropane, carbon dioxide, ammonia and water mixtures, tetrafluoroethane, isobutene, propane, pentane, perfluorocarbons, other hydrocarbons, a zeotropic mixture of pentafluoropentane and cyclopentane, other zeotropic mixtures, and/or other fluids or fluid mixtures. The working fluid's boiling point and condensation point may be different depending on the pressure within the working fluid pipelines e.g., the higher the pressure, the higher the boiling point. In another example, an intermediate working fluid may be a fluid with a higher boiling point. For example, the intermediate working fluid may be a water or water glycol mixture. In such examples, as heat is transferred from the flow of gas, the exhaust, the fluid from the water jacket, and/or from another source, the intermediate working fluid may, rather than exhibiting a vaporous phase change, remain in a liquid phase, while retaining the transferred heat. As a liquid, the higher boiling point intermediate working fluid may be more manageable and/or easier to transport through the pipelines.

In an embodiment, the ORC unit 174 may include a generator, a gas expander, a condenser, an internal heat exchanger, and a loop for the flow of working fluid. As an intermediate working fluid or other fluid flows into the ORC unit 174, the internal heat exchanger may facilitate transfer of heat in the intermediate working fluid or other fluid to a working fluid of the ORC unit 174. The heat may cause the working fluid of the ORC unit 174 to exhibit a phase change from a liquid to a vapor. The vaporous working fluid may flow into the gas expander. In an example, the gas expander may be a turbine expander, positive displacement expander, scroll expander, screw expander, twin-screw expander, vane expander, piston expander, other volumetric expander, and/or any other expander suitable for an ORC operation or cycle. As gas flows through the gas expander, a rotor or other component connected to the gas expander may begin to turn, spin, or rotate. The rotor may include an end with windings. The end with windings may correspond to a stator including windings and a magnetic field (e.g., the end with windings and stator with windings being a generator). As the rotor spins within the stator, electricity may be generated. Other generators may be utilized, as will be understood by those skilled in the art. The generator may produce DC power, AC power, single phase power, or three phase power. The vaporous working fluid may then flow from the gas expander to a condenser, where the vaporous working fluid may exhibit a phase change back to the liquid working fluid. The liquid working fluid may then flow back to the internal heat exchanger, the process repeating.

The site 100, as shown utilizes an ORC unit 174 to generate electrical power. In another embodiment, rather than or in addition to the ORC unit 174, other geothermal-based generators may be utilized to generate electrical power using the heat transferred to the working fluid from the flow of gas, engine exhaust, and/or fluid from a water jacket. For example, the geothermal-based generator may be another type of binary-cycle generator.

Figure 2:
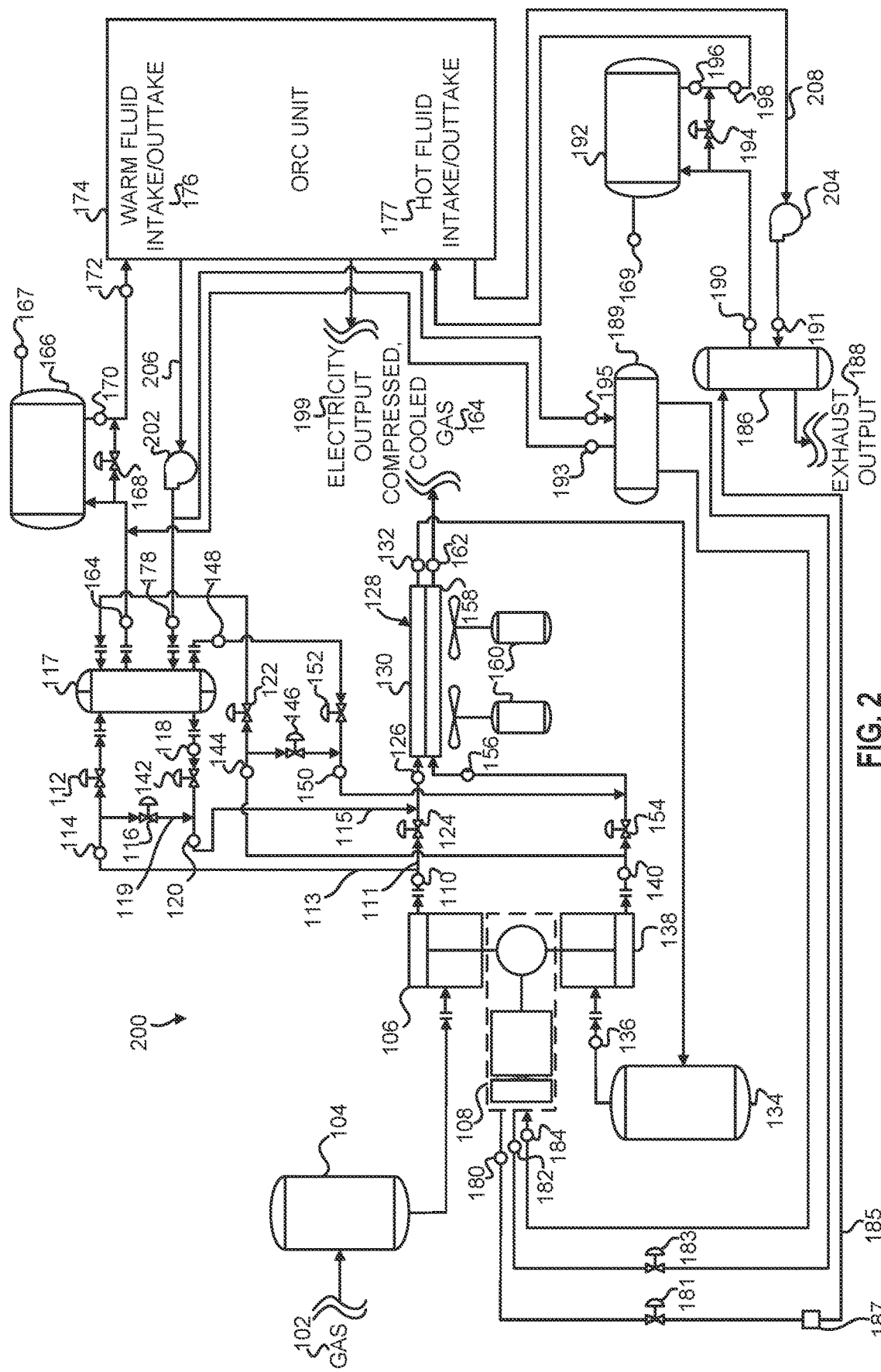
FIG. 2 is a block diagram illustrating a novel implementation of another electrical power generation enabled facility to provide electrical power to one or more of equipment, energy storage devices, and the grid power structure, according to one or more embodiments of the disclosure.

FIG. 2 is a block diagram illustrating a novel implementation of another electrical power generation enabled facility to provide electrical power to one or more of equipment, operational equipment, energy storage devices, and the grid power structure, according to one or more embodiment of the disclosure. In an embodiment, at site 200, the intermediate working fluid may be pumped back from the ORC unit 174 to each heat exchanger 117, 186, 189. In such examples, the working fluid return pipeline 206 may include a pump 202 or variable speed pump. The working fluid return pipeline 208 may include a pump 204 or variable speed pump. In another embodiment, rather than or in addition to a pump 202, 204, control valves may be disposed along the working fluid return pipeline 206 to control or further control the working fluid or intermediate working fluid flow. In another embodiment, and as will be described in further detail below, a supply manifold and a return manifold may be positioned between each heat exchanger 117, 186 and the ORC unit 174. In such examples, the intermediate working fluid flowing from each of the heat exchangers 117, 186 may be consolidated via the supply manifold, creating a single flow to the ORC unit 174. The intermediate working fluid may flow from the ORC unit 174 to the return manifold. From the return manifold, the intermediate working fluid may be controlled via flow control device to ensure that an amount of working fluid sufficient to maximize electrical output of the ORC unit and/or sufficient to maintain the temperature of the flow of gas flows to each heat exchanger 117, 186.

In an embodiment, the operational equipment may include equipment at the site. Operational equipment at the site may include pumps, fans (e.g., for gas cooler 128), one or more controllers, and/or other equipment at the site to either ensure proper operation or otherwise. Other equipment may include equipment to further process the flow of gas. In another embodiment, the electrical power generated may be used to power cryptographic currency and/or blockchain miners, hydrolyzers, carbon capture machines, nearby structures (e.g., residential or business structures or buildings), and/or other power destinations.

Figure 3A:
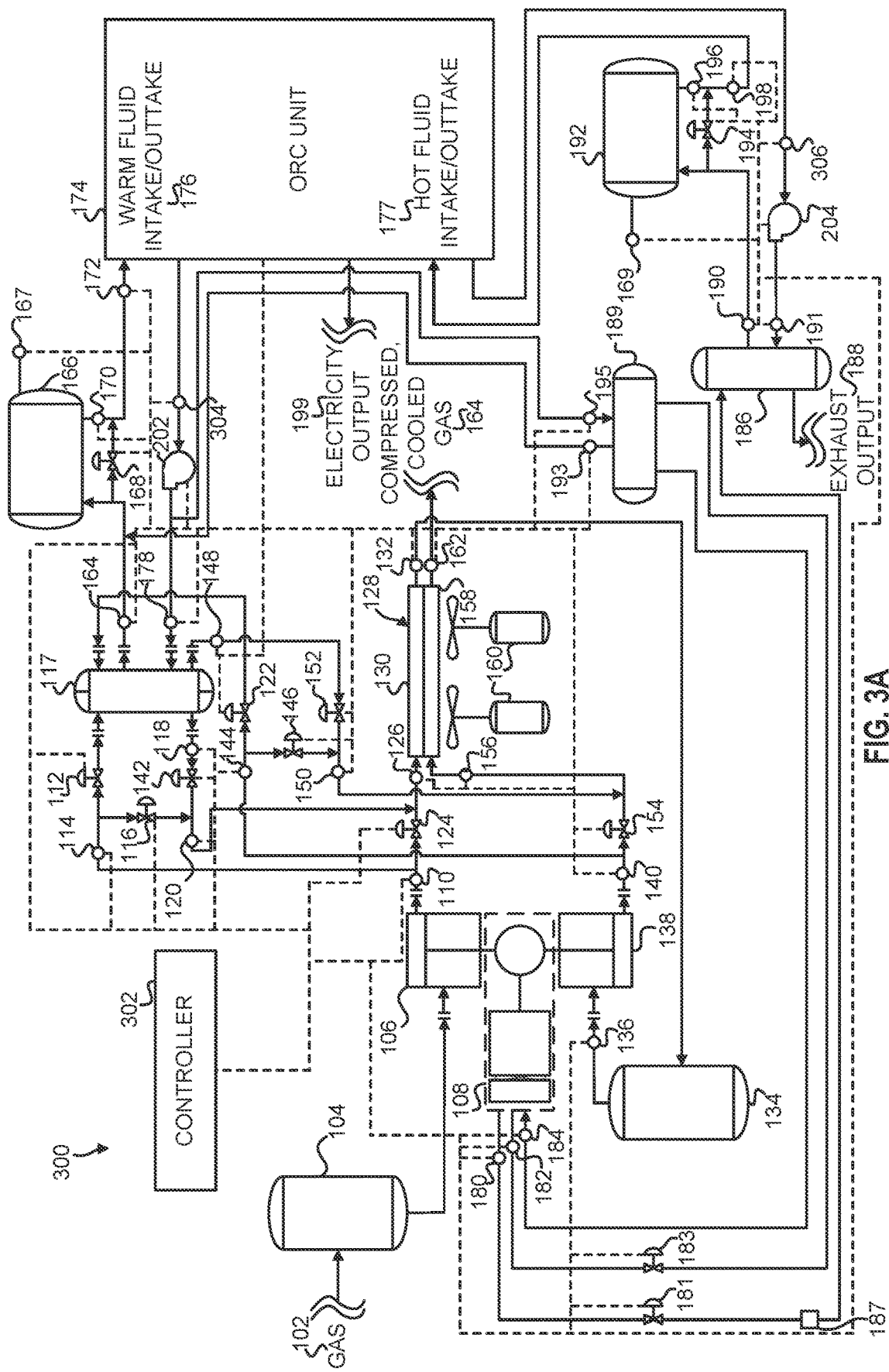
FIG. 3A and FIG. 3B are other block diagrams illustrating novel implementations of electrical power generation enabled facilities to provide electrical power to one or more of equipment, energy storage devices, and the grid power structure, according to one or more embodiments of the disclosure.
Figure 3B:
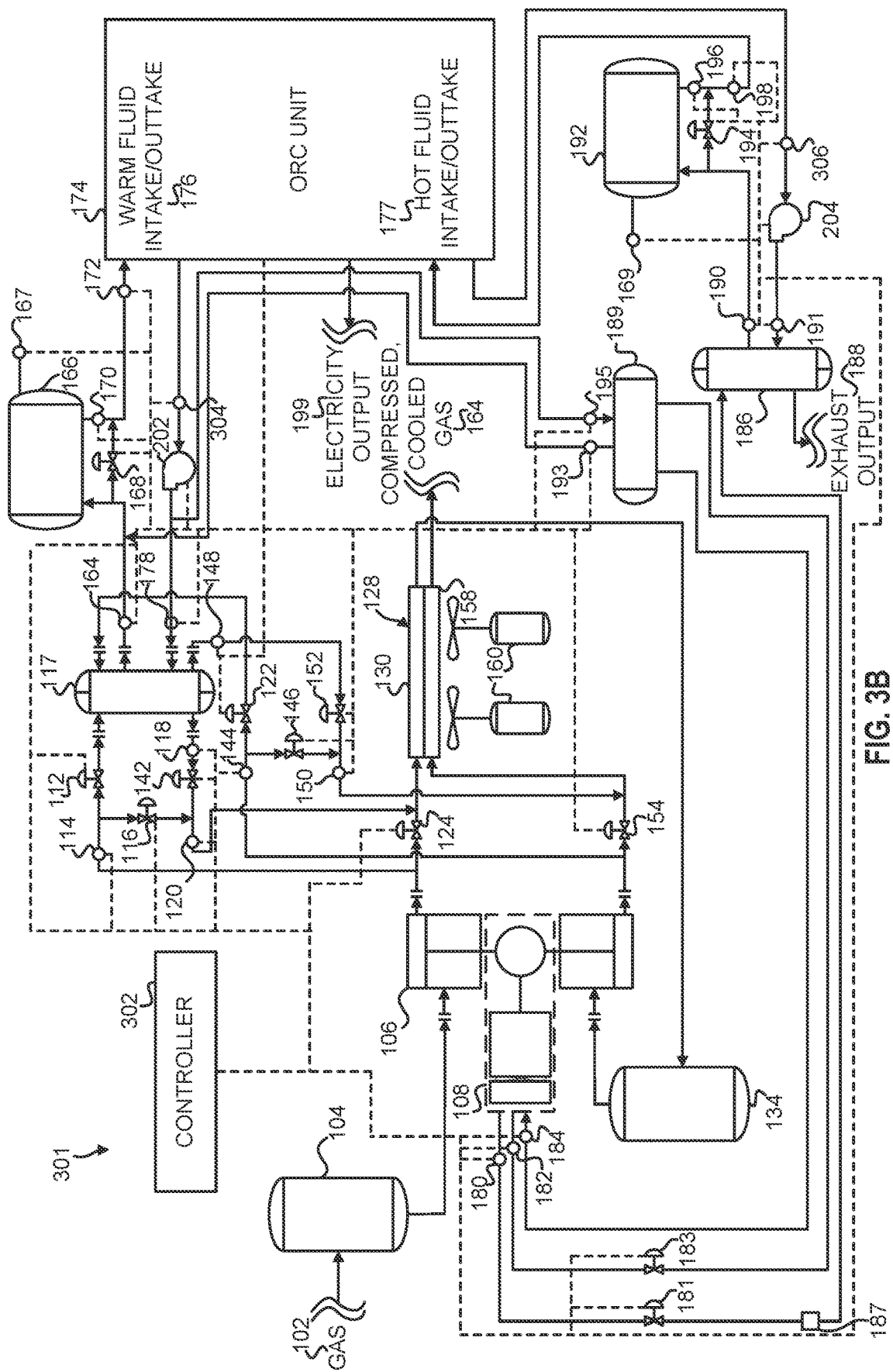

FIG. 3A and FIG. 3B are other block diagrams illustrating novel implementations of electrical power generation enabled facilities to provide electrical power to one or more of equipment, operational equipment, energy storage devices, and the grid power structure, according to one or more embodiment of the disclosure. As illustrated in FIG. 3A and FIG. 3B, the site 300, 301 may include a controller 302 to control operations of the control valves and other aspects of components or equipment at the site 300, 301 as described herein. In such examples, the controller 302 may include various inputs/outputs in signal communication with different components. For example, a set of inputs of the controller 302 may be in signal communication with the various temperature sensors disposed or positioned throughout the site 300, 301. The site 300, 301 may further include various other sensors in signal communication with the controller, such as flow meters, pressure sensors, pressure transducers, density meters, and/or other characteristics to measure various properties of the site 300, 301.

The controller 302 may include a set of inputs/outputs in signal communication with each of the control valves included in the site. The controller 302 may determine the current position of each valve (e.g., a degree at which control valve is open). Further, the controller 302 may adjust the position of each valve to a desired position, depending on different measured or determined characteristics of the site 300, 301, thus controlling the flow of gas or other fluids to different areas or equipment at the site 300, 301.

As noted, the equipment associated with the ORC unit 174 and/or each of the heat exchangers 117, 186 may be installed at a site 300, 301 as a kit. In an example, the controller 302 may connect to the equipment added at the site 301, rather than any temperature sensors or control valves already existing or installed at the site prior to installation of the kit.

As described, various valves and/or flow rates may be determined based on a threshold defined by a temperature at which volatiles may condense in the flow of gas, a threshold defined by a temperature where a compressor or pump provides a higher output of gas, and/or a selected operating temperature range or window defined by one or more temperatures (e.g., temperatures at which volatiles condense in the flow gas, where a compressor or pump provides a higher output of gas, the lowest potential temperature the flow of gas may be cooled to, and/or other temperatures of other fluids at the site). The controller 302 may determine such thresholds and/or temperature ranges. In another embodiment, the thresholds and/or operating ranges may be preset. In yet another embodiment, a user may enter the thresholds and/or operating ranges into the controller 302 via a user interface. The controller 302 may determine such thresholds and/or operating ranges based on the type of gas, the flow rate of the gas (e.g., determined by a flow meter positioned at the site), the density of the gas (e.g., determined by various sensors or meters positioned at the site), some other characteristics of the gas, the type of compressor or pump, and/or operating characteristics of the compressor or pump.

Figure 4A:
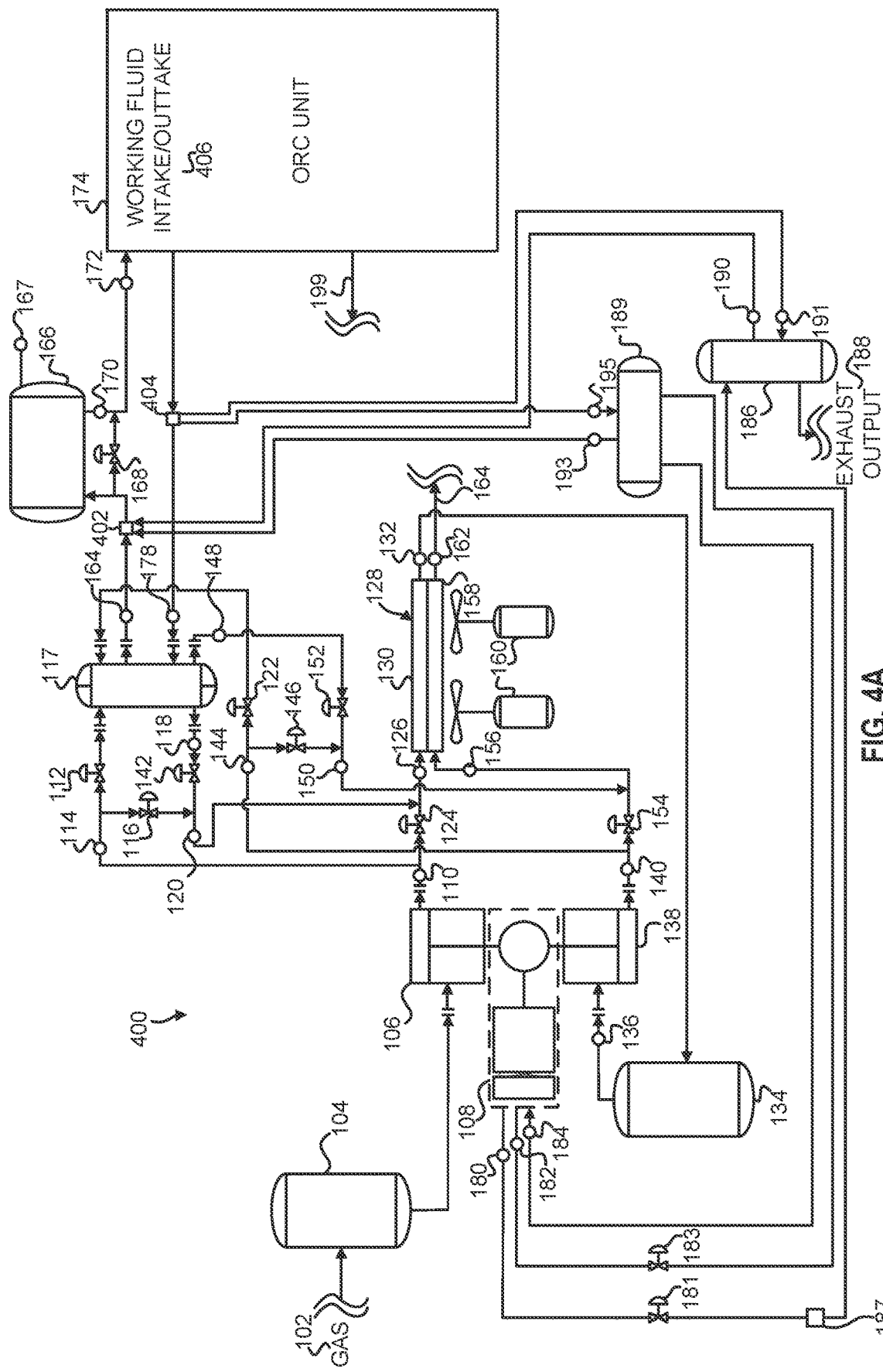
FIG. 4A and FIG. 4B are other block diagrams illustrating novel implementations of electrical power generation enabled facilities to provide electrical power to one or more of equipment, energy storage devices, and the grid power structure, according to one or more embodiments of the disclosure.
Figure 4B:
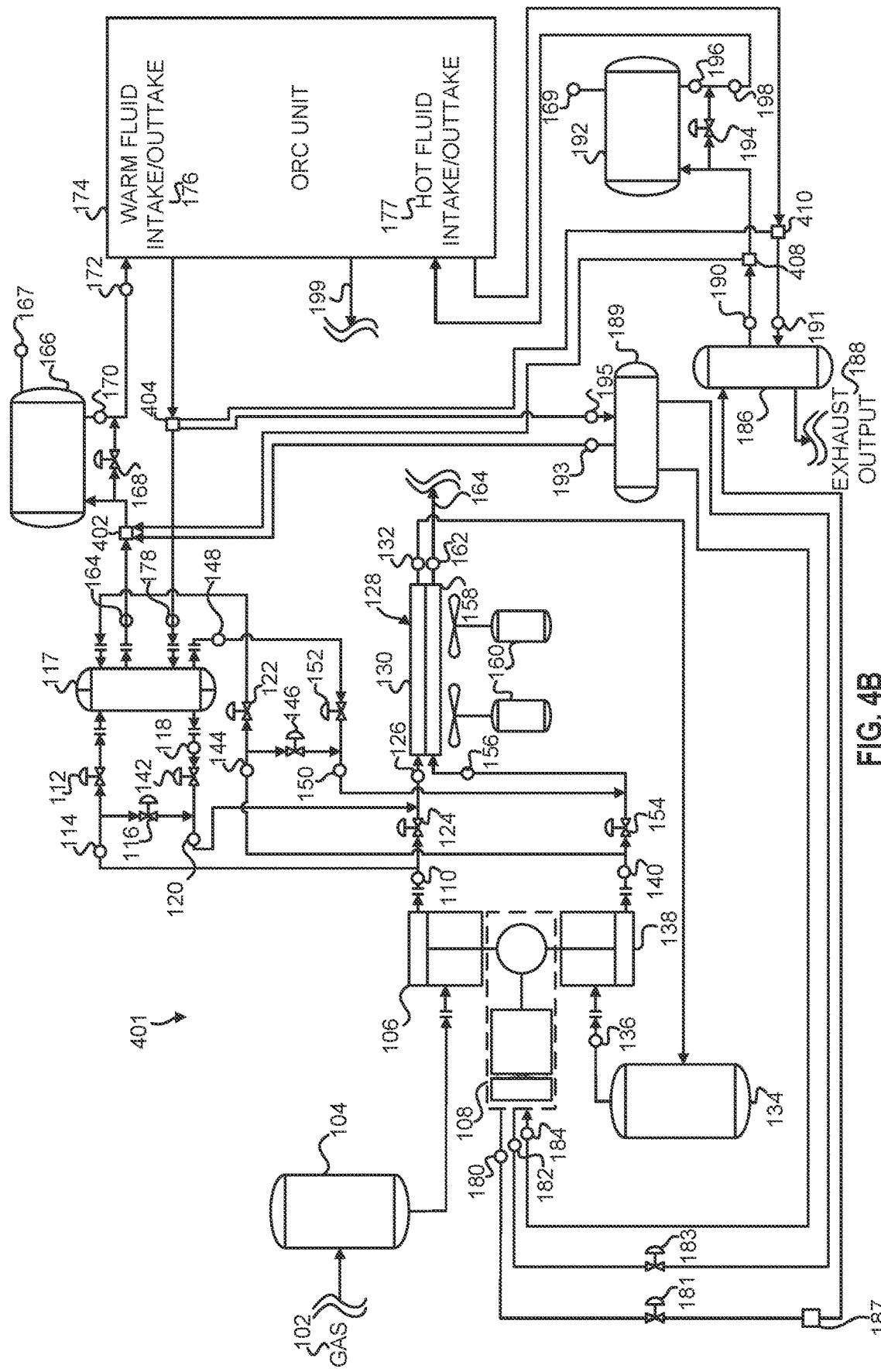

FIG. 4A and FIG. 4B are other block diagrams illustrating novel implementations of electrical power generation enabled facilities to provide electrical power to one or more of equipment, energy storage devices, and the grid power structure, according to one or more embodiment of the disclosure. In an embodiment, the ORC unit 174 may include a single water or other fluid intake/outtake 406 (see FIG. 4A) or may include a warm fluid intake/outtake 176 and/or a hot fluid intake/outtake 177 (see FIG. 4B). However, as the equipment at the site 400, 401 operates, if different equipment is utilized (e.g., types of engines or other equipment), if different gasses at different temperatures are compressed, and/or as the ambient temperature fluctuates. working fluid flowing through a particular heat exchanger (e.g., heat exchanger 117, heat exchanger 186, and/or another heat exchanger) may fluctuate from warm to hot or hot to warm. As such, if the ORC unit 174 includes a warm fluid intake/outtake 176 and a hot fluid intake/outtake 177 (e.g., as shown in FIG. 4B), then as temperatures fluctuate different working fluids may be diverted or redirected to the proper intake (e.g., warm or hot water intake). As illustrated, the heat exchanger 117, 186 may accept two different fluids (e.g., a first compressed and a second compressed gas or exhaust and water jacket fluid). In other embodiments, each heat source (e.g., flow of gas, engine exhaust, etc.) may pass through a single heat exchanger. Further, each heat exchanger 117, 186 may be brought to the site via a transportation vehicle, such as a truck. The heat exchanger 117, 186 may remain on the transportation vehicle during operation or may be installed or fixed to the site, for example on a skid.

In an embodiment and as illustrated in FIG. 4A, each heat exchanger, 117, 186, 189 may connect to a supply valve 402 or manifold to transport the flow of intermediate working fluid to the intake of an ORC unit 174. Further, each heat exchanger 117, 186, 189 may connect to a return valve 404 or manifold to receive the intermediate fluid from the ORC unit 174. In another embodiment, the supply valve 402 or manifold and/or return valve 404 or manifold may control, either directly or indirectly (e.g., via another flow control device), the amount or rate of flow of intermediate working fluid flowing to the ORC unit 174 and/or to each heat exchanger 117, 186, 189.

In another embodiment and as illustrated in FIG. 4B, the site 401 may include a separate supply valve 408 or manifold and return valve 410 or manifold for hot intermediate fluid supply/return. In such examples, the separate supply valve 408 or manifold and return valve 410 or manifold may control the flow of intermediate working fluid based on temperature of the intermediate working fluid.

Figure 5:
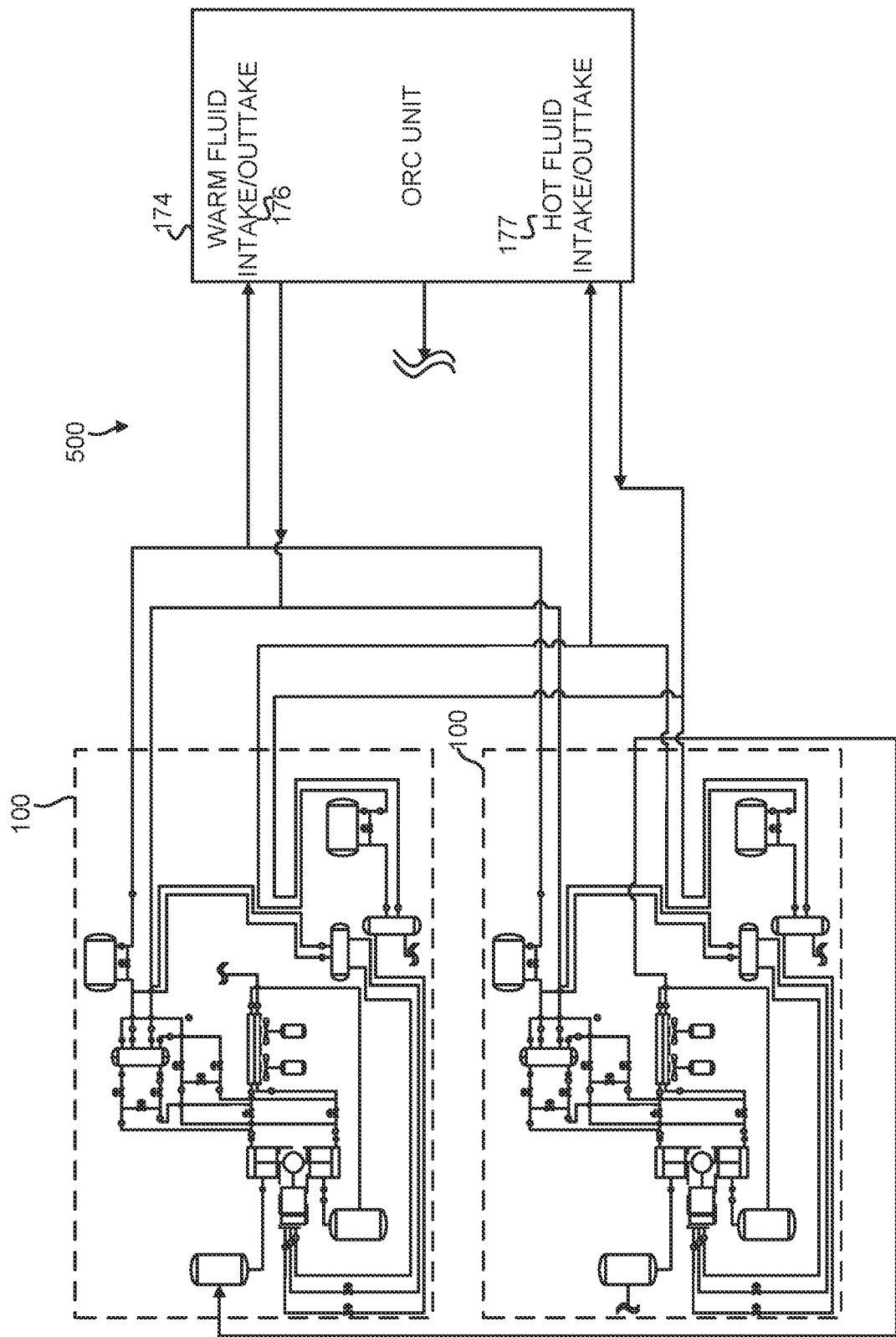
FIG. 5 is a block diagram illustrating novel implementations of one or more sites to provide heated fluid to an ORC unit to generate electrical power, according to one or more embodiments of the disclosure.

FIG. 5 is a block diagram illustrating novel implementations of one or more sites to provide heated fluid to an ORC unit to generate electrical power, according to one or more embodiments of the disclosure. In an embodiment, the flow of gas at a site 500 may be compressed more than two times, as shown previously. For example, a site 500 may include many small compressors, one or more large compressors, or some combination thereof. Further, the site 500 may include one or more engines for one or more of the compressors. The one or more engines may include various types of engines, such as a reciprocating engine, a turbine engine, a fossil fuel based engine, an electric engine, or other type of engine suitable for use with a compressor. Depending on the type of engine utilized, the engine may or may not be utilized as a type of heat source. For example, a turbine engine may not include a water jacket, but produce exhaust, while an electric engine may not produce exhaust. In another example, other equipment at the site may generate heat. In such examples, the other sources of heat may be utilized in conjunction with a heat exchanger or directly with the ORC unit. In yet another example, the gas cooler may be utilized or reconfigured to heat a working fluid. For example, typical gas coolers may be air coolers or another type of heat exchanger. The air cooler may be reconfigured such that a working fluid is utilized to cool the flow of gas or new heat exchanger installed. In another example, the gas cooler may not be utilized in lieu of the additional heat exchangers (e.g., the gas cooler may be shut down, as the flow of gas may be sufficiently cooled prior to the gas cooler).

Figure 6A:
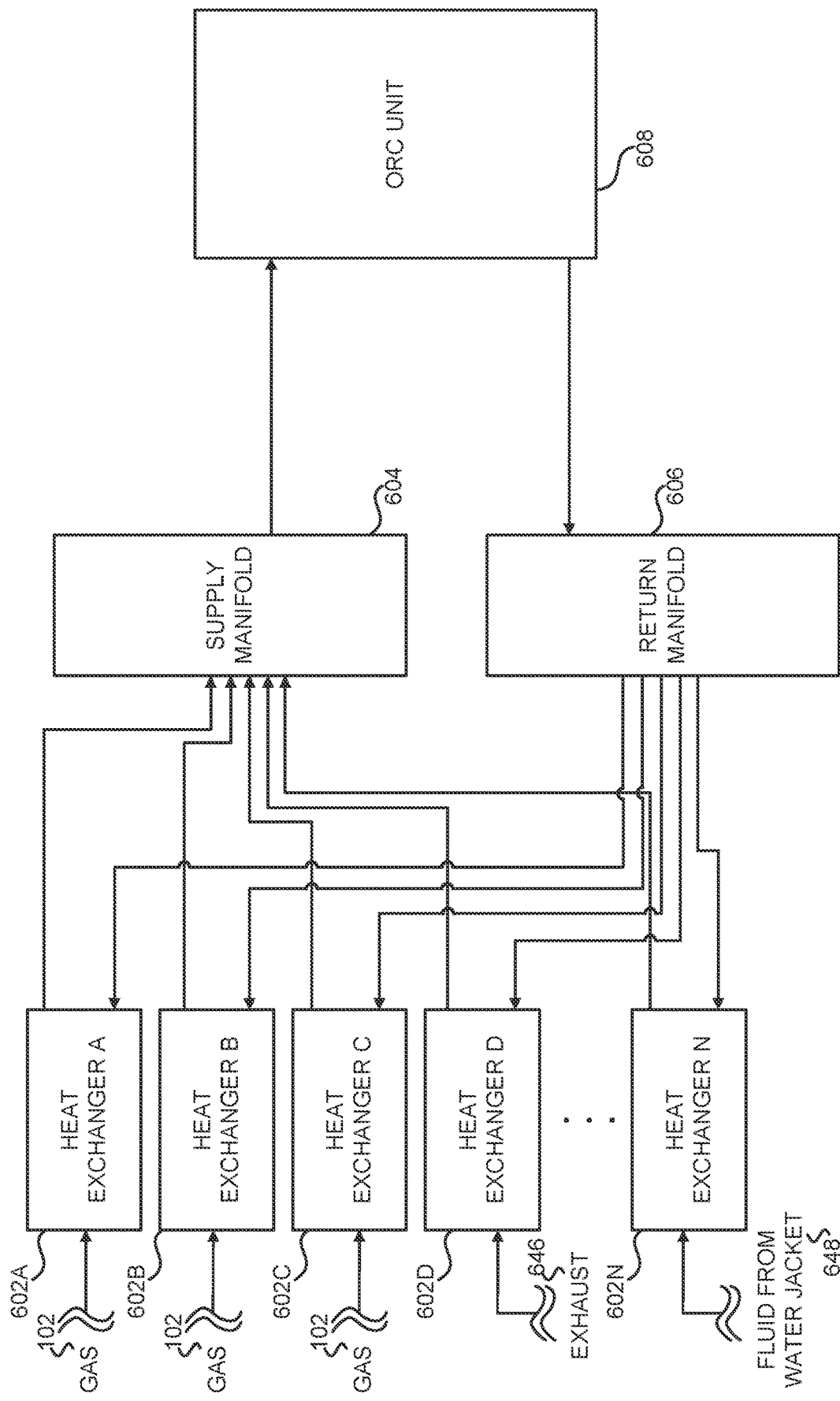
FIG. 6A, FIG. 6B, FIG. 6C, FIG. 6D, FIG. 6E, and FIG. 6F are block diagrams illustrating novel implementations of an organic Rankin cycle (ORC) unit receiving warm and/or hot fluid from one or more heat exchangers via a supply manifold and a return manifold, according to one or more embodiments of the disclosure.

FIG. 6A, FIG. 6B, FIG. 6C, FIG. 6D, FIG. 6E, and FIG. 6F are block diagrams illustrating novel implementations of an organic Rankin cycle (ORC) unit receiving warm and/or hot fluid from one or more heat exchangers via a supply manifold and a return manifold, according to one or more embodiment of the disclosure. As illustrated in FIG. 6A, the site may include a supply manifold 604 and a return manifold 606. In such examples, an intermediate working fluid may coalesce or combine at each manifold (e.g., the supply manifold 604 and the return manifold 606). For example, the intermediate working fluid may flow from each of the heat exchangers 602A, 602B, 602C, 062D, and up to 602N and combine at the supply manifold. The intermediate working fluid may then flow through the ORC unit 608 then back to the return manifold 606, where the intermediate working fluid may then flow back to each of the heat exchangers 602A, 602B, 602C, 062D, and up to 602N. As noted and described herein, a flow of gas 102, exhaust 646, and/or fluid from a water jacket 648 may flow to one of the one or more exchangers 602A, 602B, 602C, 062D, and up to 602N via various valves and pipeline. The supply manifold 604, return manifold 606, the flow control devices, the sensors, and/or any other devices described in FIGS. 6A-6F may be positioned or disposed at various points in between the ORC units and heat exchangers in FIG. 1A through FIG. 5.

Figure 6B:
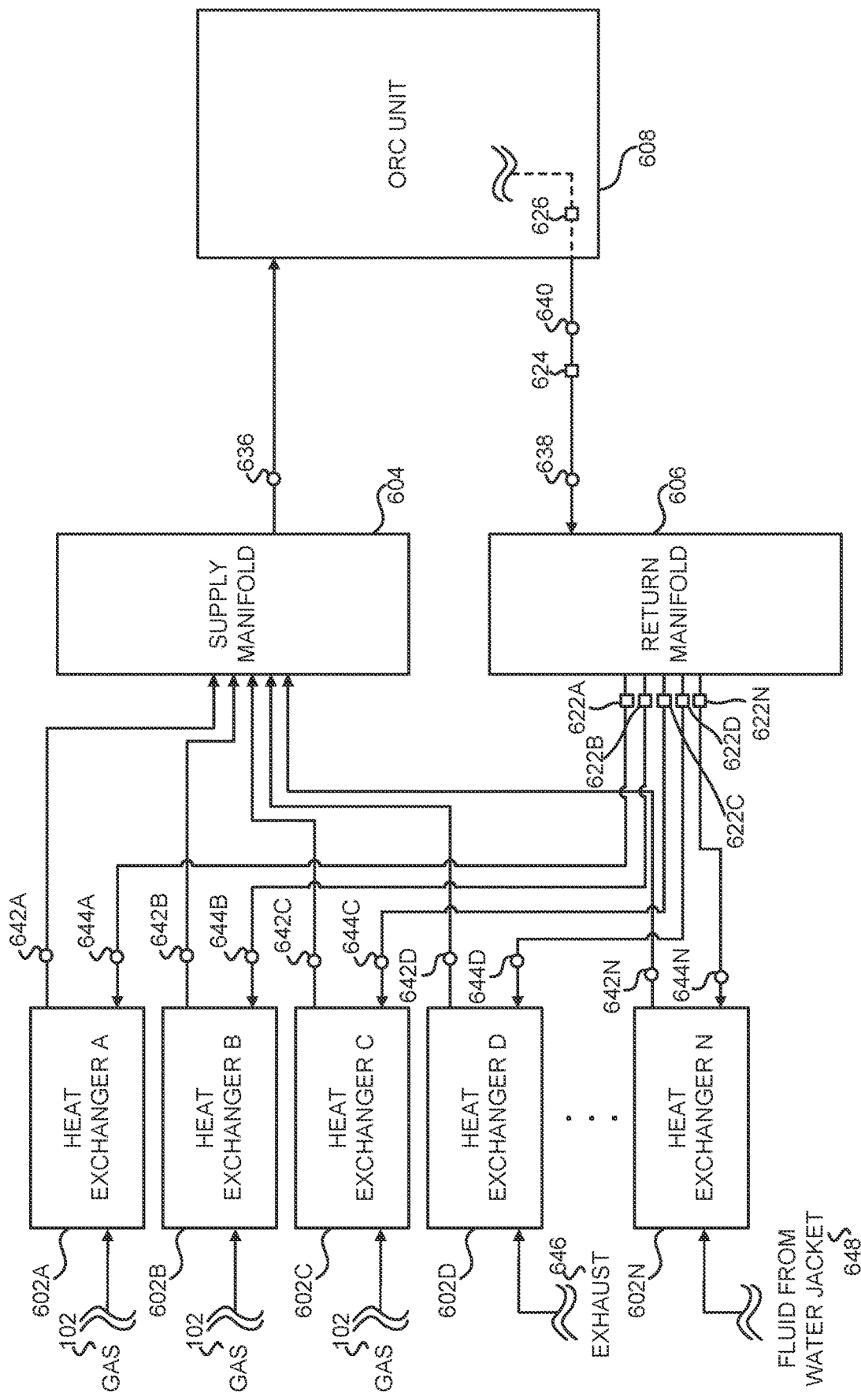

In FIG. 6B, each pipeline from the heat exchangers 602A, 602B, 602C, 602D, and up to 602N to the supply manifold 604 may include a sensor 642A, 642B, 642C, 642D, and up to 642N, such as a temperature sensor, flow meter, or other sensor to measure some characteristic of the intermediate working fluid. Each pipeline from the return manifold 606 to the heat exchangers 602A, 602B, 602C, 602D, and up to 602N may include a sensor 644A, 644B, 644C, 644D, and up to 644N, such as a temperature sensor, flow meter, or other sensor to measure some characteristic of the intermediate working fluid. Further, the pipeline positioned between the return manifold 606 and the ORC unit 608 may include one or more flow control devices 624, 626, in addition to one or more sensors 638, 640 (e.g., temperature sensors or some other suitable sensor), thereby controlling the flow of intermediate working fluid from the ORC unit 608 to the return manifold 606. Each pipeline from the return manifold 606 to the heat exchangers 602A, 602B, 602C, 602D, and up to 602N may further include a flow control device 622A, 622B, 622C, 622D, and up to 622N thereby controlling the flow of the intermediate working fluid from the return manifold 606 to each of the heat exchangers 602A, 602B, 602C, 602D, and up to 602N. Utilizing various combinations of each sensor and each flow control device, the temperature and flow of the intermediate working fluid may be concisely controlled. The pipeline from the supply manifold 604 to the ORC unit 608 can include a sensor 636 to measure temperature or some other characteristic of the working fluid. Based on the measurements or determinations of the temperature or other characteristic of the working fluid (e.g., flow, pressure, density, etc.), the flow control devices may adjust the amount of working fluid flowing to each of the one or more heat exchangers ensuring that the proper amount of working fluid flows to each of the one or more exchangers. For example, one of the heat exchangers may not be producing heat for use in the ORC unit 608. In such examples, the flow control device associated with that particular heat exchanger may prevent further flow of working fluid to the that heat exchanger.

Figure 6C:
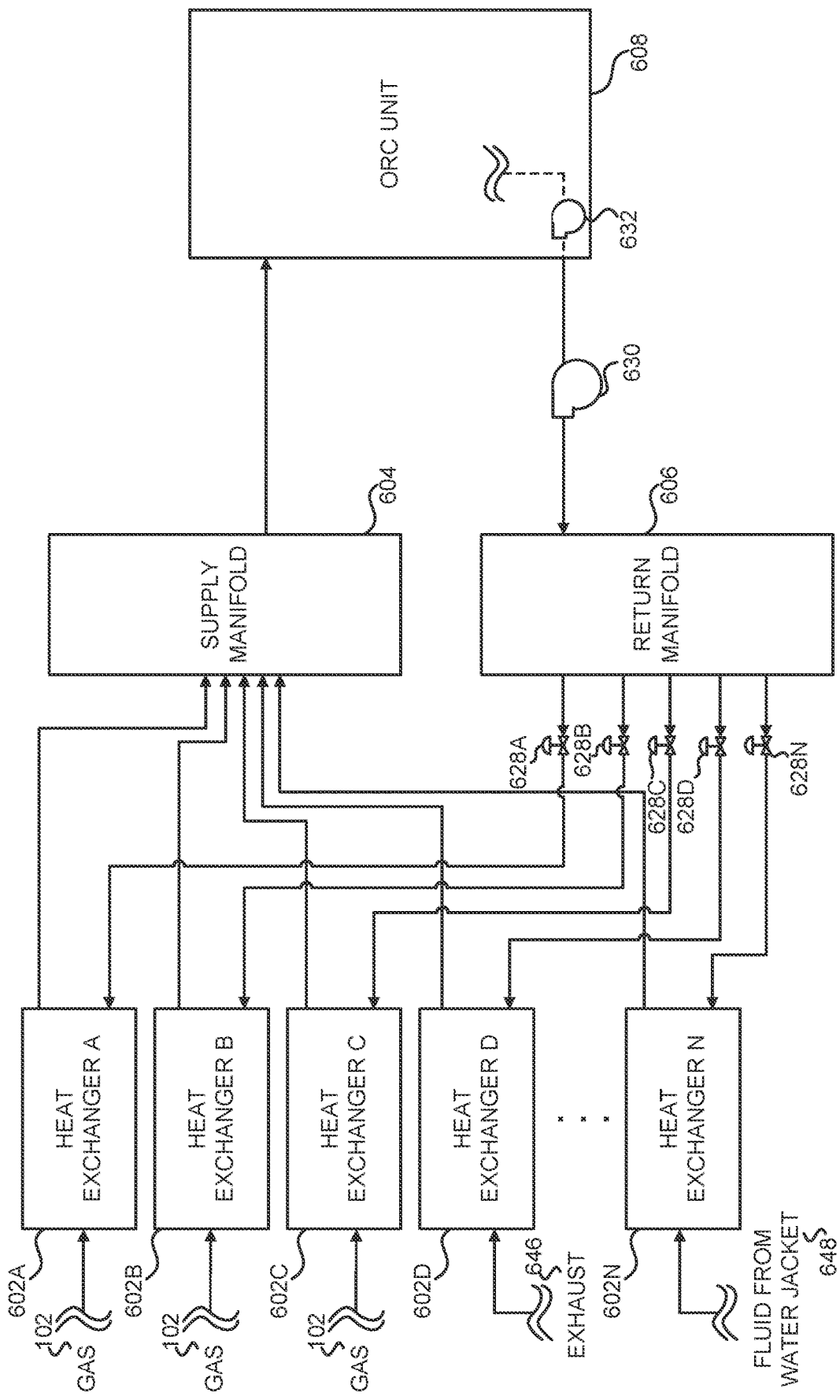
Figure 6D:
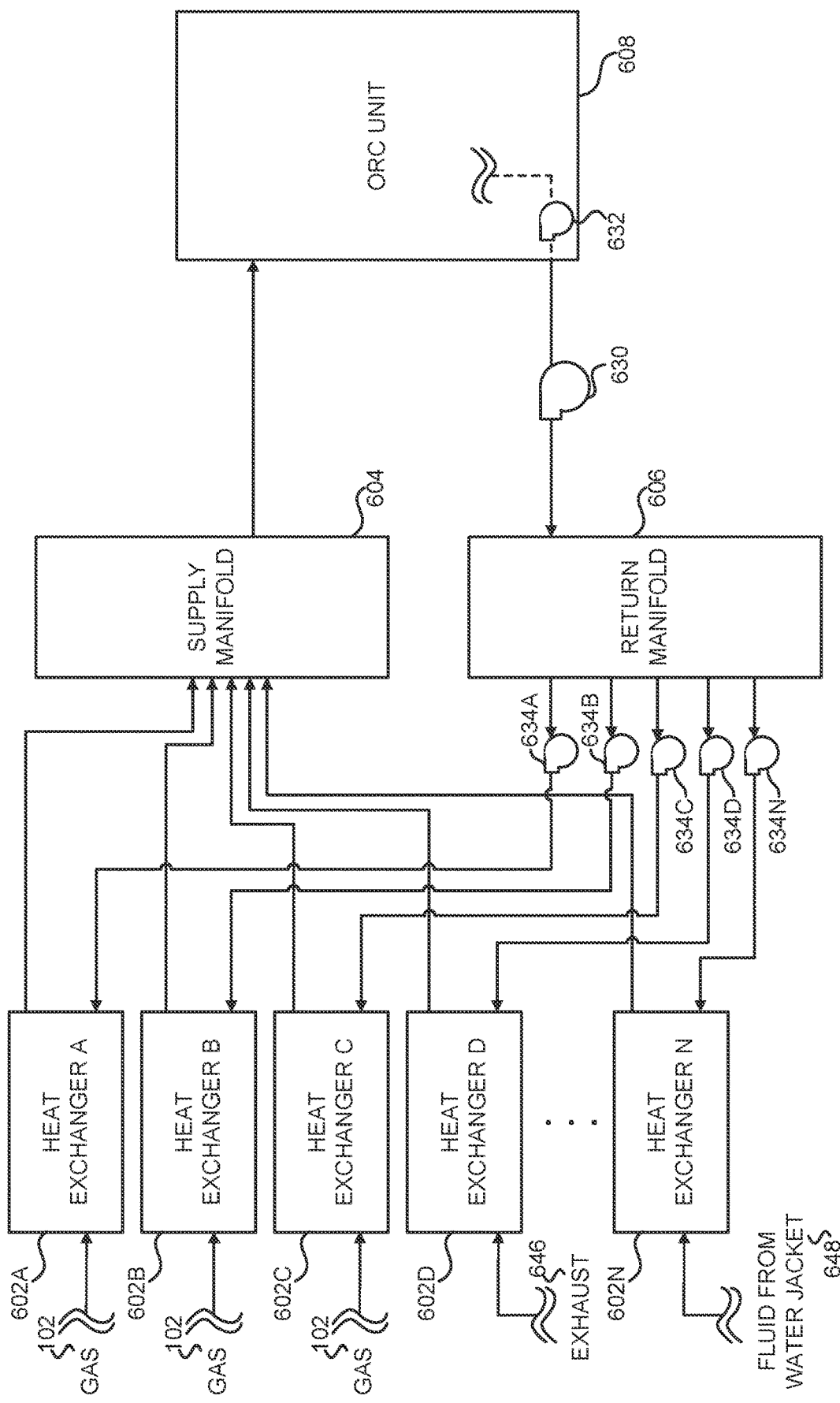
Figure 6E:
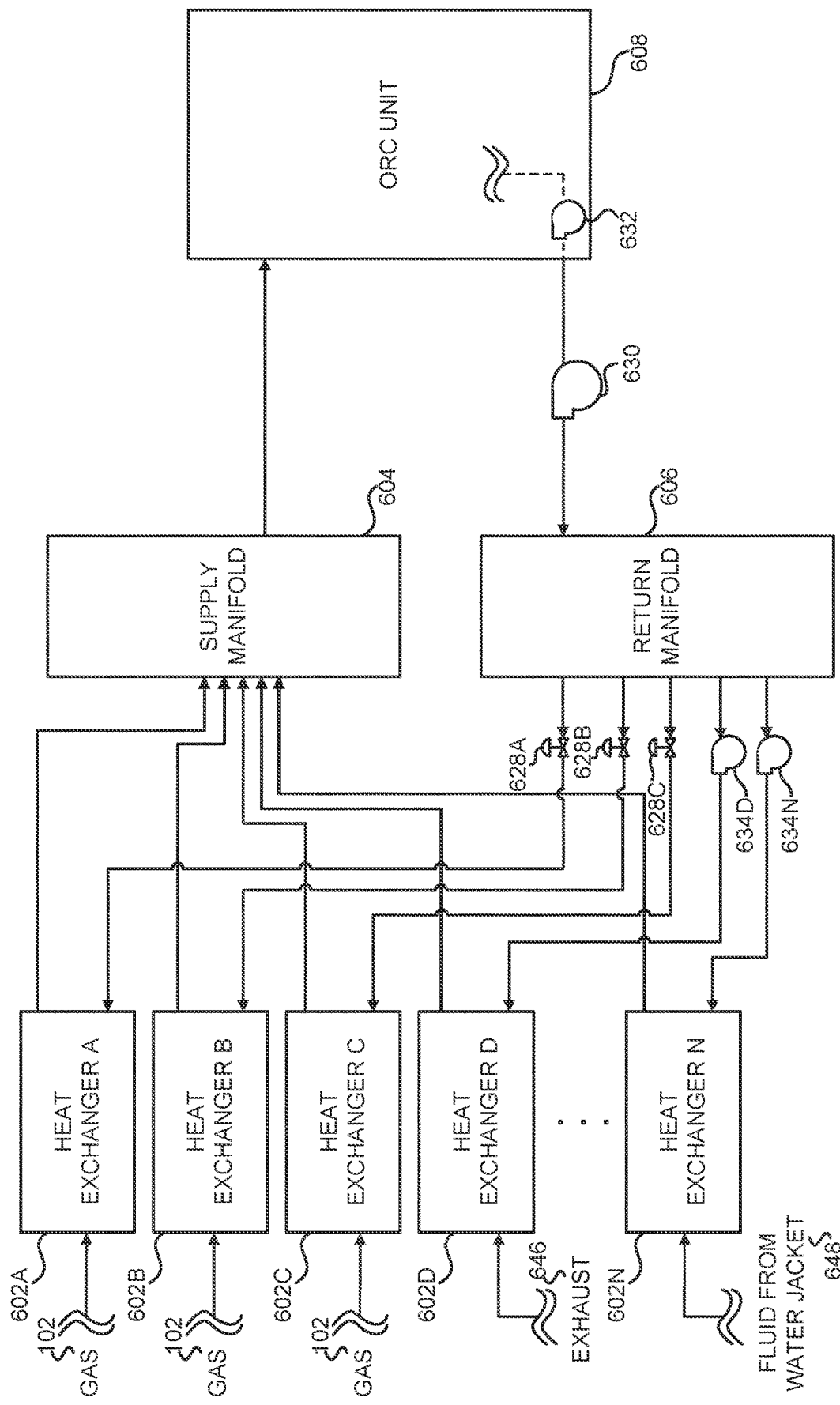

In FIG. 6C, the flow control devices positioned between the return manifold 606 and each of the one or more heat exchangers 602A, 602B, 602C, 602D, and up to 602N may be control valves 628A, 628B, 628C, 628D, and up to 628N. The flow control devices between the return manifold 606 and the ORC unit 608 may be a pump 630, while the flow control device within the ORC unit 608 may be a pump 632. In FIG. 6D, the flow control devices used throughout the site may be pumps 634A, 634B, 634C, 634D, and up to 634N or variable speed pumps. In FIG. 6E, the flow control devices may include some combination of one or more control valves 628A, 628B, 628C, 628D, and up to 628N and/or one or more pumps 634A, 634B, 634C, 634D, and up to 634N.

In an embodiment, the one or more flow control devices 624, 626, 622A, 622B, 622C, 622D, and up to 622N may include one or more of a fixed speed pump, a variable speed drive pump, a control valve, an actuated valve, or other suitable device to control flow of a fluid.

Figure 6F:
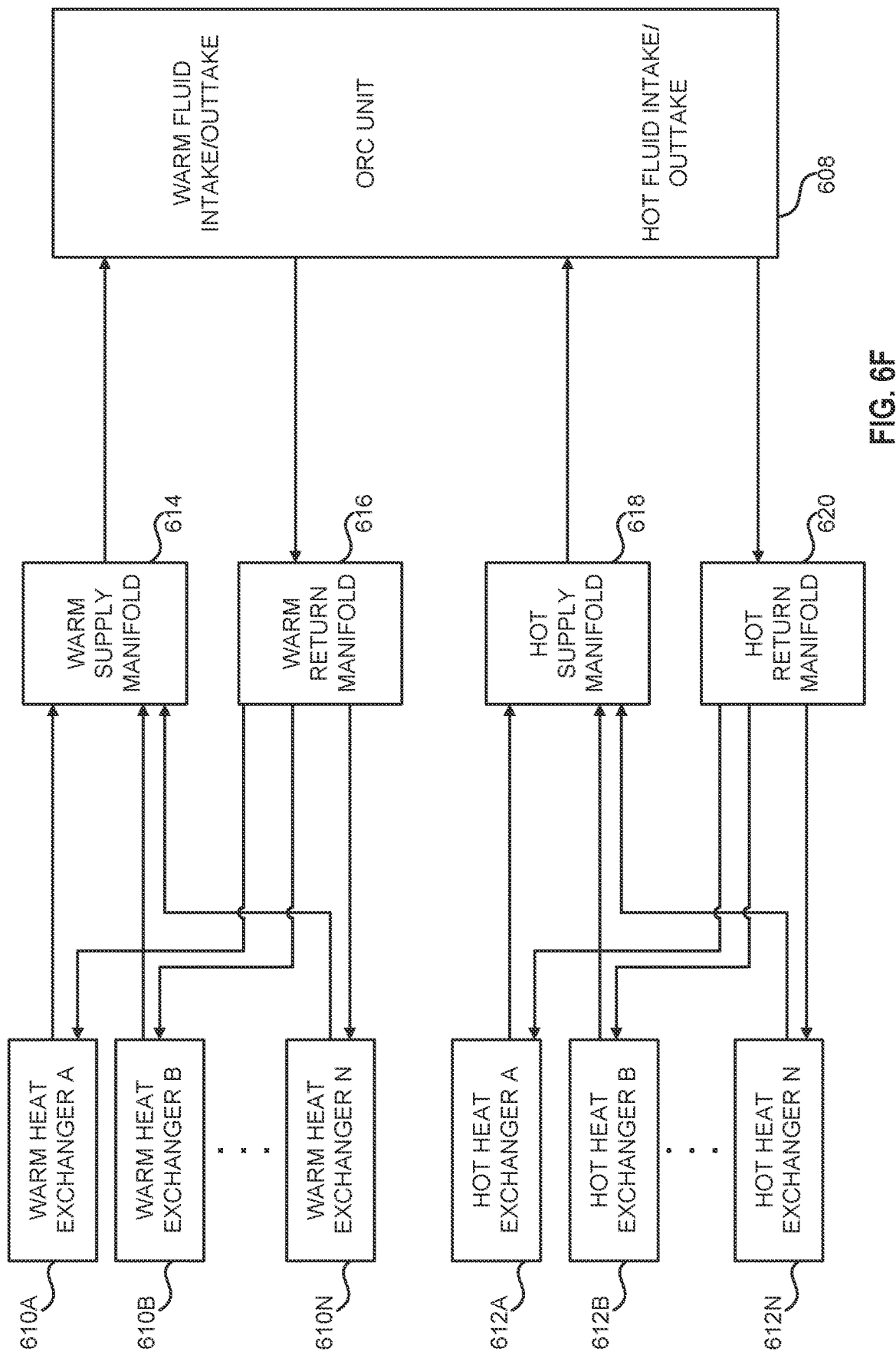

Finally, in FIG. 6F, the site may include a warm supply manifold 614 and a warm return manifold 616, for controlling the flow of warm working fluid from warm water heat exchangers 610A, 610B, and up to 610N to a warm fluid intake/outtake of the ORC unit 608. The site may also include a hot supply manifold 618 and a hot return manifold 620, for controlling the flow of hot working fluid from hot water heat exchangers 612A, 612B, and up to 612N to a hot fluid intake/outtake of the ORC unit 608.

In such embodiments, the flow of working fluid to any of the heat exchangers (e.g., heat exchangers 602A, 602B, 602C, 602D, and up to 602N, warm water heat exchangers 610A, 610B, and up to 610N, and/or hot water heat exchangers 612A, 612B, and up to 612N) may be controlled via the flow control devices to manage, adjust, or maintain a temperature of the flow of gas, if a flow of gas flows therethrough. For example, the total percentage of working fluid flowing to each heat exchanger, for example heat exchangers 602A, 602B, 602C, 602D, and up to 602N, may initially be equal. As temperatures vary and the temperature of the flow of gas rises or falls, then the percentage or amount of working fluid to a particular heat exchanger may be increased or decreased to lower or raise, respectively, the temperature of the flow of gas flowing therethrough.

For example, to increase the temperature of a flow of gas flowing through heat exchanger 602A, flow control device 622A may decrease the percentage of working fluid flowing to heat exchanger 602A by about 5%, about 10%, about 15%, about 20%, or up to about 90%. Such a decrease in the rate of flow may inhibit the transfer of heat to the working fluid, allowing the overall temperature of the flow of gas to increase. In another example, to decrease the temperature of a flow of gas flowing through heat exchanger 602A, flow control device 622A may increase the percentage of working fluid flowing to heat exchanger 602A by about 5%, about 10%, about 15%, about 20%, or up to about 90%. Such an increase in the rate of flow may further facilitate the transfer of heat to the working fluid, allowing the overall temperature of the flow of gas to decrease. In either example, the percentage of increase/decrease of the flow of working fluid may be based on various factors or variables, such as the desired temperature or range of temperatures of the flow of gas, the amount of electrical power currently generated, the desired amount of electrical power to be generated, the total temperature and/or flow rate of the working fluid (e.g., the temperature and/or flow rate of the working fluid flowing between the supply manifold 604 and ORC unit 608), the temperature and/or flow rate of the working fluid flowing to and/or from a heat exchanger (e.g., heat exchangers 602A, 602B, 602C, 602D, and up to 602N), the total amount of working fluid, and/or the rate of flow of working fluid for each heat exchanger (e.g., heat exchangers 602A, 602B, 602C, 602D, and up to 602N). Such working fluid flow rate adjustments may be made intermittently or continuously. In a further example, an adjustment to a particular working fluid flow rate may be performed and then temperatures, flow rates, and/or other characteristics may be determined. Further adjustments may be performed and temperatures, flow rates, and/or other characteristics may be determined again. Such operations may be performed until the temperature of the flow of gas and/or the working fluid is at a desired temperature, with a selected operating range or window, and/or steady-state temperature.

Figure 7A:
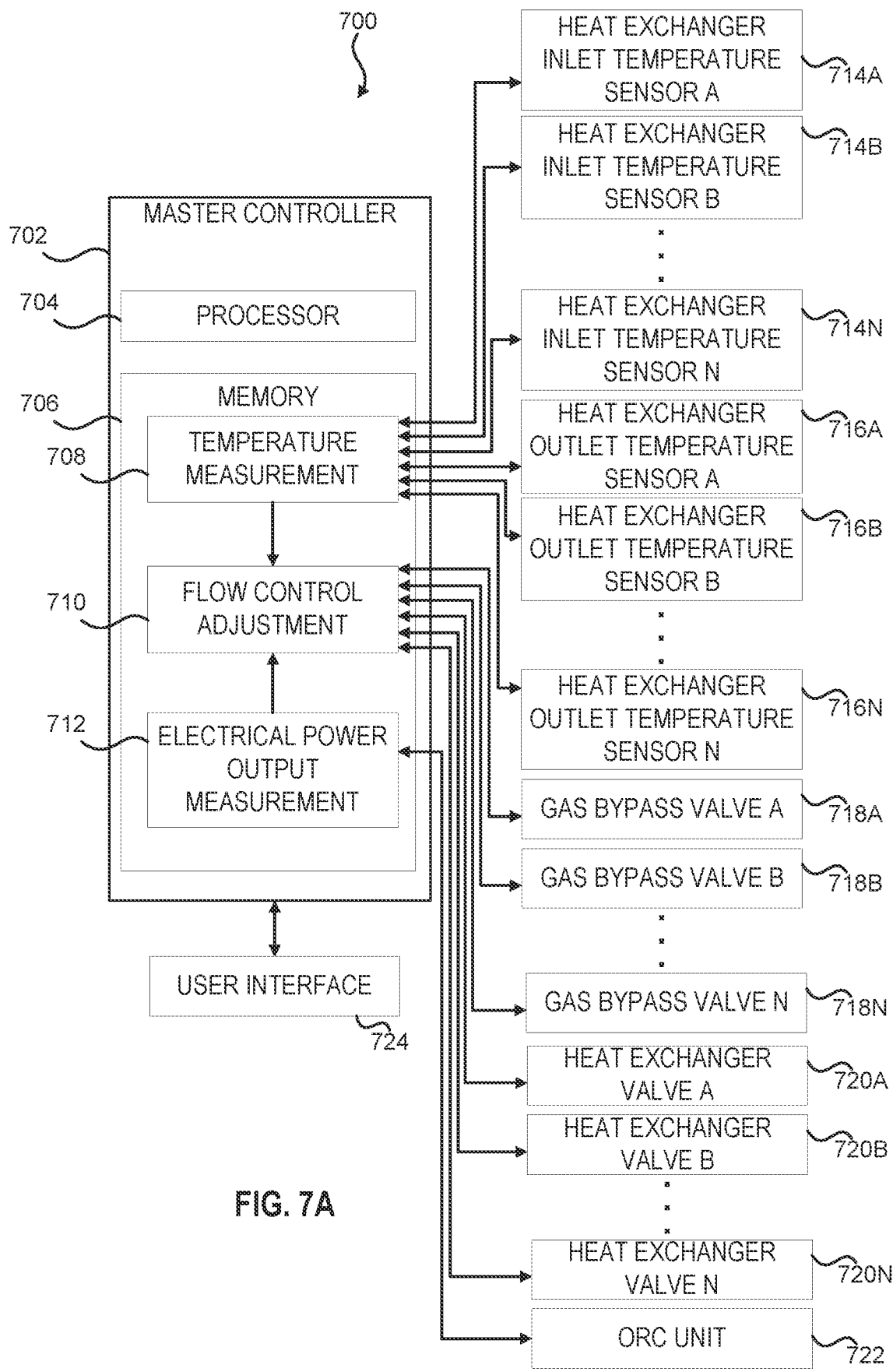
FIG. 7A and FIG. 7B are simplified diagrams illustrating a control system for managing electrical power production at a facility, according to one or more embodiments of the disclosure.
Figure 7B:
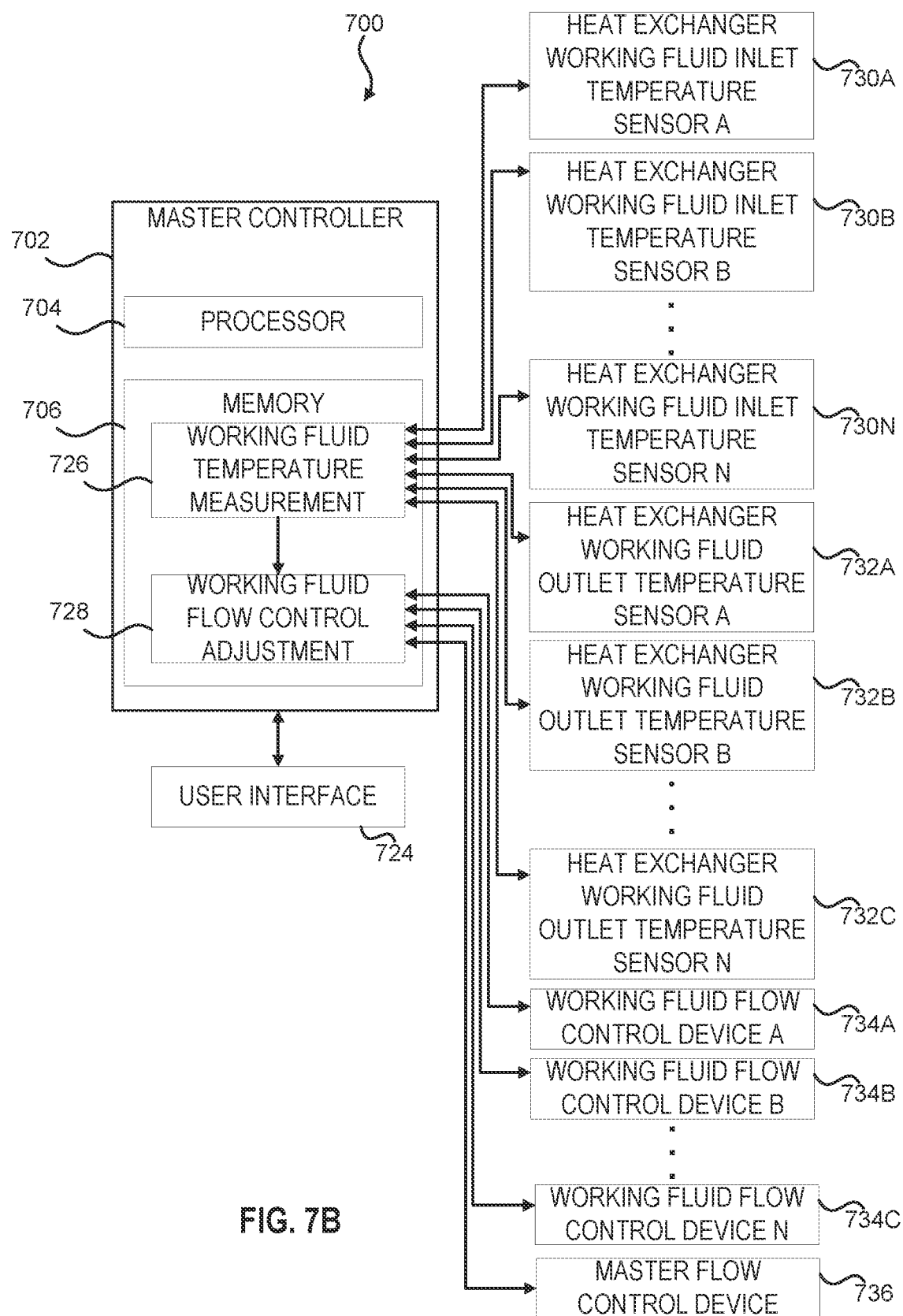

FIG. 7A and FIG. 7B are simplified diagrams illustrating a control system for managing electrical power production at a facility, according to one or more embodiment of the disclosure. A master controller 702 may manage the operations of electrical power generation at a facility during gas compression. The master controller 702 may be one or more controllers, a supervisory controller, programmable logic controller (PLC), a computing device (such as a laptop, desktop computing device, and/or a server), an edge server, a cloud based computing device, and/or other suitable devices. The master controller 702 may be located at or near the facility or site. The master controller 702 may be located remote from the facility. The master controller 702, as noted, may be more than one controller. In such cases, the master controller 702 may be located near or at various facilities and/or at other off-site locations. The master controller 702 may include a processor 704, or one or more processors, and memory 706. The memory 706 may include instructions. In an example, the memory 706 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 706 may store or include instructions executable by the processor 704. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

The master controller 702 may include instructions 708 to measure the temperature at various points in the facility or at the site. For example, the temperature at the inlet of one or more heat exchangers may be measured or sensed from one or more heat exchanger inlet temperature sensors 714A, 714B, and up to 714N. The temperature at the outlet of one or more heat exchangers may be measured from one or more heat exchanger outlet temperature sensors 716A, 716B, and up to 716N. The master controller 702 may further include instructions 712 to measure the amount of electrical power output from the ORC unit 722. In an embodiment, the facility or site may include one or more ORC units and, in such examples, each ORC unit may connect to the master controller 702 to provide, among other information, the amount of electrical power output over time.

The master controller 702 may further connect to one or more heat exchanger valves 720A, 720B, and up to 720N and gas bypass valves 718A, 718B, and up to 718N. The master controller 702 may include instructions 710 to adjust each of these valves based on various factors. For example, if the temperature measured from one of the heat exchangers is below a threshold or outside of a selected operating temperature range or window, then the master controller 702 may transmit a signal causing one or more of the heat exchanger valves 720A, 720B, up to 720N to close. Such a threshold may be defined by the temperature sufficient to ensure the ORC unit 722 generates an amount of electrical power. The operating temperature range or window may be defined by an operating temperature of the ORC unit 722 and/or by the lowest and highest potential temperature of the flow of gas. In another example, based on a heat exchanger inlet temperature and an outlet temperature, the master controller 702 may adjust, via a signal transmitted to, one of the one or more gas bypass valves 718A, 718B, up to 718N. The master controller 702 may consider other factors (e.g., temperature, pressure, density, composition, etc.) as described herein.

As shown in FIG. 7B, the master controller 702 may include instructions 726 to measure the working fluid temperature via one or more heat exchanger working fluid inlet temperature sensor 730A, 730B, up to 730N and/or one or more heat exchanger working fluid inlet temperature sensor 732A, 732B, up to 732N. The master controller 702 may include instructions 728 to adjust the flow of working fluid to any one of the one or more heat exchangers based on the measured temperatures. The flow of the working fluid may be adjusted by the master controller 702, as noted, based on various temperature measurements of the working fluid, via one or more working fluid flow control devices 734A, 734B, up to 734N and/or a master flow control device 736. In an embodiment, the adjustment of the flow of working fluid may occur to adjust the temperature of the flow of gas through a corresponding heat exchanger. Thus, instructions 726 and instructions 728 may be included in or with or may be a sub-routine or sub-module of instructions 710.

In an embodiment, the master controller 702 may connect to a user interface 724. A user may interact with the master controller 702 via the user interface 724. The user may manually enter each of the thresholds and/or the operating temperature ranges or windows described herein and/or may manually adjust any of the control valves described herein.

FIGS. 8A through 8D are flow diagrams of electrical power generation in which, during gas compression, working fluid heated via the flow of gas facilitates ORC operations, according to one or more embodiment of the disclosure. The method is detailed with reference to the master controller 702 and system 700 of FIG. 7A. Unless otherwise specified, the actions of method 800 may be completed within the master controller 702. Specifically, methods 800, 801, 803, and 805 may be included in one or more programs, protocols, or instructions loaded into the memory of the master controller 702 and executed on the processor or one or more processors of the master controller 702. The order in which the operations are described is not intended to be construed as a limitation, and any number of the described blocks may be combined in any order and/or in parallel to implement the methods.

Turning first to method 800, at block 802, the master controller 702 may determine a first temperature at the heat exchanger inlet based on a temperature sensor positioned at the heat exchanger inlet (e.g., the heat exchanger external or internal to an ORC unit). The heat exchanger inlet may be associated with a particular heat exchanger (e.g., the first heat exchanger).

At block 804, the master controller 702 may determine the second temperature of the fluid at the heat exchanger outlet. Other temperatures or characteristics of the fluid and/or other fluid may be determined, such as working fluid temperature and/or flow rates of the working fluid, pressure of the working fluid, flow rates of the fluid (e.g., the flow rate of the flow of gas), and/or density of the fluid.

At block 806, the master controller 702 may determine whether the temperature within an operating temperature range or window. Such an operating temperature range or window may be defined by one or more of the temperature at which volatiles condense in the fluid (e.g., in the flow of gas), the temperature of working fluid at which an ORC unit is able to generate electrical power, and/or other temperatures of other fluids used on site. In another embodiment, the operating temperature may further be defined by the condensation point or dew point of the flow of gas. At block 808, if the temperature is not within the operating temperature range or window, the master controller 702 may adjust a bypass valve. Adjustment of the bypass valve may, in other embodiments, be based on various thresholds of various fluids at the site (e.g., pressure of working fluid or flow of gas, temperature of working fluid or flow of gas, composition of the working fluid or flow of gas, etc.). The bypass valve may divert a portion of the fluid (e.g., flow of gas) away from the heat exchanger thereby increasing the temperature of the fluid (e.g., flow of gas). In other words, a portion of the fluid, prior to cooling in the heat exchanger may be introduced into the remaining portion of the fluid from the heat exchanger. If the bypass valve is at a position other than fully closed and the temperature is above the operating temperature range or window, the portion of the fluid (e.g., flow of gas) may be prevented by further closing the bypass valve to decrease the temperature of the fluid (e.g., flow of gas). Otherwise, if the temperature is within the operating temperature range or window, the method 800 may be executed again.

Figure 8A:
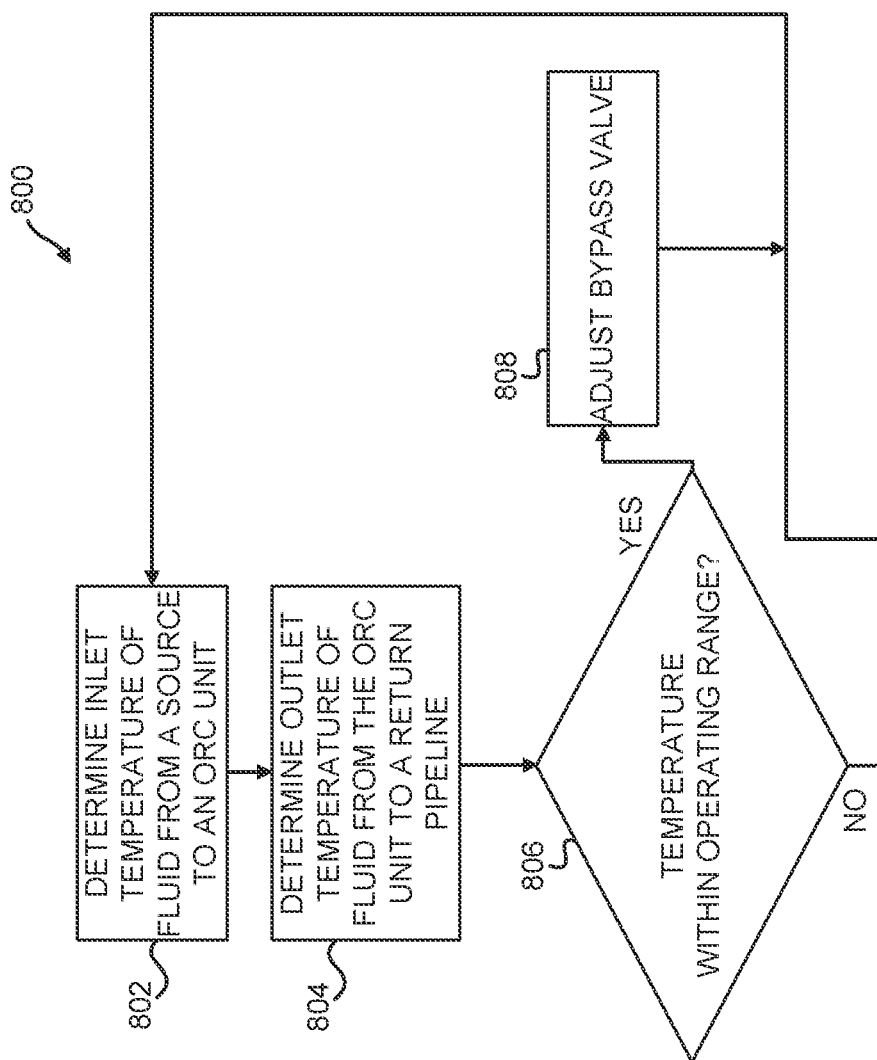
FIG. 8A, FIG. 8B, FIG. 8C, and FIG. 8D are flow diagrams of electrical power generation in which, during gas compression, working fluid heated via the flow of gas facilitates ORC operations, according to one or more embodiments of the disclosure.
Figure 8B:
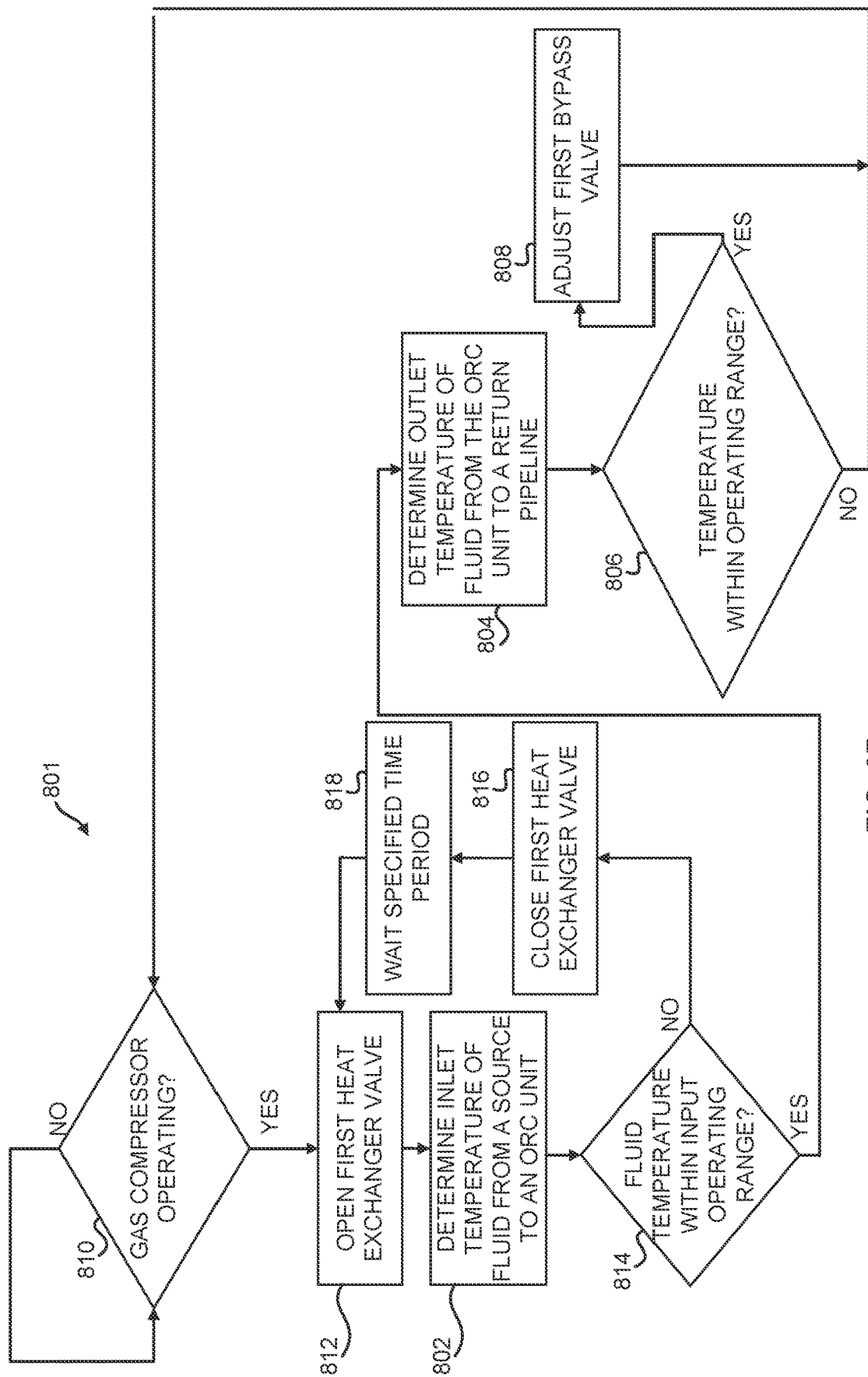

Turning to FIG. 8B, method 801 includes additional processes or operations to the processes or operations described for method 800. At block 810, the master controller 702 may determine whether one or more gas compressors are operating. If a gas compressor is not operating, the master controller 702 may wait a specified amount of time and determine again whether any of the one or more gas compressors are operating. In another embodiment, a user may indicate, for example, via the user interface 724, whether gas compression has begun. If any of the one or more gas compressors are operating, the master controller 702 may proceed to perform the next operation.

At block 812, the master controller 702 may open a first heat exchanger valve or any other heat exchanger valve. If the first heat exchanger valve is already open, then the master controller 702 may not adjust the first heat exchanger. In an embodiment, the master controller 702 may open and/or adjust a heat exchanger valve by transmitting a signal to the heat exchanger valve indicating the position that the heat exchanger valve should be adjusted to.

As described above, at block 802, the master controller 702 may determine a first temperature at the heat exchanger inlet based on a temperature sensor positioned at the heat exchanger inlet. At block 814, the master controller 702 may determine whether the fluid flowing into the heat exchanger within an input operating range, input operating range defined by the minimum temperature and a maximum temperature. The minimum temperature may be defined by the lowest temperature at which an ORC unit may generate electricity. The maximum temperature may be defined by a temperature at which an ORC generates a maximum amount of electricity. In other embodiments, the maximum temperature may be defined by a maximum operating temperature of the ORC unit. The maximum temperature may be utilized to determine, at least in part, the position of the bypass valve or how much working fluid may flow to the heat exchanger. Such a minimum temperature may be about 25° C., about 30° C., or a greater value which may be based on any temperature drop between heat transfer.

At block 816, if the fluid (e.g., a flow of gas) is not within the input operating range, master controller 702 may close or adjust the heat exchanger valve (e.g., the first heat exchanger valve).

At block 818, the master controller 702 may wait a specified period of time prior to re-opening the heat exchanger valve (e.g., the first heat exchanger valve). After the specified period of time the controller may re-open the first heat exchanger valve and check the temperature of the fluid again to determine whether the fluid is within the input operating range. In some examples, the rather than re-opening the first heat exchanger valve, the master controller 702 may determine the inlet temperature of the fluid and adjust the heat exchanger valve based on the inlet temperature.

As described above, at block 804, if the fluid is at a temperature within the input operating range, the master controller 702 may determine the second temperature of the fluid at the heat exchanger outlet. At block 806, the master controller 702 may determine whether the temperature is within an operating range. The operating range may be defined by the temperature at which volatiles condense in the fluid (e.g., in the flow of gas), the temperature of working fluid at which an ORC unit is able to generate electrical power, and/or other temperatures of other fluids used on site. At block 808, if the temperature is outside of the operating temperature, the master controller 702 may adjust a bypass valve. The bypass valve may divert more or less of a portion of the fluid (e.g., flow of gas) away from the heat exchanger thereby increasing or decreasing the temperature of the fluid (e.g., flow of gas). In other words, a portion of the fluid, prior to cooling in the heat exchanger may be introduced into the remaining portion of the fluid from the heat exchanger.

Figure 8C:
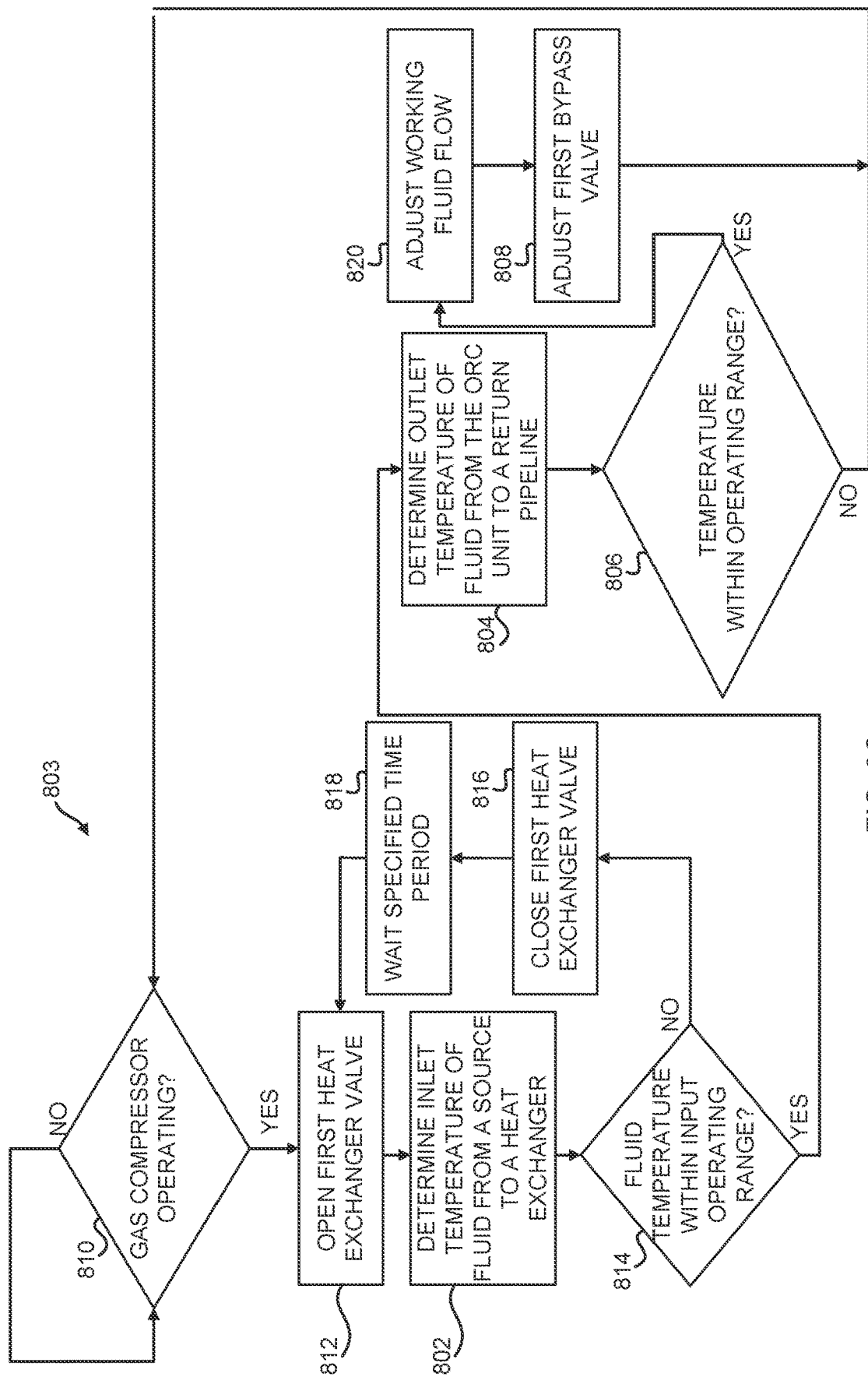

Turning to FIG. 8C, the method 803 may include the same or similar operations as method 801 with the addition of block 820. At block 820, the temperature of the flow of gas may further be maintained based on an adjusted working fluid flow. In other words, the working fluid flowing through the heat exchanger may be increased or decreased depending on whether the temperature of the flow of gas is to be decreased or increased. For example, if the temperature of the flow of gas is too low or below the operating range or window at block 806, the master controller 702 may decrease the flow of working fluid to the heat exchanger. In such examples, rather than following such a step with adjustment of the bypass valve, the master controller 702 may wait a specified period of time for the temperature to stabilize, determine the temperature again, and then adjust the bypass valve or re-adjust the amount of working fluid flow to further adjust the temperature of the flow of gas.

Figure 8D:
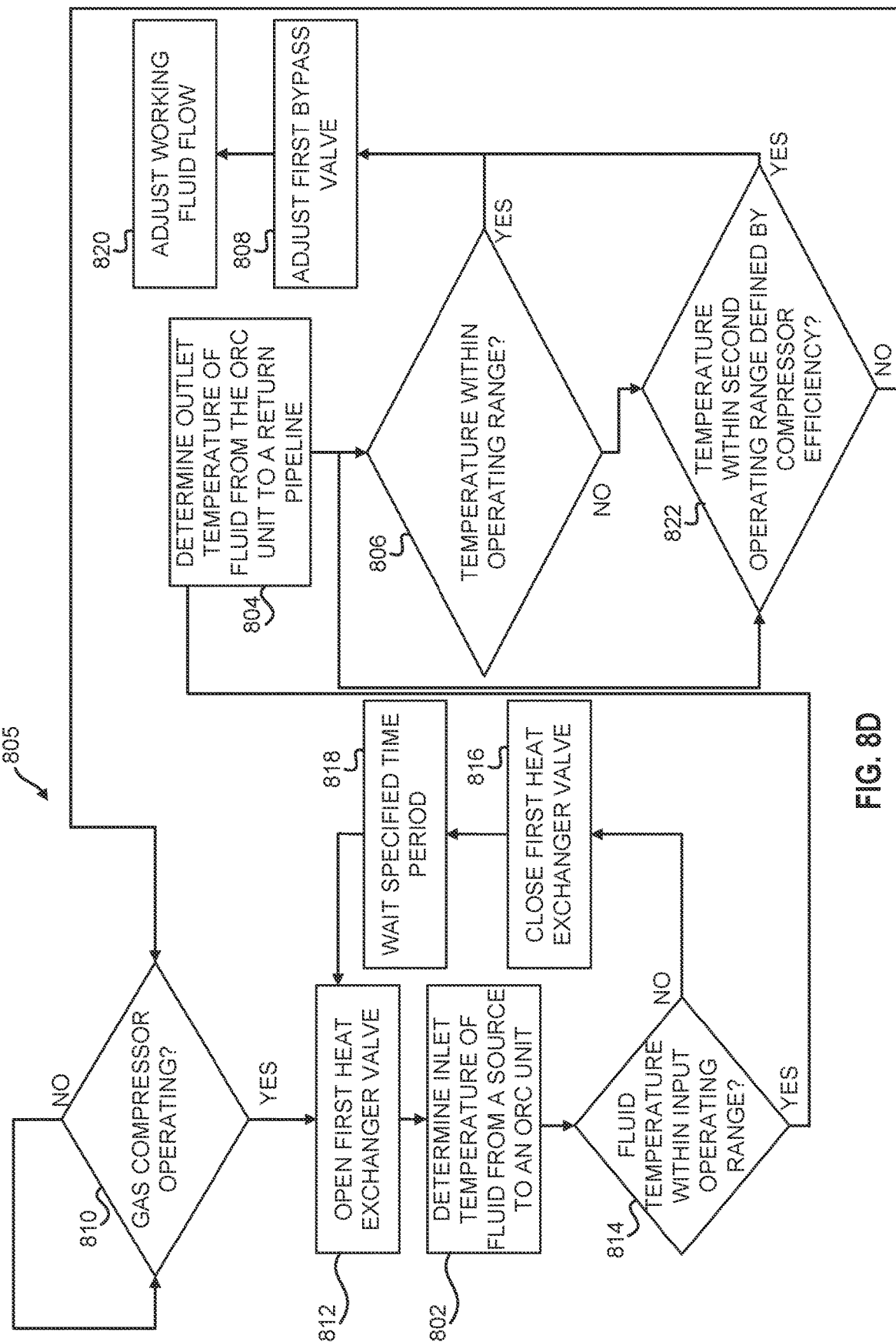

Turning to FIG. 8D, the method 805 may include the same or similar operations as method 803 with the addition of block 822. At block 822, the master controller 702 may determine if the temperature of the flow of gas is within a second operating range defined by a compressor or pump efficiency (e.g., the range of temperatures at which the compressor or pump operates to output higher amounts of gas). If the temperature is above or below the second operating range, the master controller 702 may further adjust working fluid flow and/or bypass valve position. In an embodiment, the second operating range may be defined by a compressor or pump efficiency. The second operating range may be based on various and varying other factors related to a compressor and/or pump. Such factors may include the type of gas and/or the density of the gas. For example, for a specific type of gas, the condensation or dew point may be a particular temperature. The compressor or pump may output the highest rate of gas at another temperature for gasses of that particular density. As such, the operating range may include the other temperature and the condensation or dew point temperature, based on a measurement of the density of the gas and a determination of the condensation or dew point of the gas.

Figure 9A:
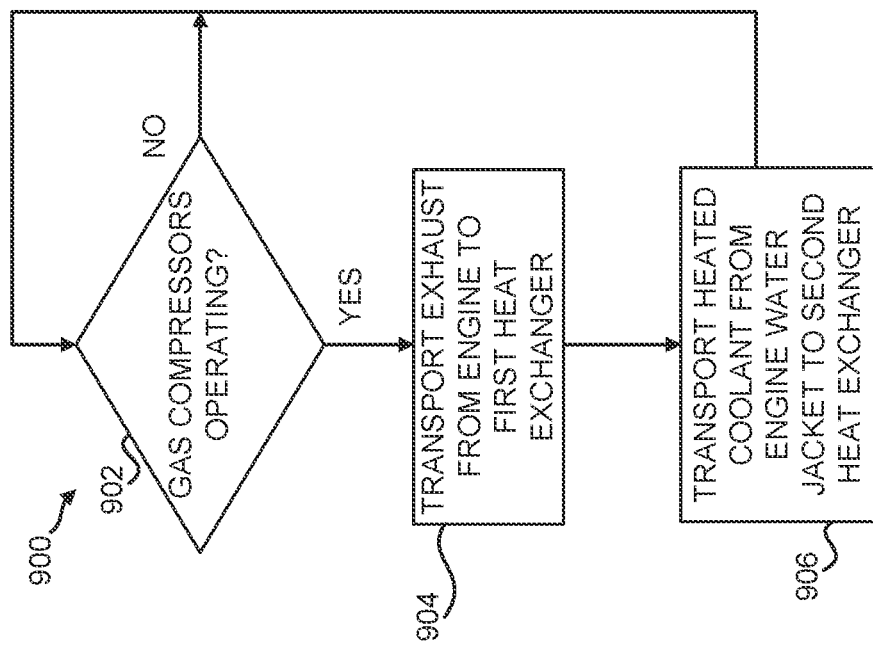
FIG. 9A and FIG. 9B are flow diagrams of electrical power generation in which, during gas compression, working fluid is heated via engine exhaust and/or water jacket fluid flow, according to one or more embodiments of the disclosure.
Figure 9B:
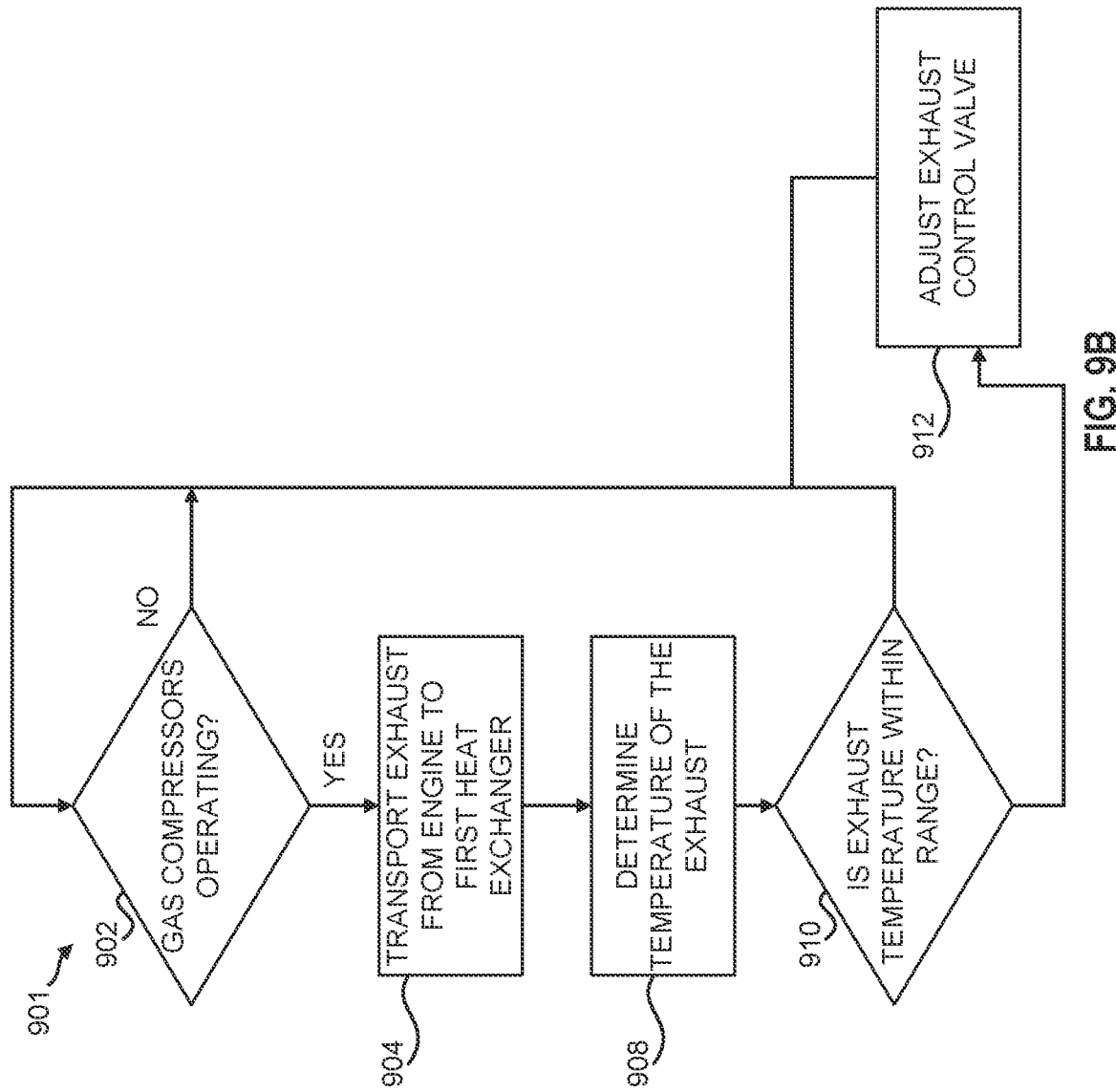

FIGS. 9A and 9B are flow diagrams of electrical power generation in which, during gas compression, working fluid is heated via engine exhaust and/or water jacket fluid flow, according to one or more embodiment of the disclosure. The method is detailed with reference to the master controller 702 and system 900 of FIG. 9. Unless otherwise specified, the actions of method 900 may be completed within the master controller 702. Specifically, method 900 may be included in one or more programs, protocols, or instructions loaded into the memory of the master controller 702 and executed on the processor or one or more processors of the master controller 702. The order in which the operations are described is not intended to be construed as a limitation, and any number of the described blocks may be combined in any order and/or in parallel to implement the methods.

Turning to FIG. 9A, at block 902, the master controller 702 may determine whether the gas compressor is operating. If the gas compressor is not operating, the master controller 702 may wait and perform the determination again. If the gas compressor is operating, the master controller 702 may proceed to perform the next operation.

At block 904, fluid (e.g., exhaust) produced by the engine may be transported to a first heat exchanger. The first heat exchanger may facilitate heat transfer from the fluid (e.g., exhaust) to a working fluid or intermediate work fluid. The heated working fluid or intermediate working fluid may be utilized by an ORC unit to generate electrical power during an ORC operation. The working fluid or intermediate working fluid may be considered warm or hot and may be utilized in a warm or low temperature ORC operation or a hot or high temperature ORC operation, respectively. Blocks 904 and 906 may be executed continuously as a gas compressor operates, the gas compressor being operated or driven by one or more engines.

At block 906, fluid from a water jacket may be transported to a second heat exchanger. The second heat exchanger may facilitate heat transfer from the fluid of the water jacket to a working fluid or intermediate work fluid. The heated working fluid or intermediate working fluid may be utilized by an ORC unit to generate electrical power during an ORC operation. The working fluid or intermediate working fluid may be considered warm or hot and may be utilized in a warm or low temperature ORC operation or a hot or high temperature ORC operation, respectively.

Turning to FIG. 9B, the method 901 may include blocks 902 and 904. After block 904 is executed, at block 906 the master controller 702 may determine the temperature and/or thermal mass of the exhaust. The master controller 702 may determine the temperature based on feedback from a temperature sensor associated with the exhaust. Thermal mass may be determined further, in addition to temperature, based on a flow rate of the exhaust measured or sensed by an additional sensor.

At block 910, the master controller 702 may determine whether the temperature or thermal mass of the exhaust is within a range or window. The range or window may be defined by a maximum operating temperature or thermal mass of the first heat exchanger and a minimum temperature or thermal mass at which ORC equipment generates electricity.

At block 912, if the temperature is above or below the range or window, the master controller 702 may adjust an exhaust control valve. The exhaust control valve may partially or fully divert a portion of the exhaust produced by the engine. In another embodiment, the exhaust control valve may be adjusted to maintain the first heat exchanger. Over time, scaling or depositions of particulates in the exhaust may build. As such, the first heat exchanger may be cleaned or maintained to remove the buildup and, during such cleaning or maintenance, the exhaust control valve may be fully closed. Once the first heat exchanger has been maintained, the exhaust control valve may be adjusted to allow the exhaust to flow to the first heat exchanger. In another embodiment, a portion of the exhaust may be diverted (e.g., via the exhaust control valve) from the first heat exchanger to limit the amount of scaling and/or deposition of particulates. In yet another embodiment, the exhaust control valve may be adjusted to prevent interruption of catalyst performance.

This application is a continuation of U.S. Non-Provisional application Ser. No. 17/934,339, filed Sep. 22, 2022, titled "SYSTEMS AND METHODS UTILIZING GAS TEMPERATURE AS A POWER SOURCE," which is a continuation of U.S. Non-Provisional application Ser. No. 17/715,400, filed Apr. 7, 2022, titled "SYSTEMS AND METHODS UTILIZING GAS TEMPERATURE AS A POWER SOURCE," now U.S. Pat. No. 11,486,330, issued Nov. 1, 2022, which is a continuation of U.S. Non-Provisional application Ser. No. 17/578,520, filed Ja. 19, 2022, titled "SYSTEMS AND METHODS UTILIZING GAS TEMPERATURE AS A POWER SOURCE," now U.S. Pat. No. 11,326,550, issued May 10, 2022, which claims priority to and the benefit of U.S. Provisional Application No. 63/261,601, filed Sep. 24, 2021, titled "SYSTEMS AND METHODS UTILIZING GAS TEMPERATURE AS A POWER SOURCE," and U.S. Provisional Application No. 63/200,908, filed Apr. 2, 2021, titled "SYSTEMS AND METHODS FOR GENERATING GEOTHERMAL POWER DURING HYDROCARBON PRODUCTION," the disclosures of which are incorporated herein by reference in their entireties.

In the drawings and specification, several embodiments of systems and methods to provide electrical power from heat of a flow of gas and/or other source have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure

What is claimed is:

1. A method to supply electrical power to one or more of operational equipment, a grid power structure, or an energy storage device, the method comprising:
    sensing inlet temperature of a flow of compressed gas from a source to a first heat exchanger, the source including one or more compressors respectively being operated by one or more engines, the source connected to one or more pipelines connected to the first heat exchanger, thereby to allow compressed gas to flow from the source to the first heat exchanger;
    transferring heat, via the first heat exchanger, from the flow of compressed gas to a flow of a working fluid, thereby to cause a generator to generate electrical power;
    sensing an outlet temperature of the flow of the compressed gas from the first heat exchanger to the one or more pipelines;
    adjusting a bypass valve to a position sufficient to maintain the temperature of the flow of compressed gas within a selected operating temperature range, the bypass valve positioned to allow or prevent a portion of the flow of compressed gas therethrough, thereby to cause or prevent the flow of compressed gas to be diverted directly from the one or more pipelines; and
    transporting exhaust produced by at least one of the one or more engines during operation to a second heat exchanger; and
    transferring heat, via the second heat exchanger, from the exhaust to a flow of an intermediate working fluid, thereby to cause a generator to generate electrical power to one or more of operational equipment, a grid power structure, or an energy storage device.

2. The method of claim 1, wherein the position of adjustment of the bypass valve is based on one or more of (a) the selected operating temperature range, (b) a temperature drop of the flow of compressed gas, (c) the inlet temperature, or (d) the outlet temperature.

3. The method of claim 2, wherein the temperature drop of the flow of compressed gas comprises the temperature drop of the flow of compressed gas after passage through a gas cooler.

4. The method of claim 3, wherein the gas cooler comprises an air-cooler.

5. The method of claim 3, further comprising:
    sensing, via an ambient temperature sensor, the ambient temperature of an environment external to the one or more pipelines and the generator; and
    determining the temperature drop of the flow of compressed gas after passage through the gas cooler based on the outlet temperature, the ambient temperature, and a predicted temperature drop differential.

6. The method of claim 5, wherein the predicted temperature drop differential is based on a type of the gas cooler and the ambient temperature.

7. The method of claim 1, wherein the heat exchanger is included within the generator.

8. The method of claim 1, wherein the heat exchanger comprises an intermediate heat exchanger external from the generator, and wherein the working fluid comprises an intermediate working fluid.

9. The method of claim 1, further comprising: prior to transport of the exhaust to the second heat exchanger (a) sensing an exhaust thermal mass of the exhaust produced by one of the one or more engines, and (b) in response to the exhaust thermal mass being outside of a selected thermal mass range, adjusting an exhaust control valve to partially or fully prevent or allow flow of the exhaust from the one of the one or more engines to the second heat exchanger.

10. The method of claim 9, further comprising, during operation of the one or more compressors via one or more engines, transporting a flow of heated coolant from a water jacket associated with one of the one or more engines to the second heat exchanger.

11. The method of claim 10, further comprising: prior to transport of the heated coolant to the second heat exchanger: (a) sensing a heated coolant temperature of the flow of heated coolant from the water jacket, and (b) in response to the heated coolant temperature being outside of a selected water jacket temperature range, adjusting a water jacket control valve to prevent or allow flow of the heated coolant from the water jacket to the second heat exchanger.

12. The method of claim 1, wherein the operational equipment includes one or more of on-site (1) pumps, (2) heat exchanger, or (3) controllers.

13. The method of claim 1, wherein the compressed gas includes one or more of compressed (1) natural gas, (2) renewable natural gas, (3) landfill gas, or (4) organic waste gas.

14. The method of claim 1, further comprising determining the inlet temperature and the outlet temperature for each of a plurality of heat exchangers, and supplying, via the plurality of heat exchangers, heated working fluid to a supply manifold.

15. The method of claim 14, further comprising supplying, via the supply manifold, aggregated heated working fluid to the generator, and wherein the generator returns cooled working fluid to a return manifold.

16. The method of claim 15, further comprising transporting, via the return manifold, an amount of cooled working fluid to each of the plurality of heat exchangers.

17. A method to supply electrical power to one or more of operational equipment, a grid power structure, or an energy storage device, the method comprising:
during one or more stage gas compressions via one or more compressors located adjacent a pumping station and for each of the one or more compressors associated with the pumping station:
sensing a first temperature of a flow of gas from a source to a first heat exchanger, the source connected to the first heat exchanger via a supply pipeline,
in response to a determination that the first temperature is at or above a threshold, maintaining a heat exchanger control valve position, the heat exchanger control valve positioned on the supply pipeline and to control flow of gas to the first heat exchanger,
transferring heat, via the first heat exchanger, from the flow of gas to a flow of an intermediate working fluid, thereby to cause a generator to generate electrical power,
sensing a second temperature of a flow of the gas from the first heat exchanger to a return pipeline, and
in response to a determination that the second temperature is within a selected operating temperature range, adjusting a bypass valve to a position sufficient to maintain temperature of the flow of gas within the selected operating temperature range, the bypass valve positioned to connect the supply pipeline to a return pipeline;
during operation of the one or more compressors, transporting exhaust produced by one or more engines to a second heat exchanger; and
transferring heat, via the second heat exchanger, from the exhaust to a flow of an intermediate working fluid, thereby to cause the generator to generate electrical power to one or more of operational equipment, a grid power structure, or an energy storage device.

18. The method of claim 17, further comprising utilizing heat transferred from the exhaust to the intermediate working fluid of the second heat exchanger in a hot fluid intake of the generator.

19. The method of claim 17, further comprising utilizing heat transferred from the flow of gas to the intermediate working fluid of the first heat exchanger in a warm fluid intake of the generator.

20. A method to supply electrical power to one or more of operational equipment, a grid power structure, or an energy storage device, the method comprising:
determining an inlet temperature of a flow of compressed gas from a source to a heat exchanger, thereby to allow compressed gas to flow from the source to the heat exchanger;
transferring heat, via the heat exchanger, from the flow of compressed gas to a flow of a working fluid, thereby to cause a generator to generate electrical power;
determining an outlet temperature of the flow of the compressed gas;
in response to determination of the outlet temperature being within a selected operating temperature range, adjusting one or more of:
a bypass valve to a position sufficient to maintain temperature of the flow of compressed gas within the selected operating temperature range, the bypass valve positioned to allow a portion of the flow of compressed gas therethrough, thereby to increase temperature of the flow of compressed gas from the heat exchanger, or
adjusting the flow of working fluid to a percentage sufficient to maintain temperature of the flow of compressed gas within a selected operating temperature range;
transporting exhaust produced by the one or more engines to another heat exchanger; and
transferring heat, via the another heat exchanger, from the exhaust to a flow of an intermediate working fluid, thereby to cause the generator to generate electrical power to one or more of operational equipment, a grid power structure, or an energy storage device.

21. The method of claim 20, wherein the adjusting of the flow of working fluid to the percentage comprises adjusting to the percentage by a control valve being in a particular opened or closed position.

22. A method to supply electrical power therefrom, the method comprising:
sensing an inlet temperature of a flow of compressed gas from one or more a sources to a plurality of heat exchangers, the one or more sources connected to a main pipeline, the main pipeline connected to a supply pipeline, and the supply pipeline connected to the plurality of heat exchangers, thereby to allow compressed gas to flow from the one or more sources to the plurality of heat exchangers;
determining the inlet temperature and the outlet temperature for each of a plurality of heat exchangers, each of the plurality of heat exchangers supplying heated working fluid to a supply manifold;
supplying, via the supply manifold, aggregated heated working fluid to a generator so that the generator returns cooled working fluid to a return manifold;

transferring heat via one or more of the plurality of heat exchangers, from the flow of compressed gas to a flow of a working fluid, thereby to generate electrical power;

sensing an outlet temperature of the flow of the compressed gas from one or more of the plurality of heat exchangers to a return pipeline; and in response to a determination that the outlet temperature is within a selected temperature range, adjusting a bypass valve to a position sufficient to maintain temperature of the flow of compressed gas within the selected temperature range.

23. The method of claim 22, wherein the bypass valve is positioned on a bypass pipeline, the bypass pipeline being positioned to allow via the bypass valve a portion of the flow of compressed gas therethrough, thereby to cause the flow of compressed gas to be diverted from the supply pipeline to the return pipeline and to increase temperature of the flow of compressed gas from the heat exchanger.

24. The method of claim 22, wherein the position of adjustment of the bypass valve is based on one or more of (a) the threshold, (b) a temperature drop of the flow of compressed gas, (c) the inlet temperature of the flow of compressed gas, or (d) the outlet temperature of the flow of compressed gas.

25. The method of claim 22, wherein a minimum temperature of the selected temperature range is based on a temperature at which volatiles condense in the flow of gas.

26. The method of claim 22, further comprising transporting, via the return manifold, an amount of cooled working fluid to each of the plurality of heat exchangers.

27. The method of claim 22, further comprising, in response to one of the outlet temperatures being at or below a minimum temperature of the selected temperature range, adjusting the amount of cooled working fluid flowing to a heat exchanger corresponding to the one of the outlet temperatures.

* * * * *